United States Patent [19]

Fujimaki et al.

[11] Patent Number: 4,599,287

[45] Date of Patent: Jul. 8, 1986

[54] POSITIVE CHARGING PHOTORECPTOR

[75] Inventors: Yoshihide Fujimaki; Yoshiaki Takei; Yasuo Suzuki; Hiroyuki Nomori, all of Hachioji, Japan

[73] Assignee: Konishiroku Photo Industry Co., Ltd., Tokyo, Japan

[21] Appl. No.: 669,696

[22] Filed: Nov. 7, 1984

[30] Foreign Application Priority Data

| Nov. 9, 1983 | [JP] | Japan | 58-210622 |
| Nov. 9, 1983 | [JP] | Japan | 58-210623 |
| May 28, 1984 | [JP] | Japan | 59-108226 |
| May 28, 1984 | [JP] | Japan | 59-108228 |

[51] Int. Cl.[4] .......................................... G03G 5/082
[52] U.S. Cl. ........................................ 430/59; 430/72; 430/79
[58] Field of Search .................... 430/58, 59, 72, 79

[56] References Cited

U.S. PATENT DOCUMENTS

| 4,474,865 | 10/1984 | Ong et al. | 430/58 |
| 4,486,522 | 12/1984 | Hashimoto | 430/58 |
| 4,487,824 | 12/1984 | Katagiri et al. | 430/58 |

Primary Examiner—John L. Goodrow
Attorney, Agent, or Firm—Jordan B. Bierman

[57] ABSTRACT

A photoreceptor for positive charging is disclosed, said photoreceptor comprising a carrier generating material which is stable against both heat and light, has high carrier generating efficiency and provides good photoconductivity over a wide wavelength range and a specific carrier transport material combined in such a manner that the shape of surface potential curves remains essentially constant over a cyclic operation and contributes to the formation of a visible image of high quality in each cycle by reducing the "memory effect", minimizing the residual potential and extending the cycle life.

16 Claims, 8 Drawing Figures

POSITIVE CHARGING PHOTORECPTOR

BACKGROUND OF THE INVENTION

The present invention relates to a photoreceptor, such as one for use in electrophotography, that has a light-sensitive layer composed of a carrier generating phase and a carrier transporting phase.

Conventional photoreceptors in electrophotography are typically inorganic in that they have light-sensitive layers primarily composed of inorganic photoconductive materials such as selenium, zinc oxide and cadmium. The inorganic photoreceptors do not necessarily perform satisfactorily in respect of sensitivity, heat stability, moisture resistance and durability. For example, selenium is easily deteriorated as a result of crystallization due to heat or in contact with extraneous material such as sebum from the fingers. Cadmium sulfide has problems in respect of moisture resistance and durability, and zinc oxide has low durability. Furthermore, selenium and cadmium sulfide do not have great latitude in manufacture and handling.

In recent years, the use of organic photoconductive materials in light-sensitive layers of photoreceptors has become the subject of intensive investigation. For example, Japanese Patent Publication No. 10496/1975 shows an organic photoreceptor having a light-sensitive layer containing poly-N-vinylcarbazole and 2,4,7-trinitro-9-fluorenone. This photoreceptor is not necessarily satisfactory in respect to sensitivity and durability. In order to satisfy both requirements, attempts are being made to develop an organic photoreceptor having a light-sensitive layer wherein different materials perform two separate functions, one being carrier generation and the other being carrier transport. This photoreceptor, which may be called a function-separated type, has the advantage in that it permits selecting most suitable functional materials from a wide range of candidates and that therefore a photoreceptor having desired characteristics can be obtained with relative ease.

Many materials have been proposed as effective carrier generating materials for use in photoreceptors of the function-separated type. An exemplary inorganic material is amorphous selenium as shown in Japanese Patent Publication No. 16198/1968. While amorphous selenium is combined with an organic carrier transport material, a carrier generation layer composed of amorphous selenium is easily deteriorated as a result of crystallization due to heat or in contact with extraneous matter.

Several photoreceptors that use organic dyes or pigments as carrier generation materials have also been proposed. For example, photoreceptors having light-sensitive layers containing bisazo compounds are shown in Japanese Patent Application (OPI) Nos. 37543/1972, 22834/1980, 79632/1979 and 116040/1981 (the symbol OPI as used herein means an unexamined published Japanese patent application). However, none of the photoreceptors shown in these patents satisfy a wide spectrum of requirements in electrophotographic process: they are not completely satisfactory in respect of sensitivity, residual potential or stability after cyclic operation, and in addition, the latitude for selection of carrier transport materials that can be used in these photoreceptors is limited. Known bisazo compounds exhibit a fairly good sensitivity in the short- to medium wavelength range, but they have no sensitivity in the long wavelength range. If a tungsten lamp is used as a light source, the long wavelength component of the light is simply wasted, and a semiconductor laser or other sources that issue light in long-wavelength region cannot be used with such bisazo compounds. Because of this limit on the usable wavelength range, photoreceptors having light-sensitive layers which contain bisazo compounds cannot be used in a wide scope of applications.

A further problem with photoreceptors is that a carrier transport material which is effective for use in combination with a certain carrier generation material may prove ineffective with another carrier generation material; on the other hand, a carrier generation material which is effective for use in combination with a certain carrier transport material may prove useless when combined with another carrier transport material. If an improper combination of carrier generation and transport materials is used, the resulting photoreceptor has a low sensitivity; what is more, the low discharge efficiency in a weak electric field causes a high "residual potential", and in an extreme case, the residual potential increases after each cycle of operation, and the photoreceptor eventually becomes no longer usable.

There is no general rule that can be relied upon for selected optimum combinations of a material that is to be incorporated in a carrier generation phase and a material that should be present in a carrier transport phase. It is therefore necessary to determine advantageous combinations by screening a wide scope of materials on a trial and error basis.

Known photoreceptors using organic photoconductive materials are usually designed for negative charging, because high hole mobility provides a favorable condition for high photosensitivity. However, researchers have shown that negatively charged photoreceptors cause two problems. One is the formation of ozone that is deleterious to the operation environment. The other problem is the need for using a toner of positive polarity in developing the negatively charged photoreceptor; in view of the triboelectric series with respect to the particles of a ferromagnetic carrier, the toner of positive polarity is difficult to manufacture.

The positive charging of a photoreceptor using an organic photoconductive material has been proposed by several researchers. According to one proposal, a carrier generation layer is overlaid with a carrier transport layer made of a material having a high electron transport efficiency, but this idea is not acceptable since trinitrofluorenone incorporated in the carrier transport layer has carcinogenicity. Another possible arrangement would consist of a carrier transport layer that has a high hole transport efficiency and which is overlaid with a carrier generation layer. However, this is also not practical since the carrier generation layer located on top of the photoreceptor makes it unsuitable for cyclic operation.

U.S. Pat. No. 3,615,414 shows a photoreceptor for positive charging, wherein a thiapyrylium salt (carrier generating material) is so incorporated that if forms a eutectic complex with a polycarbonate (binder resin). But this product is defective in that it experiences an appreciable degree of "memory effect" and is highly likely to cause ghost. U.S. Pat. No. 3,357,989 shows a photoreceptor using phthalocyanine. However, phthalocyanine requires a strict control over its crystal type since its characteristics are highly dependent on the crystal type. Furthermore, phthalocyanine has an insufficient sensitivity to light in the short wavelength range and experiences a significant degree of memory effect". The photoreceptor of U.S. Pat. No. 3,357,989 is not suitable for use with a copier of the type that operates on a light source in the visible wavelength range.

These are the reasons why photoreceptors using organic photoconductive materials have been exclusively designed for use in the negatively charged state.

One serious problem with the conventional photoreceptors in electrophotography is that the light-sensitive layer is electrically fatigued so much as a result of repeated electrophotographic processing that the receptors have a very short service life. When one cycle of electrophotographic processing has been completed, any residual charges on the light-sensitive layer must be cleared before another cycle is started. However, the light-sensitive layer used in conventional photoreceptors has such a low discharge rate in the discharging step that even a large quantity of flooding light is unable to erase the electrostatic image completely, and an appreciably high residual potential is left. This residual potential increases in a cumulative manner as a result of repeated electrophotographic processing, and only after a few cycles of copying operation, the residual potential exceeds the maximum permissible level, making the photoreceptor no longer usable.

Even in such a case, certain types of photoreceptors can be put into a re-usable condition, but this requires a considerably long shutdown period or an appropriate heat treatment. Furthermore, the residual potential cannot be reduced to a sufficiently low level, and the photoreceptor will soon become inoperable again.

A photoreceptor combining an electron donating, carrier transport material with a carrier generation material is known. A method has been proposed to incorporate a very small amount of a Lewis acid within the carrier transport layer for the purposes of preventing the accumulation of residual potential and improving the ability of cyclic operation. This method is effective only with a photoreceptor using a particular kind of electron donating carrier transport material, and with photoreceptors using many other kinds of electron donating carrier materials, the method is unable to achieve sufficient prevention of residual potential buildup. This is particularly true with a photoreceptor using a polyarylalkane aromatic amino compound as a carrier transport material since the device is greatly deteriorated due to UV radiation and other factors.

Amine derivatives have been proposed for use as a charge transport material in the light-sensitive layer (Japanese Patent Application No. 8044/1981). While amine derivatives have various advantages, they also have several problems to be solved. If an amine derivative is singly used as a charge transport material (CTM), the discharge curve has a relatively long tail and the sensitivity of the photoreceptor is likely to become low in a weak electric field. Furthermore, the photoreceptor is instable against UV radiation and has the great change of being deteriorated during maintenance under a fluorescent lamp or daylight.

SUMMARY OF THE INVENTION

One object of the present invention is to provide a photoreceptor for positive charging that uses a carrier generation material which is stable against both heat and light, has high carrier generating efficiency and provides good photoconductivity over a wide wavelength range, and which can be combined with a specific carrier transport material in such a manner that the shape of surface potential curves remains essentially constant over a cyclic operation and contributes to the formation of a visible image of high quality in each cycle by reducing the "memory effect", minimizing the residual potential and extending the cycle life.

Another object of the present invention is to provide a photoreceptor preferably used for positive charging that is substantially free from electric fatigue so as to ensure a particularly long (continuous) service life, and which can be flooded with a light source in order to reduce the residual potential across the light-sensitive layer to a practically possible low level that ensures many cycles of copying operation without reactivation step. The light-sensitive layer used in the photoreceptor of the present invention has high mechanical strength and is stable against not only light and heat but also active species that are produced by corona charging and have the oxidizing action.

These objects of the present invention can be achieved by a photoreceptor having a light-sensitive layer composed of a carrier generating phase and a carrier transporting phase, said carrier generating phase containing at least one compound of formula (I) and said carrier transporting phase containing at least one compound selected from among the compounds of formulas (II), (III), (IV) and (V):

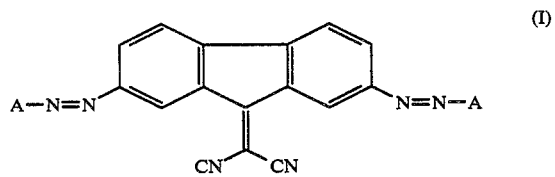

(wherein A is

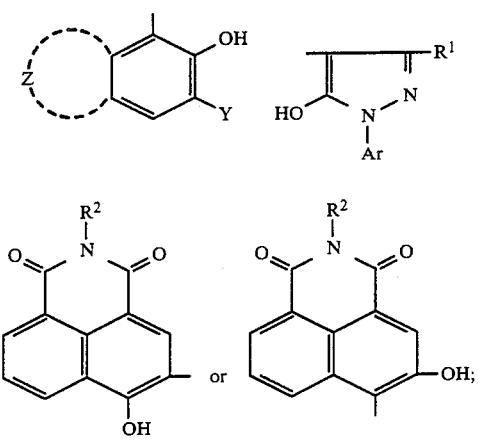

Z is the atomic group necessary for forming a substituted or unsubstituted aromatic carbon ring or a substituted or unsubstituted heterocyclic ring; Y is a hydrogen atom, a hydroxyl group, a carboxyl group or an ester thereof, a sulfo group, a carbamoyl group unsubstituted or substituted by a substituent such as a phenyl or naphthyl group which may be further substituted by, for example, a nitro, alkyl or alkoxy group, or a sulfamoyl group unsubstituted or substituted by, for example, a phenyl; $R^1$ is a hydrogen atom, an alkyl group unsubstituted or substituted by, for example, a phenyl group, an amino group unsubstituted or substituted by, for example, an acyl group (e.g. phenylcarbonyl group), a carbamoyl group unsubstituted or substituted by, for example, a phenyl group, a carboxyl group or an ester thereof, or a cyano group; Ar is an aryl group unsubstituted or substituted by, for example, an alkyl group, a halogen atom or a nitro group; and $R^2$ is an alkyl group unsubstituted or substituted by, for example, a phenyl group, an aralkyl group or an aryl group unsubstituted or substituted by, for example, a halogen atom);

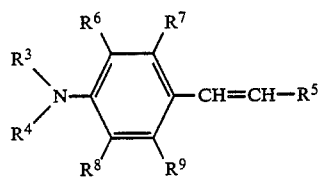

(wherein $R^3$ and $R^4$ are each a substituted or unsubstituted alkyl group, or a phenyl group, with the possible substituent being an alkyl group, an alkoxy group or a phenyl group; $R^5$ is a substituted or unsubstituted phenyl group, a naphthyl group, an anthryl group, a fluorenyl group or a heterocyclic group, with the possible substituent being an alkyl group, an alkoxy group, a halogen atom, a hydroxy group, a phenyl group, an amino group, an acyl group or an alkenyl group); $R^6$ to $R^9$ are each a hydrogen atom, aa halogen atom, an alkyl group, an alkoxy group or an alkylamino group);

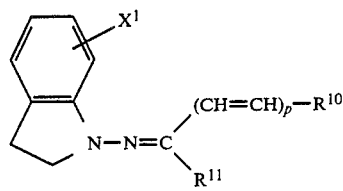

(wherein $R^{10}$ is an aryl or heterocyclic group unsubstituted or substituted by, for example, an amino, alkoxy, phenyl or alkyl group, $R^{11}$ is a hydrogen atom, a substituted or unsubstituted alkyl group, or a substituted or unsubstituted aryl group; $X^1$ is a hydrogen atom, a halogen atom, an alkyl group, a substituted amino group or an alkoxy group; p is an integer of 0 or 1);

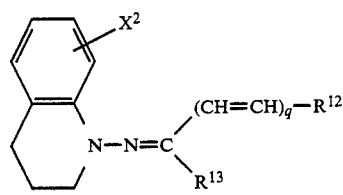

(wherein $R^{12}$ is an aryl or heterocyclic group unsubstituted or substituted by, for example, an amino, alkoxy, phenyl or alkyl group; $R^{13}$ is a hydrogen atom, a substituted or unsubstituted alkyl group, or a substituted or unsubstituted aryl group; $X^2$ is a hydrogen atom, a halogen atom, an alkyl group, a substituted amino group, an alkoxy group or a cyano group; q is an integer of 0 or 1);

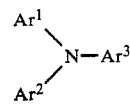

(wherein $Ar^1$ and $Ar^2$ are each a substituted or unsubstituted phenyl group, with the possible substituent being a halogen atom, an alkyl group, a nitro group or an alkoxy group; $Ar^3$ is a substituted or unsubstituted phenyl group, a naphthyl group, an anthryl group, a fluorenyl group or a heterocyclic group, with the possible substituent being an alkyl group, an alkoxy group, a halogen atom, a hydroxy group, an aryloxy group, an aryl group, an amino group, a nitro group, a piperidino group, a morpholino group, a naphthyl group, an anthryl group or a substituted amino group, provided that the possible substituent on the last mentioned amino group is an acyl group, an alkyl group, an aryl group or an aralkyl group).

DETAILED DESCRIPTION OF PREFERRED EMBODIMENTS

Figure 1:
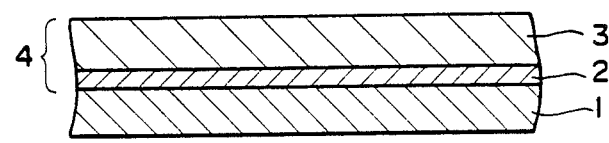
FIGS. 1 to 7 are partial sectional views showing various embodiments of the photoreceptor according to the present invention and FIG. 8 is a graph showing the photosensitivity cure of a carrier generation material.

The term "phase" as used herein means not only a layer but also the case wherein a carrier generation material is in contact with a carrier transport material within a single phase or the case wherein said two materials are dispersed within a binder.

As will become apparent from the Examples given later in this specification, the present invention provides a photoreceptor that is stable against both light and heat, which has good characteristics in respect of charge retention, sensitivity and residual potential, and which is highly durable and can be used repeatedly without experiencing a change in its characteristics due to fatigue.

The superior characteristics of the photoreceptor of the present invention are attributable to the function-separated type light-sensitive layer wherein the excellent carrier generating ability of the bisazo compound of formula (I) is combined with at least one carrier transport material selected from among the styryl compound of formula (II), hydrazone compound of formula (III) or formula (IV), and the amine derivative of formula (V).

Among the bisazo compounds of formula (I). those which contain a carbazole group as represented by formula (VI) are particularly effective;

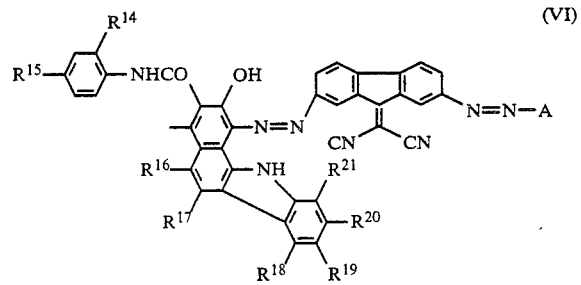

(wherein $R^{14}$ and $R^{15}$ are each an alkyl group an alkoxy group or an aryl group; $R^{16}$ to $R^{21}$ are each a hydrogen atom, a halogen atom, an alkyl group, an alkoxy group, an amino group, a hydroxy group or an aryl group; A is the same as the group as defined in formula (I), preferably a group represented by the following formula:

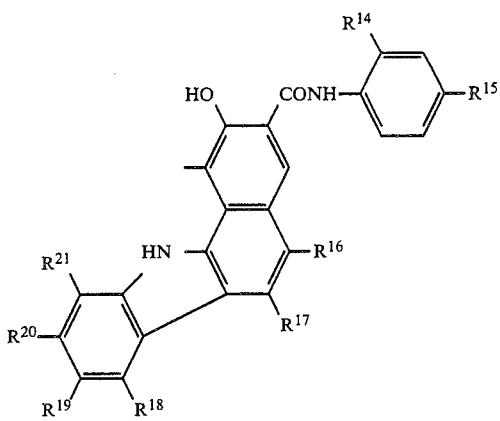

wherein $R^{14}$ and $R^{15}$ and $R^{16}$ to $R^{21}$ are as defined above.

It is assumed that the intramolecular carbazole group contributes to the high sensitivity of the bisazo compounds of formula (VI) to light in the long wavelength range. The combination of this carbazole group with the intramolecular carbamoyl moiety acts as an effective coupler and allows the photoreceptor to exhibit good sensitivity characteristics over a broad wavelength band and to permit the use of a semiconductor laser as a light source.

Several examples of the bisazo compounds (I) that may be effectively used in the present invention are listed below. It should of course be understood that the bisazo compounds that can be used in the present invention are by no means limited to these examples.

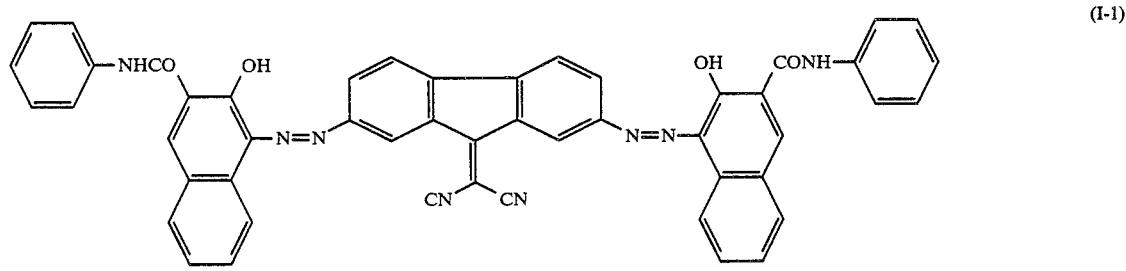

(I-1)

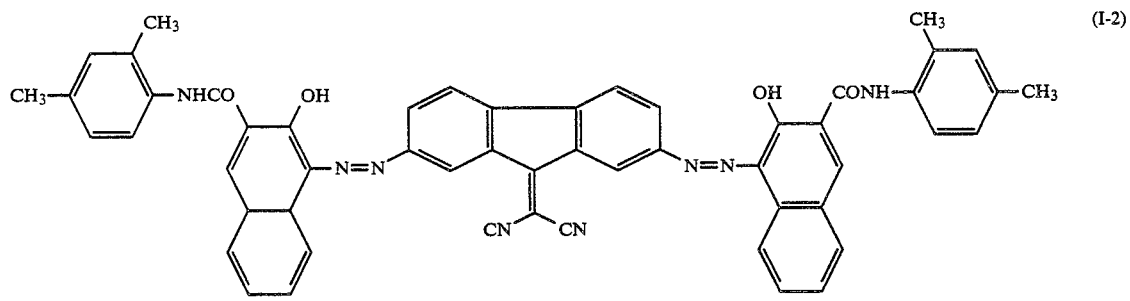

(I-2)

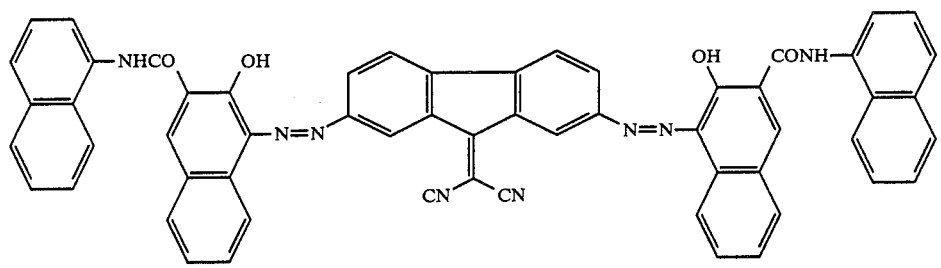
(I-3)
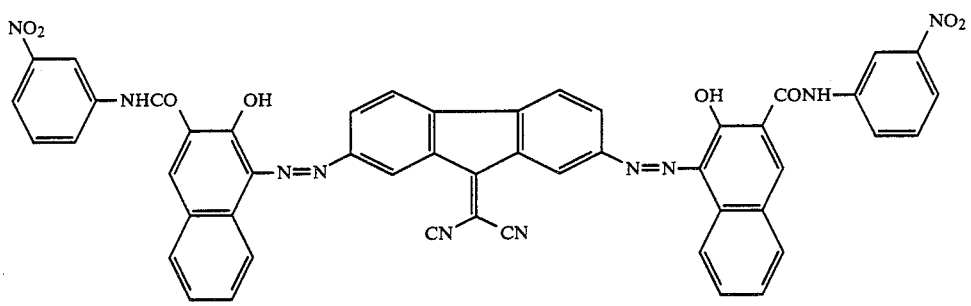
(I-4)
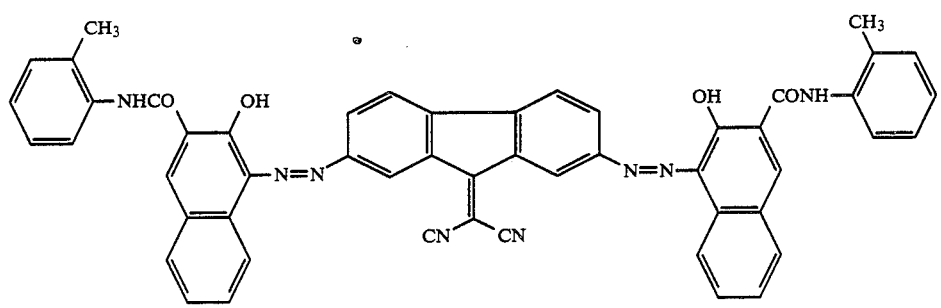
(I-5)
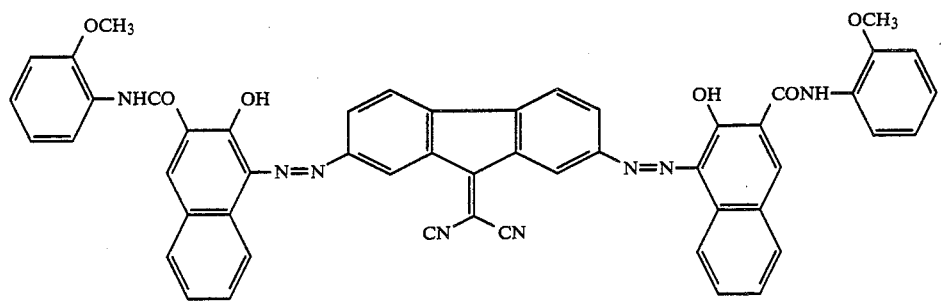
(I-6)
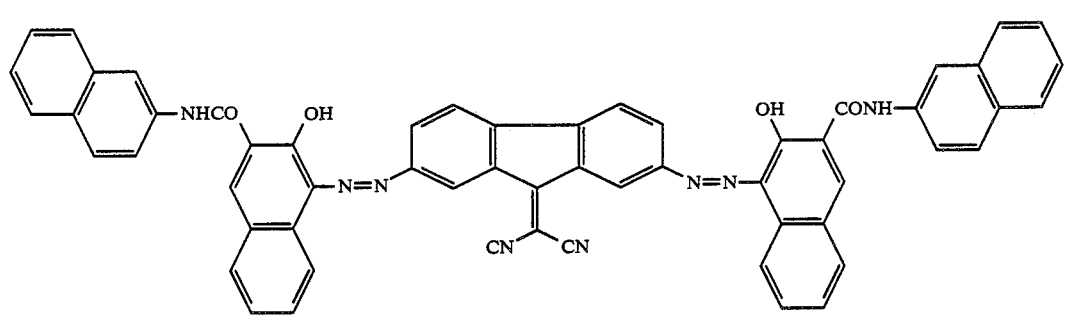
(I-7)

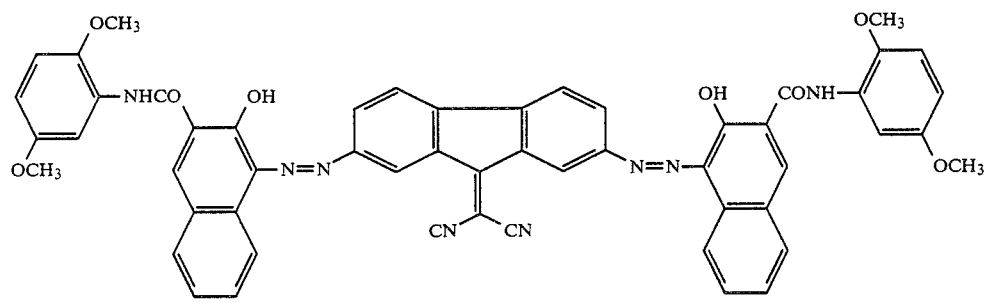
(I-8)
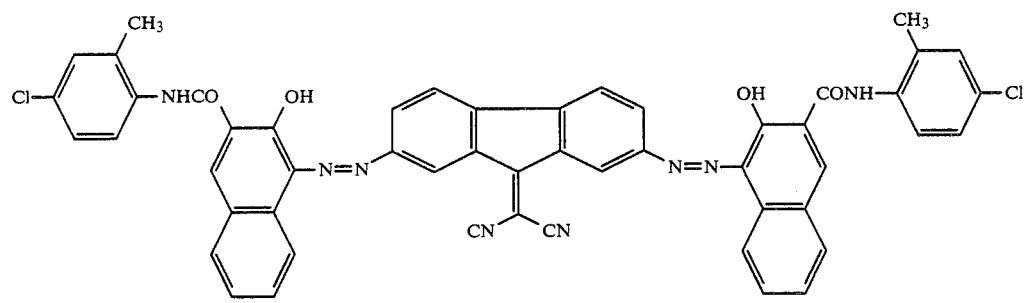
(I-9)
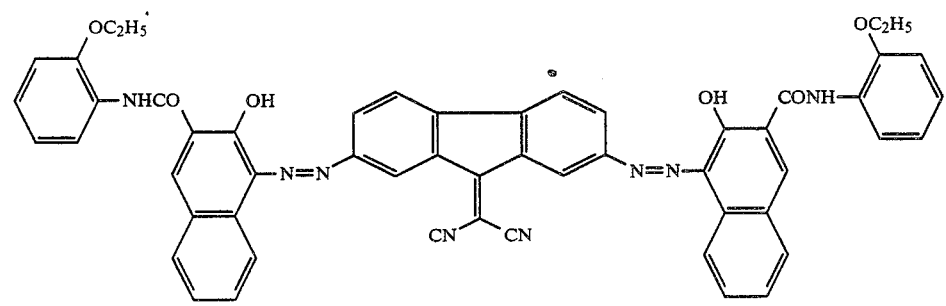
(I-10)
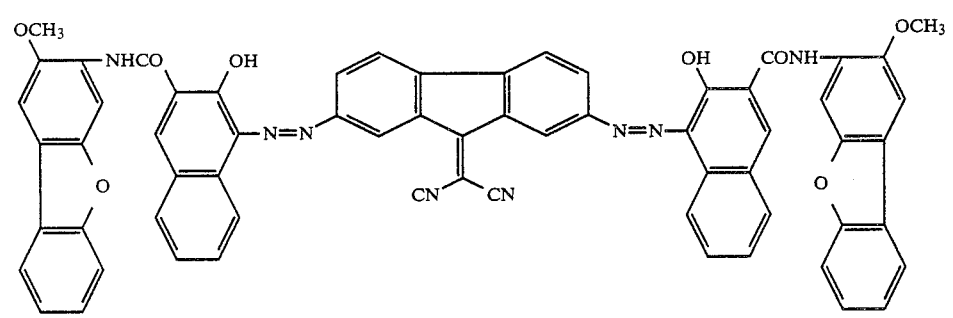
(I-11)
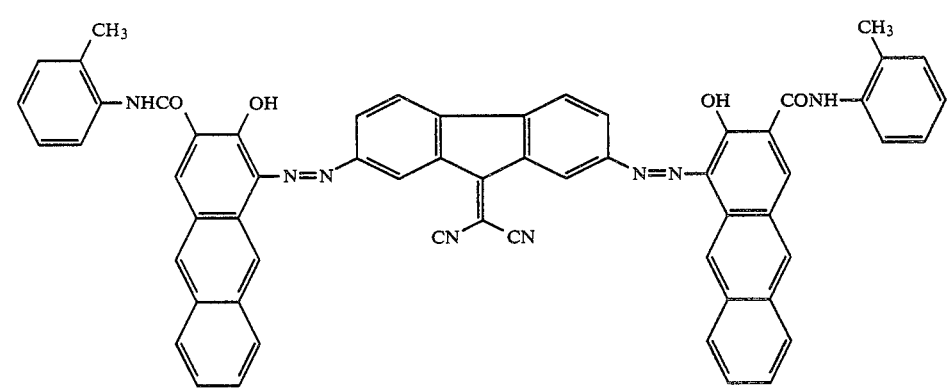
(I-12)

-continued
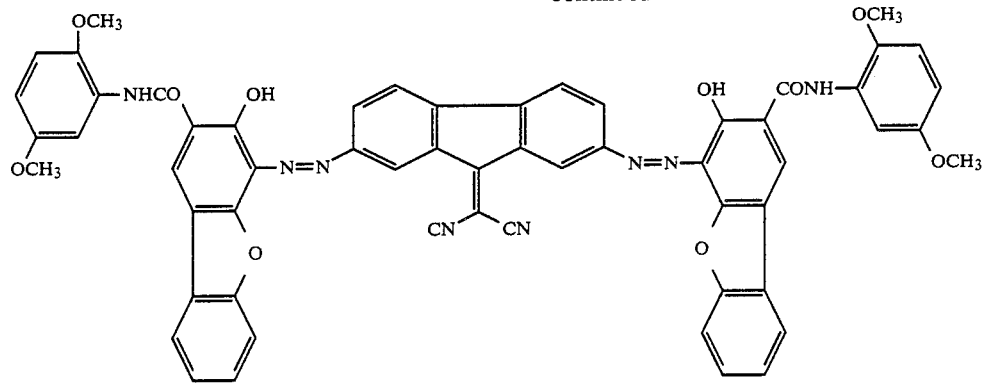
(I-13)
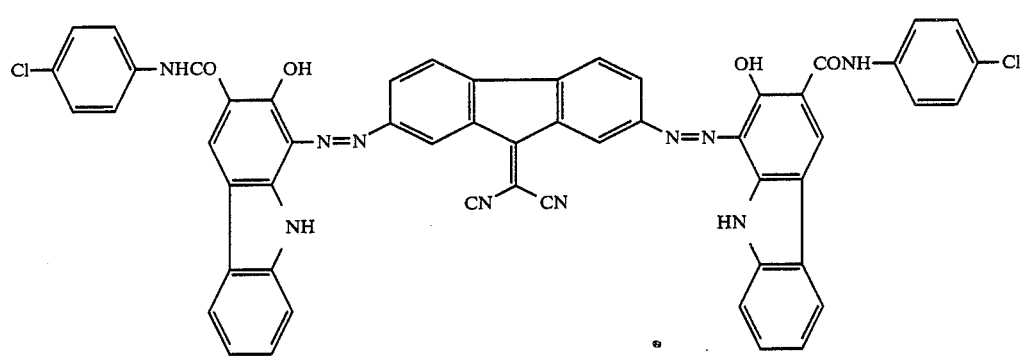
(I-14)
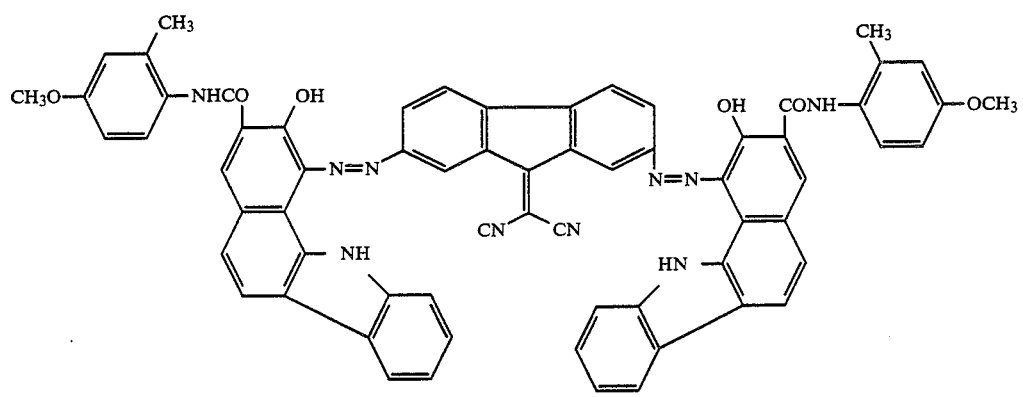
(I-15)
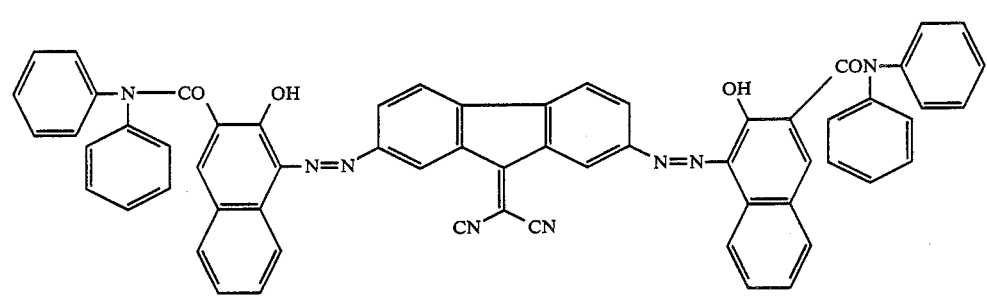
(I-16)
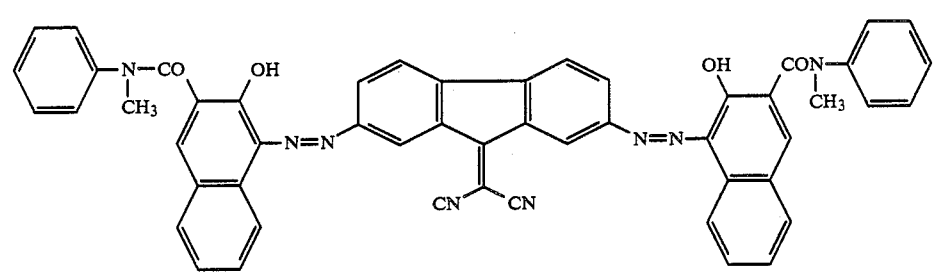
(I-17)

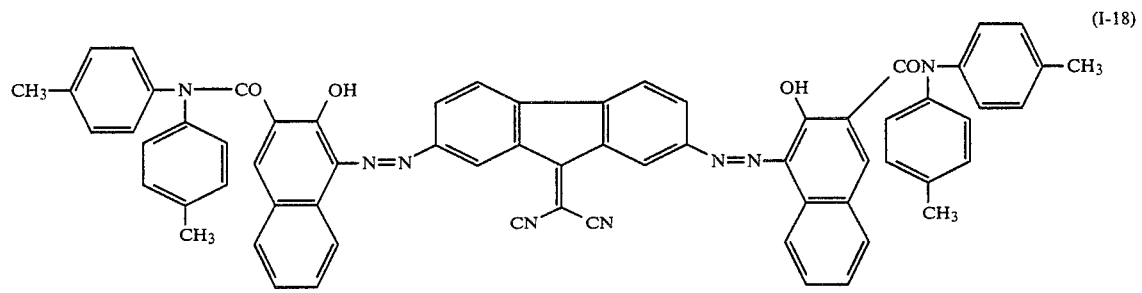
(I-18)
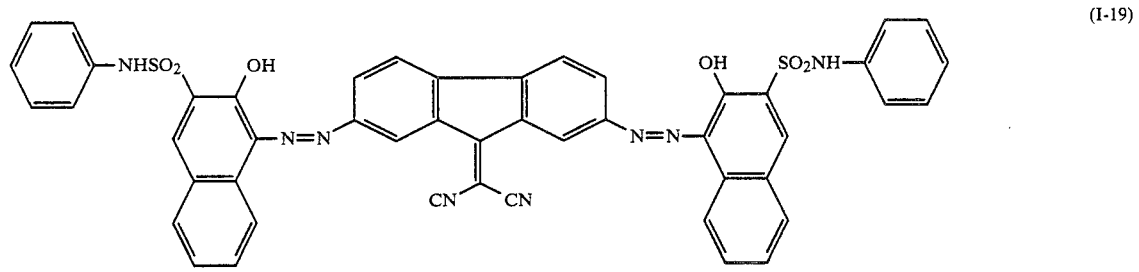
(I-19)
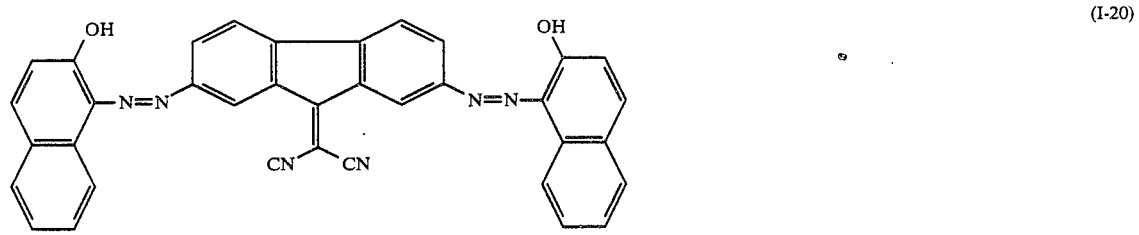
(I-20)
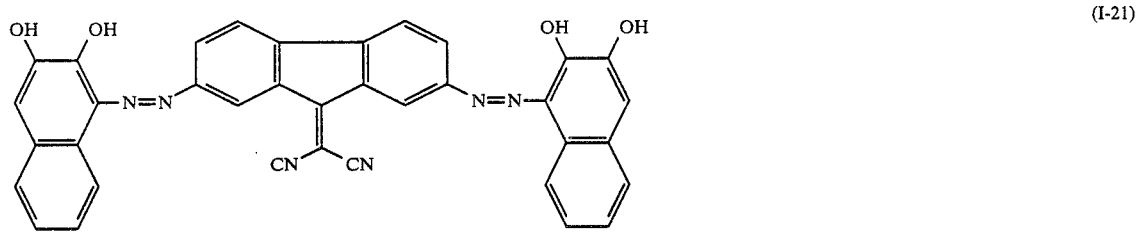
(I-21)
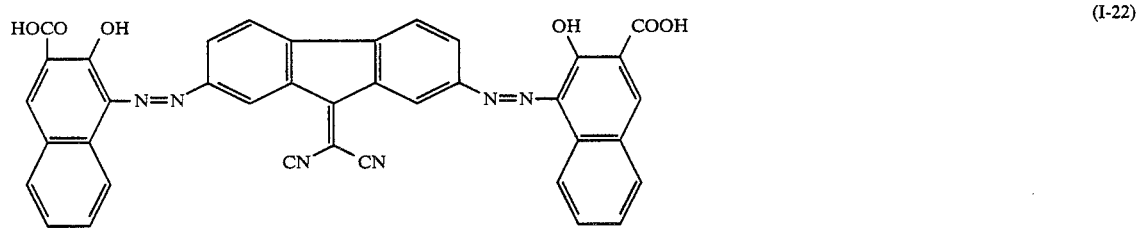
(I-22)
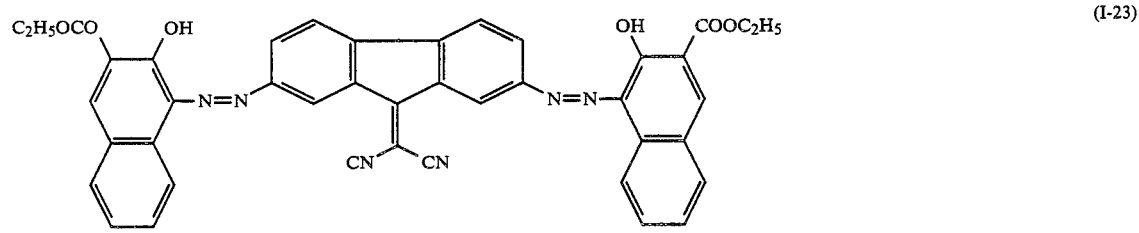
(I-23)

-continued
(I-24)
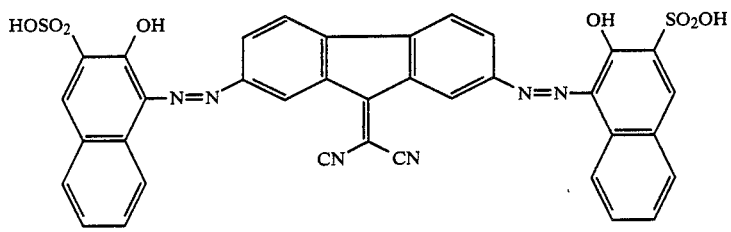
(I-25)
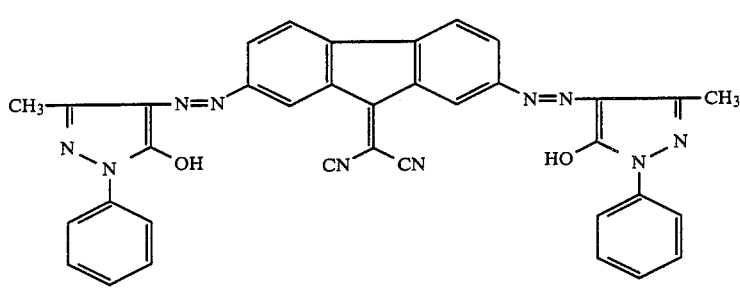
(I-26)
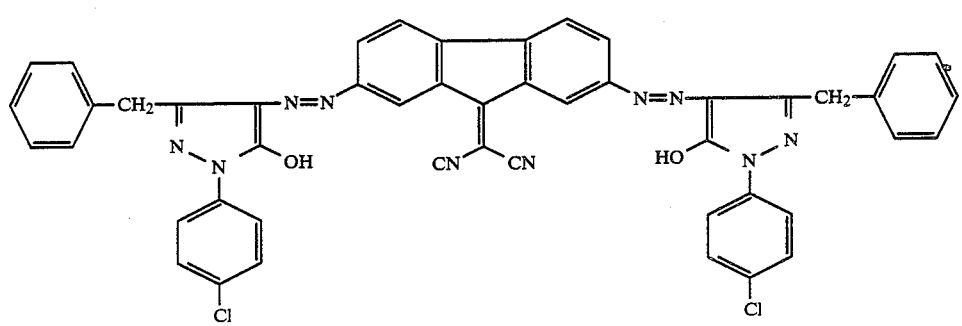
(I-27)
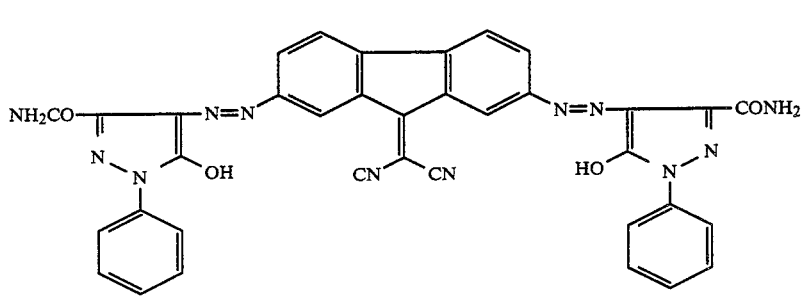
(I-28)
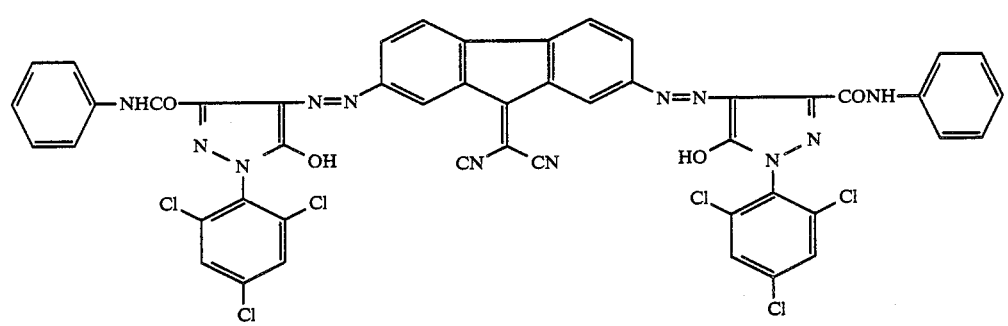

-continued
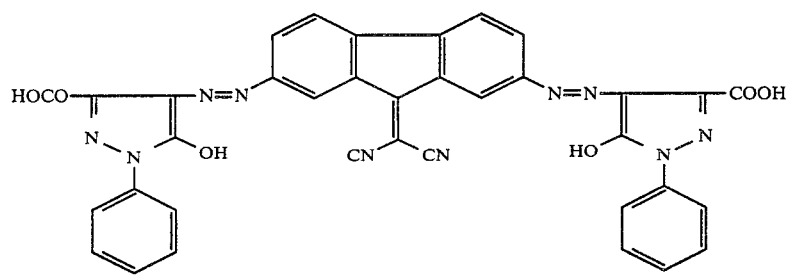
(I-29)
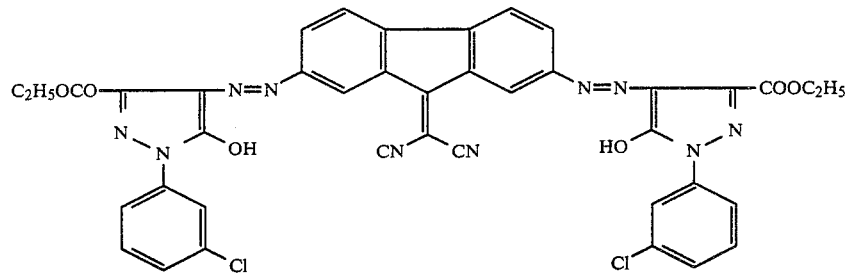
(I-30)
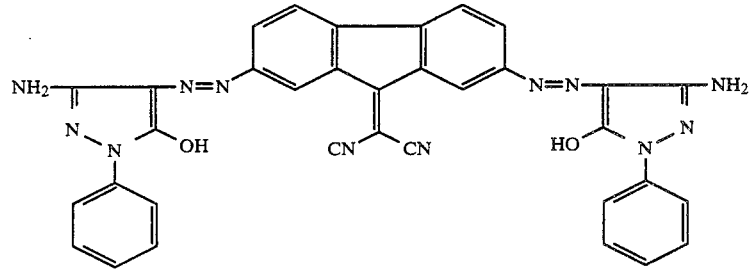
(I-31)
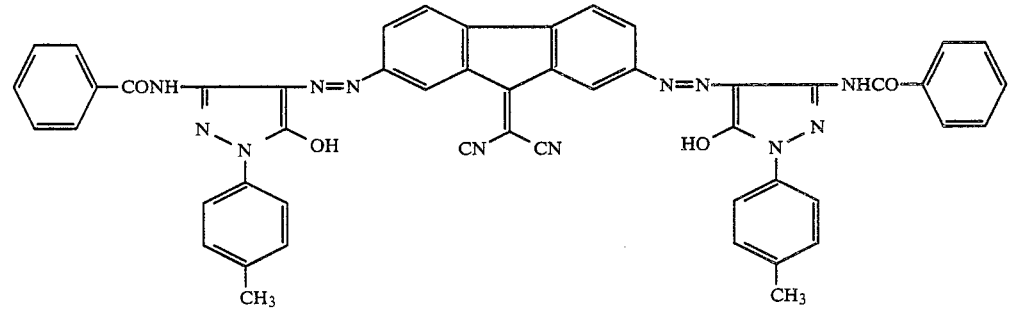
(I-32)
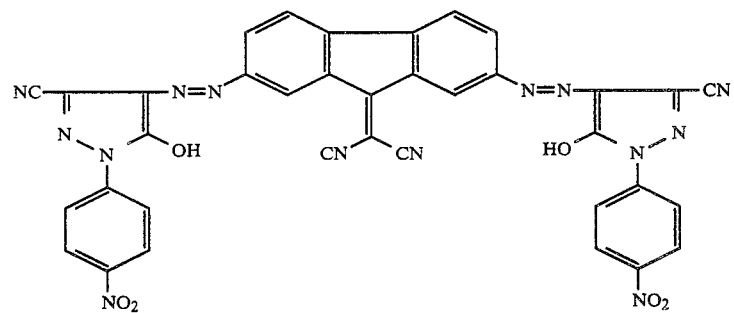
(I-33)

-continued
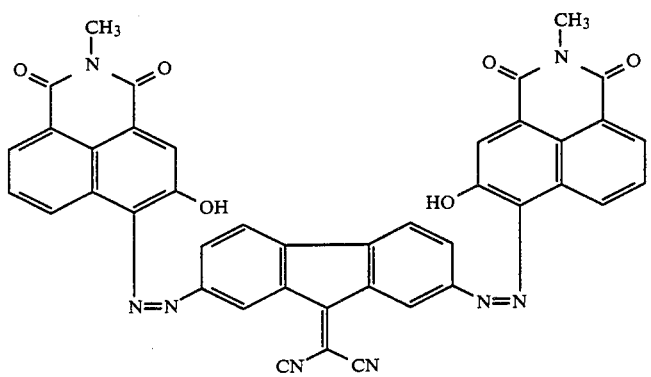
(I-34)
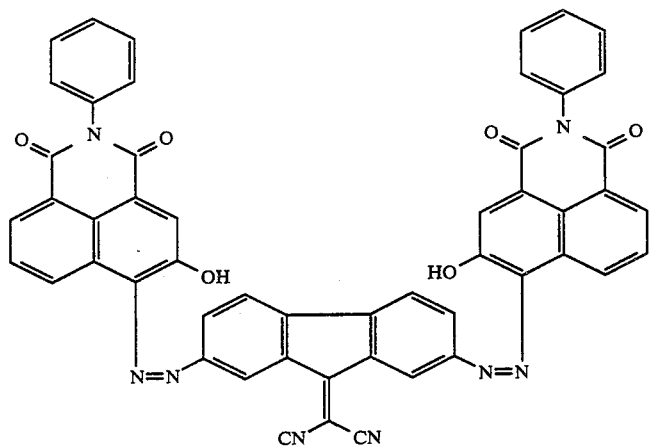
(I-35)
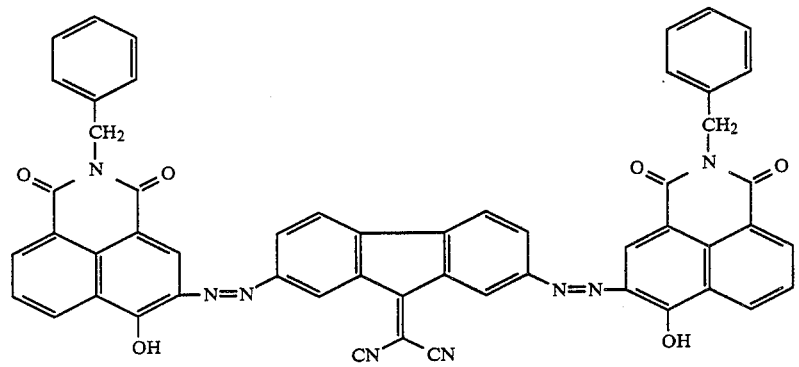
(I-36)
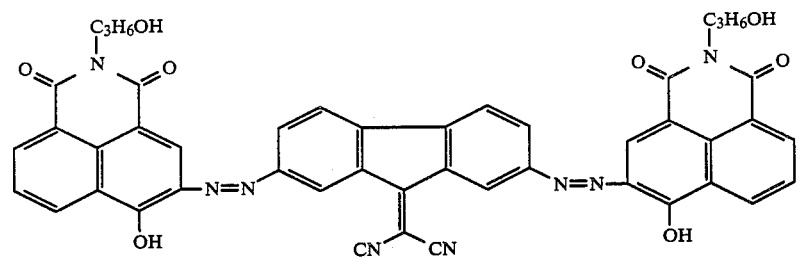
(I-37)

-continued
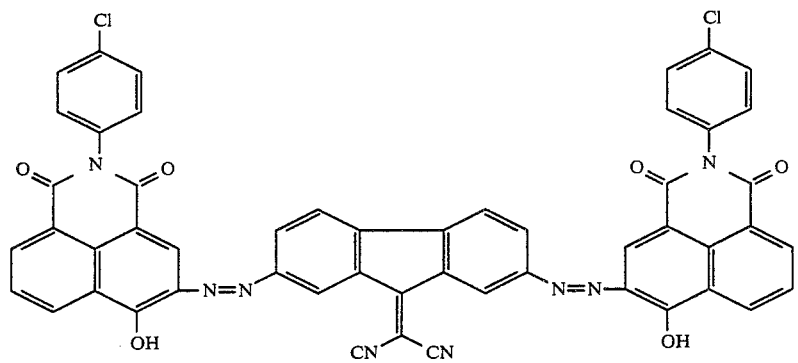 (I-38)
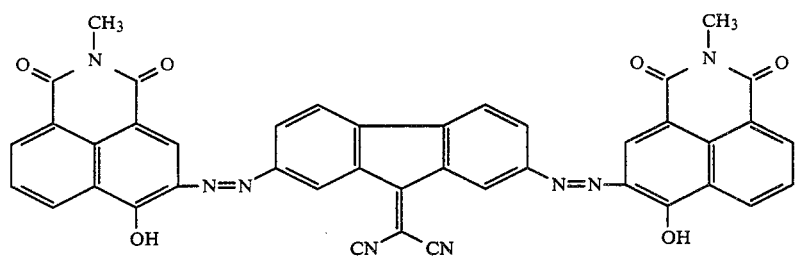 (I-39)
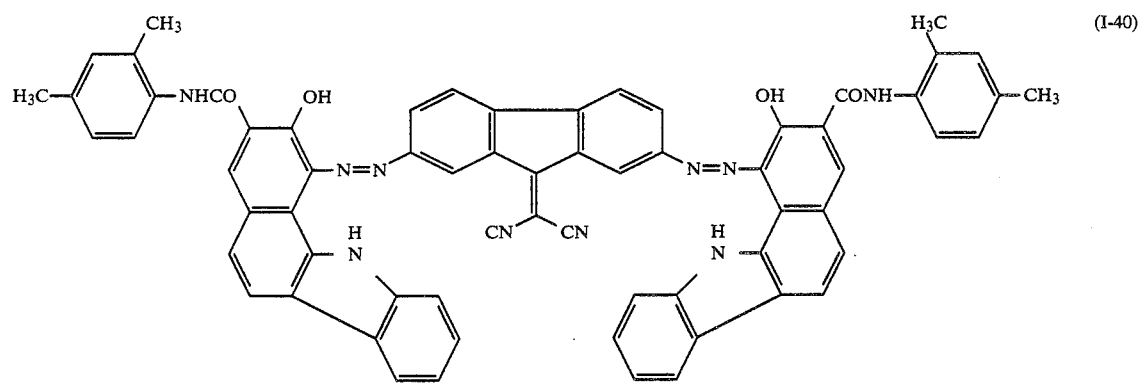 (I-40)
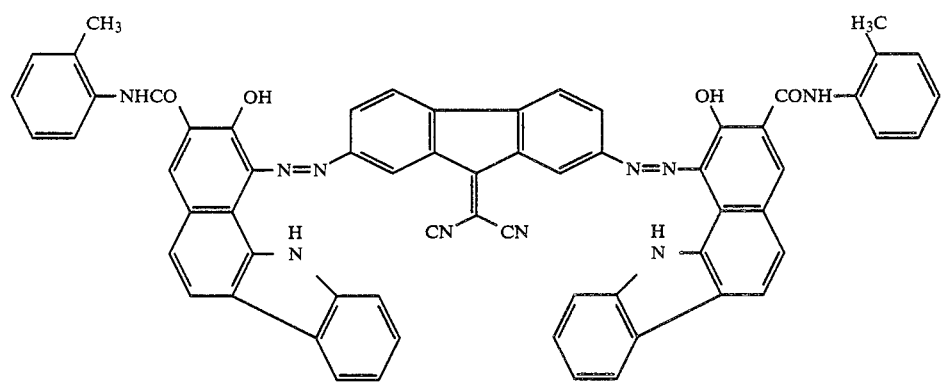 (I-41)

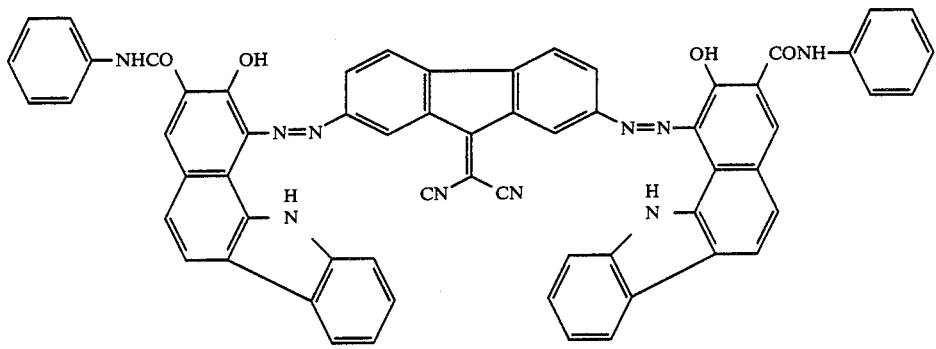

(I-42)

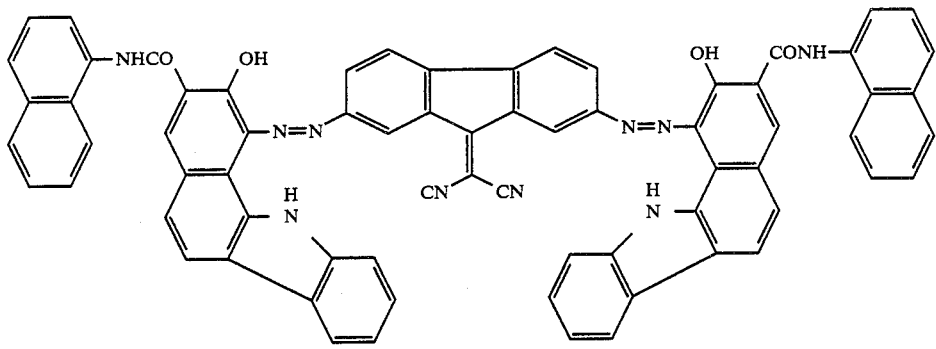

(I-43)

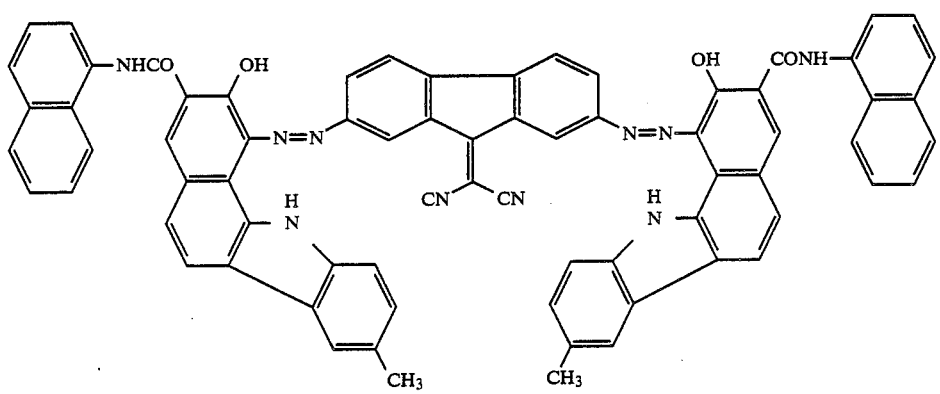

(I-44)

A method for synthesizing bisazo compound (I-1) is shown below.

Synthesis 1

First, 2,7-dinitro-9-fluorenone and malononitrile are subjected to dehydrative condensation by a known method (see, for example, J. Org. Chem., 30, 644, 1965) to form 2,7-dinitro-9-dicyanomethylidenefluorenone. This compound is reduced with tin and hydrochloric acid to obtain 2,7-diamino-9-dicyanomethylidenefluorenone dihydrochloride. A portion (3.31 g or 0.01 mol) of this compound is dispersed in hydrochloric acid (100 ml). While the dispersion is cooled at 5° C. under agitation, an aqueous solution of sodium nitrite (1.4 g) in water (20 ml) is added dropwise. After completion of the dropwise addition, the mixture is agitated for another one hour under cooling and filtered. To the resulting filtrate ammonium hexafluorophosphate (10 g) is added, and the crystal of tetrazonium hexafluorophosphate is recovered by filtration. This crystal is dissolved in N,N-dimethylformamide (200 ml) to obtain a liquid dropper for use in the subsequent coupling reaction.

2-Hydroxy-3-naphthoic acid anilide (Naphthol AS, 5.27 g or 0.02 mol) is dissolved in N,N-dimethylformamide (200 ml). To the resulting solution, triethanolamine (5.5 g) is added. While the mixture is vigorously agitated under cooling at 5° C., the previously prepared liquid dropper is added dropwise. After completion of the dropwise addition, the mixture is stirred for one hour under cooling, then for another 2 hours at room temperature. The resulting crystal is recovered by filtration and washed twice with 1,000 ml of N,N-dimethylformamide, then with 1000 ml of acetone twice. The washed crystal is dried to obtain 6.70 g of a blue compound (yield: 83.0%).

This blue compound is identified as the end compound (I-1) because its IR spectrum has an absorption peak at $\nu = 1680$ cm$^{-1}$ due to the C=O bond of amide, and the found values in an elemental analysis are in good agreement with the theoretical. The results of the elemental analysis for $C_{50}H_{30}N_8O_4$ are shown below:
|  | C | H | N |
|---|---|---|---|
| Found (%) | 74.61 | 3.70 | 13.67 |
| Calculated (%) | 74.43 | 3.74 | 13.89 |
Specific examples of the styryl compound of formula (II) are given below, but it should be understood that the scope of the present invention is by no means limited to these examples:
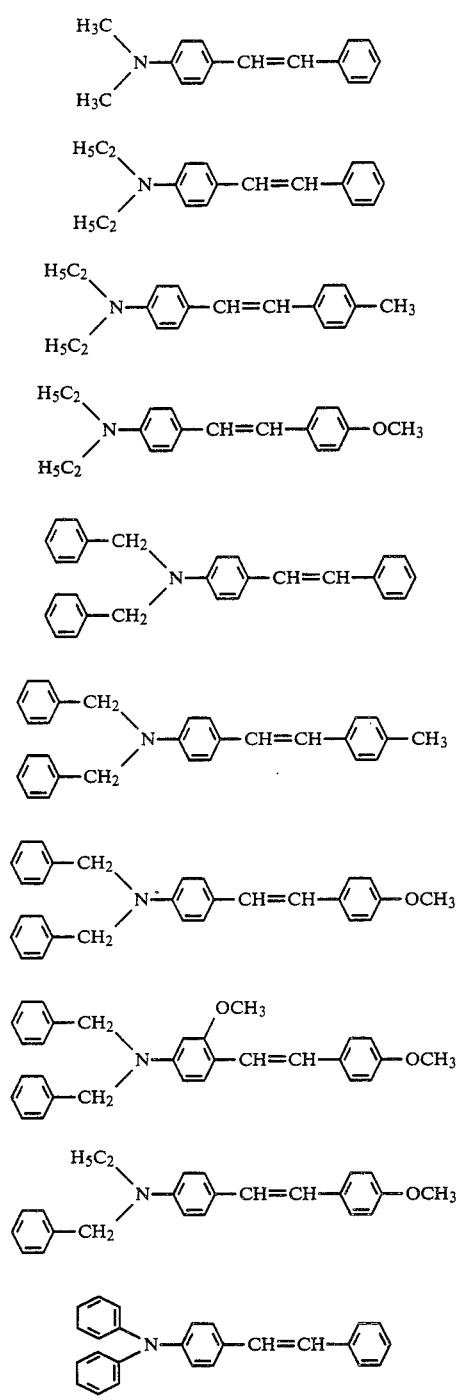
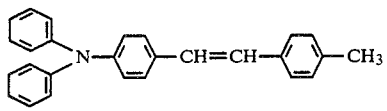
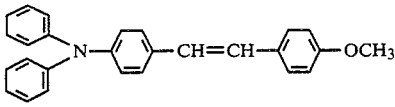
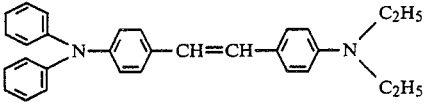
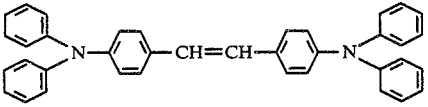
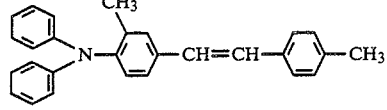
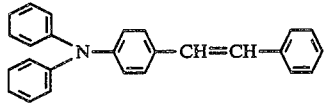
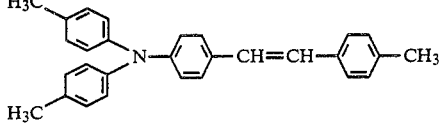
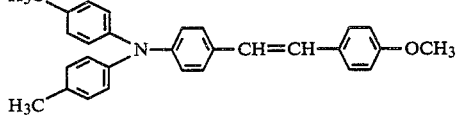
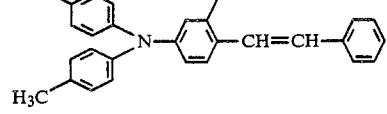
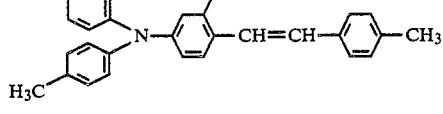
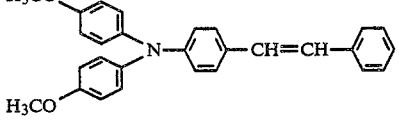

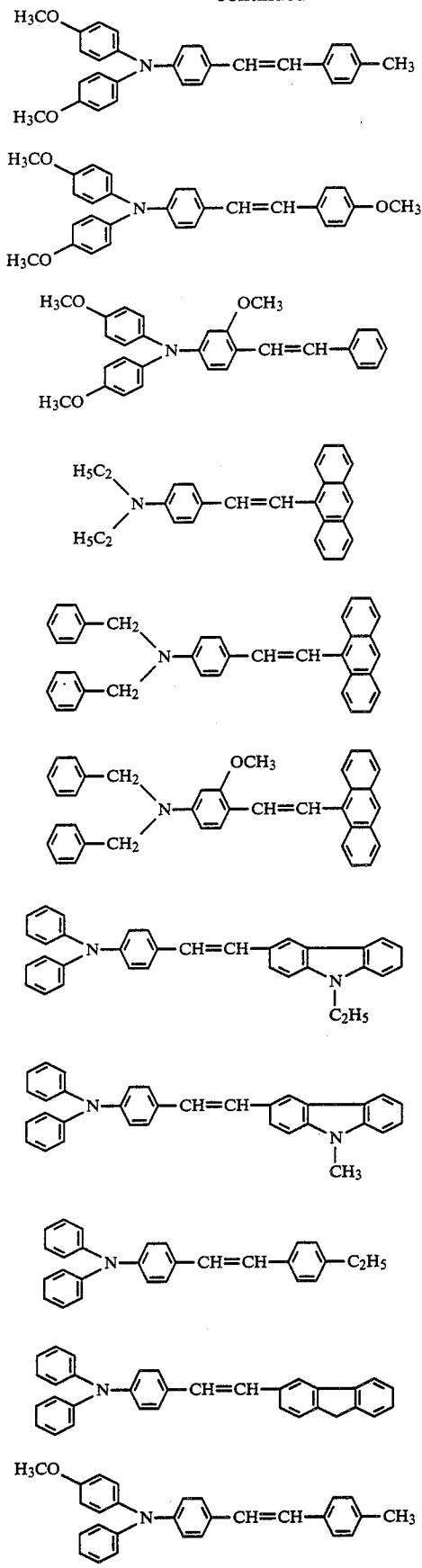
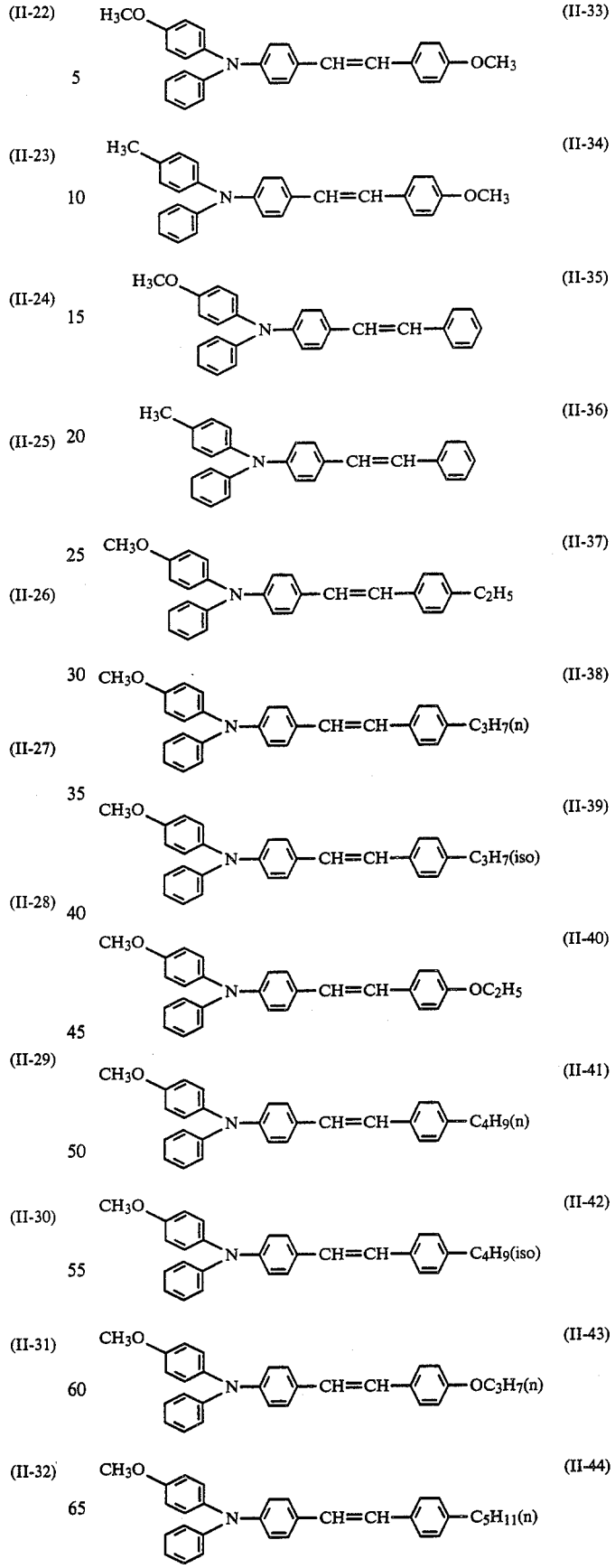

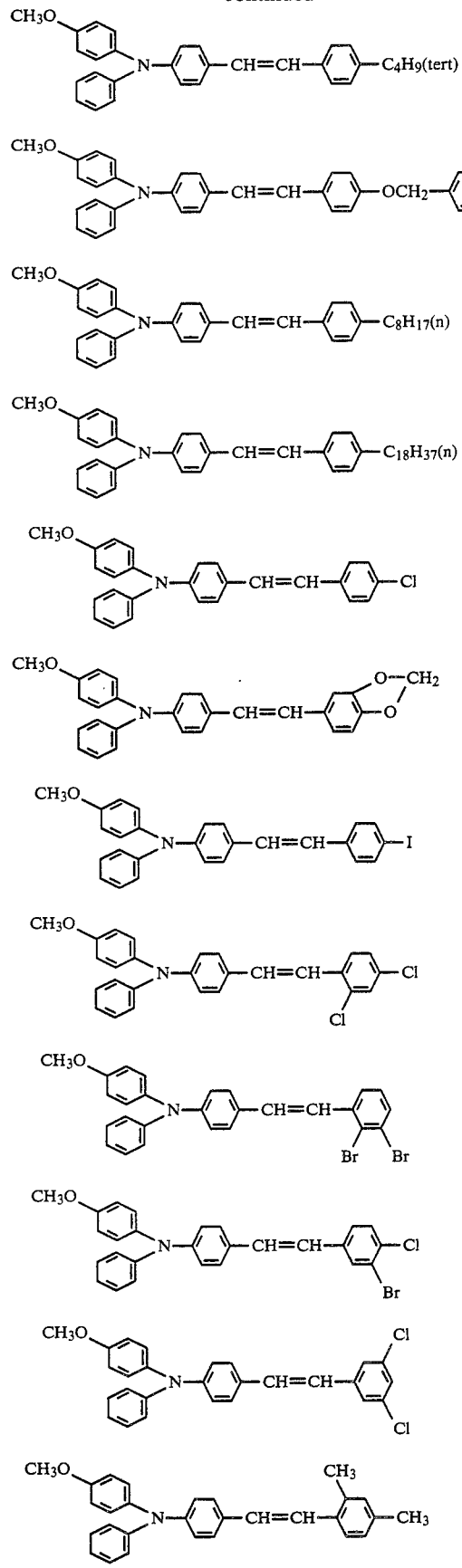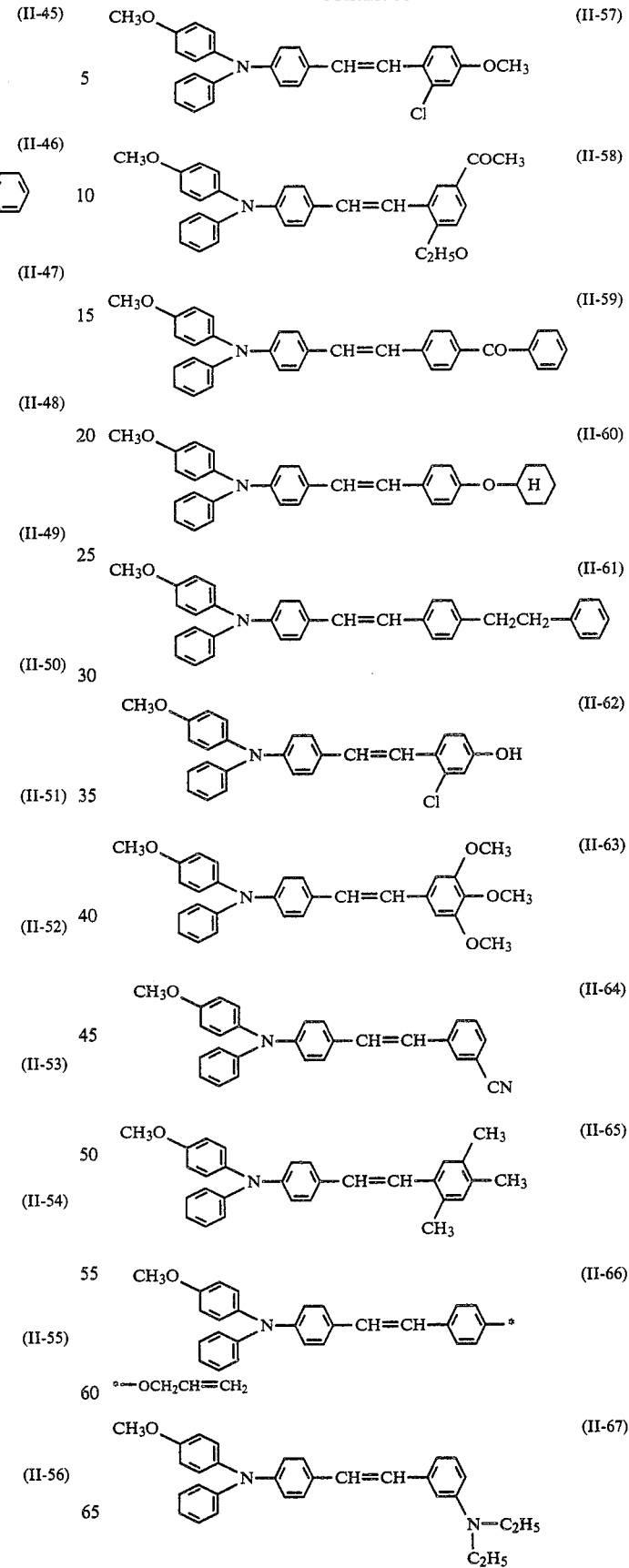

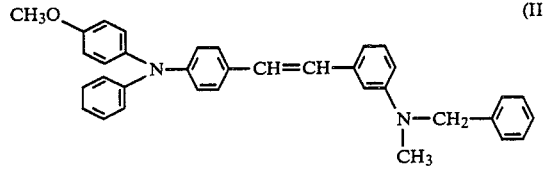 (II-68)
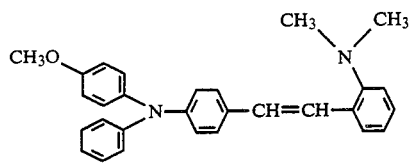 (II-69)
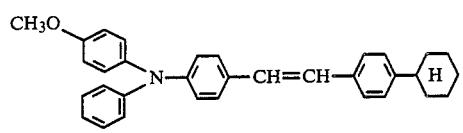 (II-70)
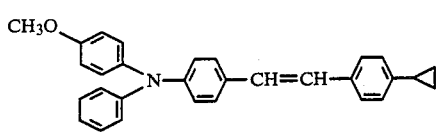 (II-71)
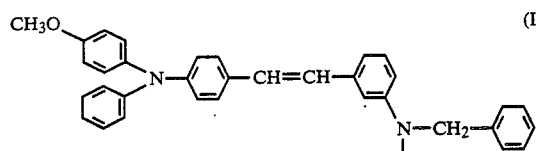 (II-72)
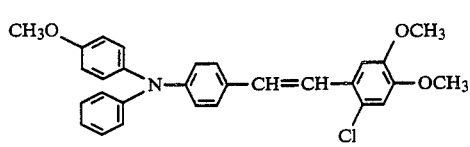 (II-73)
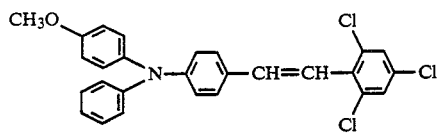 (II-74)
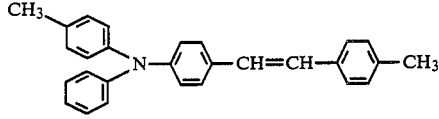 (II-75)
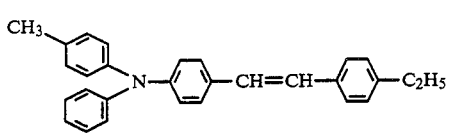 (II-76)
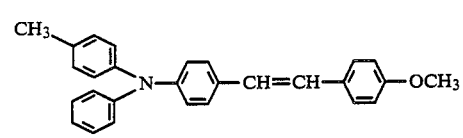 (II-77)
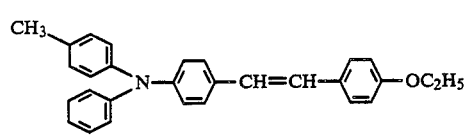 (II-78)
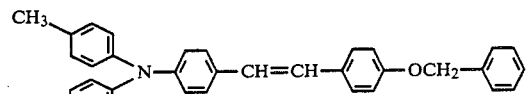 (II-79)
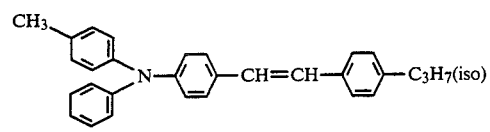 (II-80)
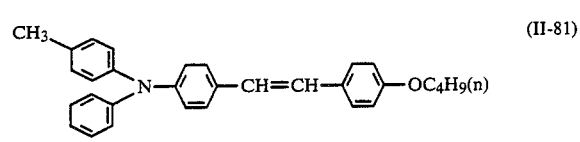 (II-81)
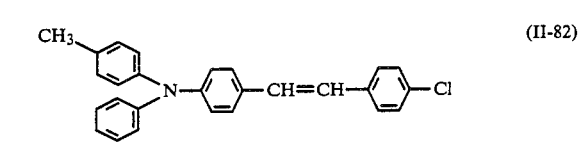 (II-82)
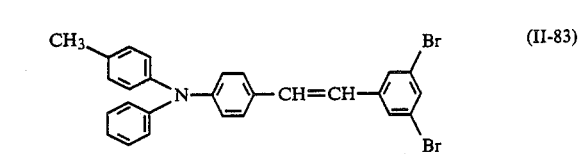 (II-83)
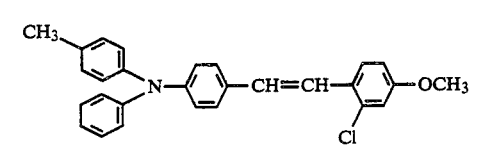 (II-84)
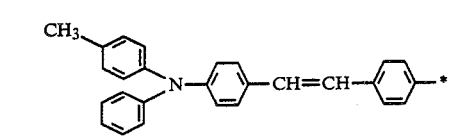 (II-85)
 *—CH₂CH₂CH₂CN
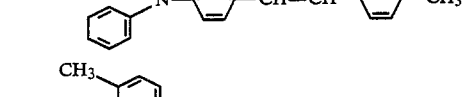 (II-86)
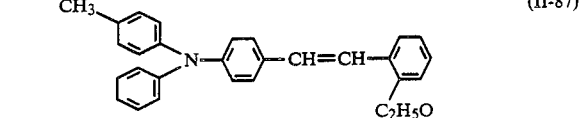 (II-87)
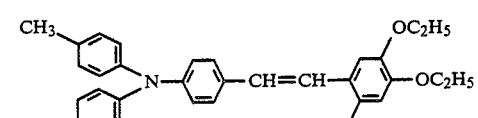 (II-88)
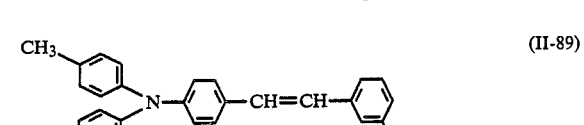 (II-89)

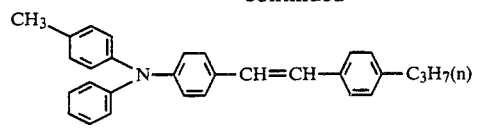 (II-90)
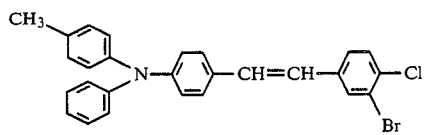 (II-91)
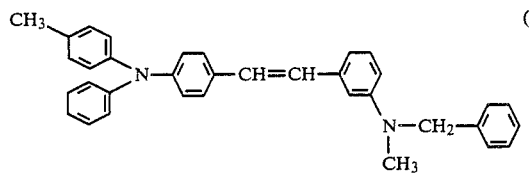 (II-92)
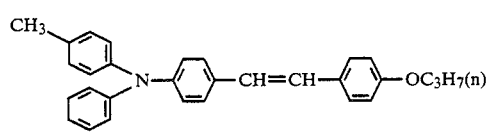 (II-93)
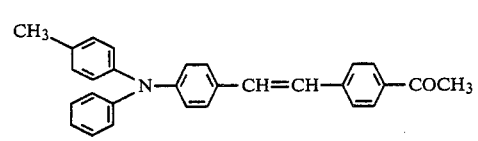 (II-94)
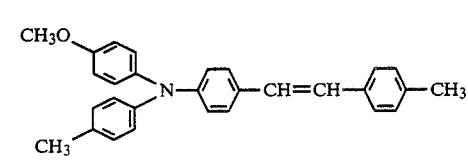 (II-95)
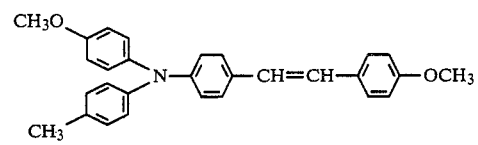 (II-96)
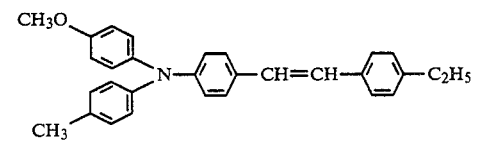 (II-97)
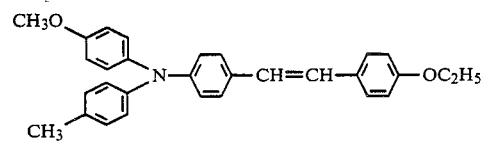 (II-98)
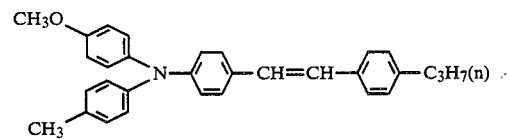 (II-99)
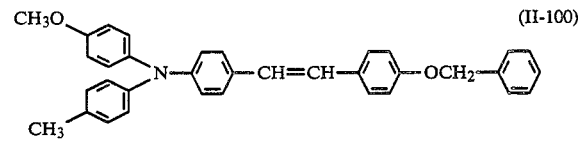 (II-100)
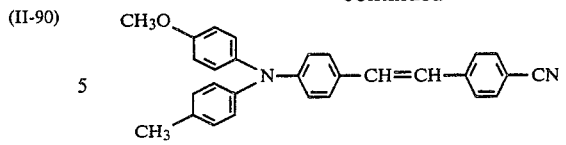 (II-101)
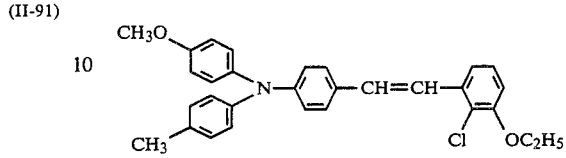 (II-102)
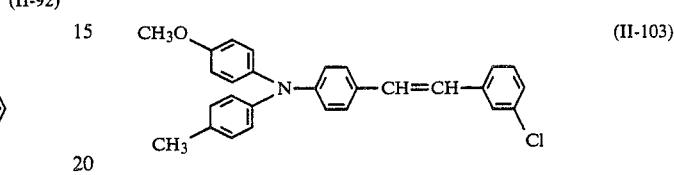 (II-103)
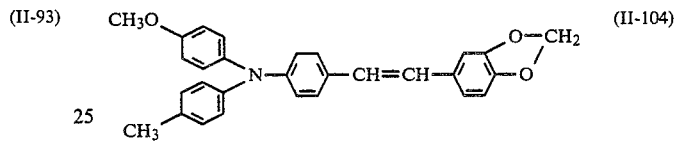 (II-104)
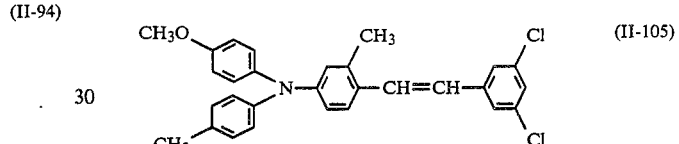 (II-105)
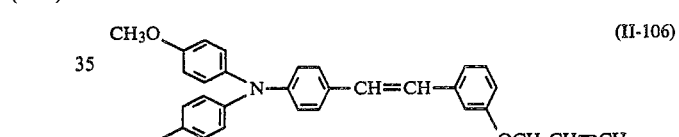 (II-106)
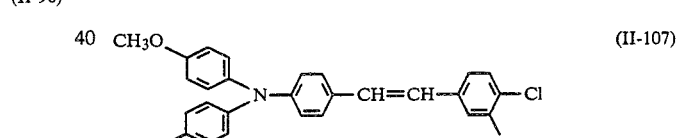 (II-107)
 (II-108)
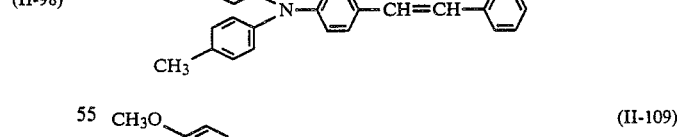 (II-109)
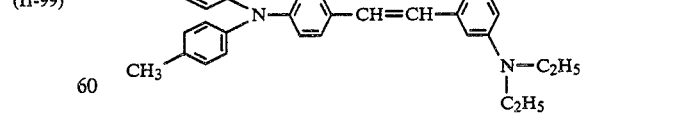 (II-110)

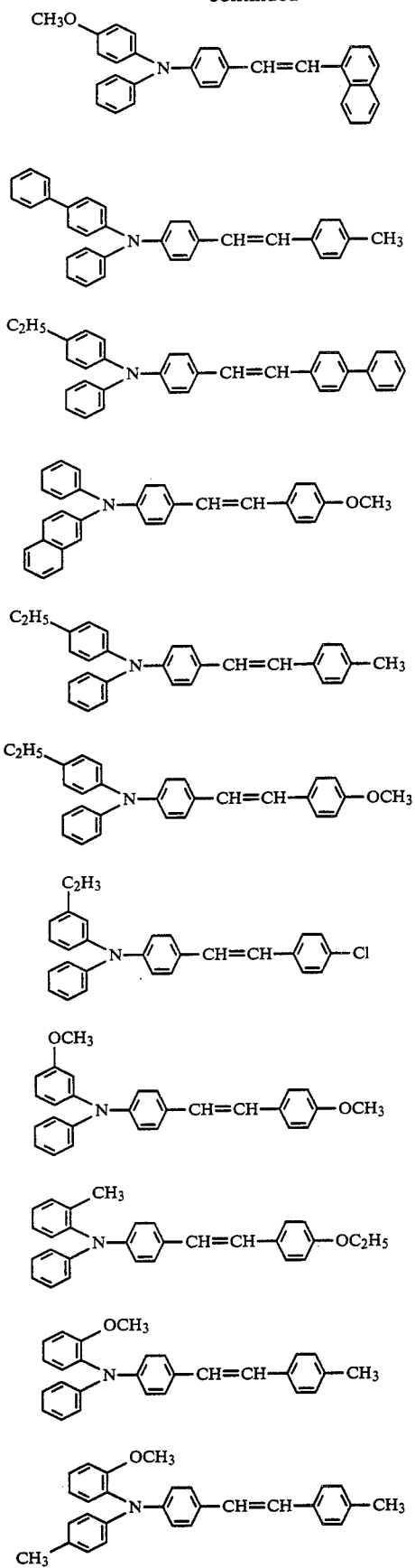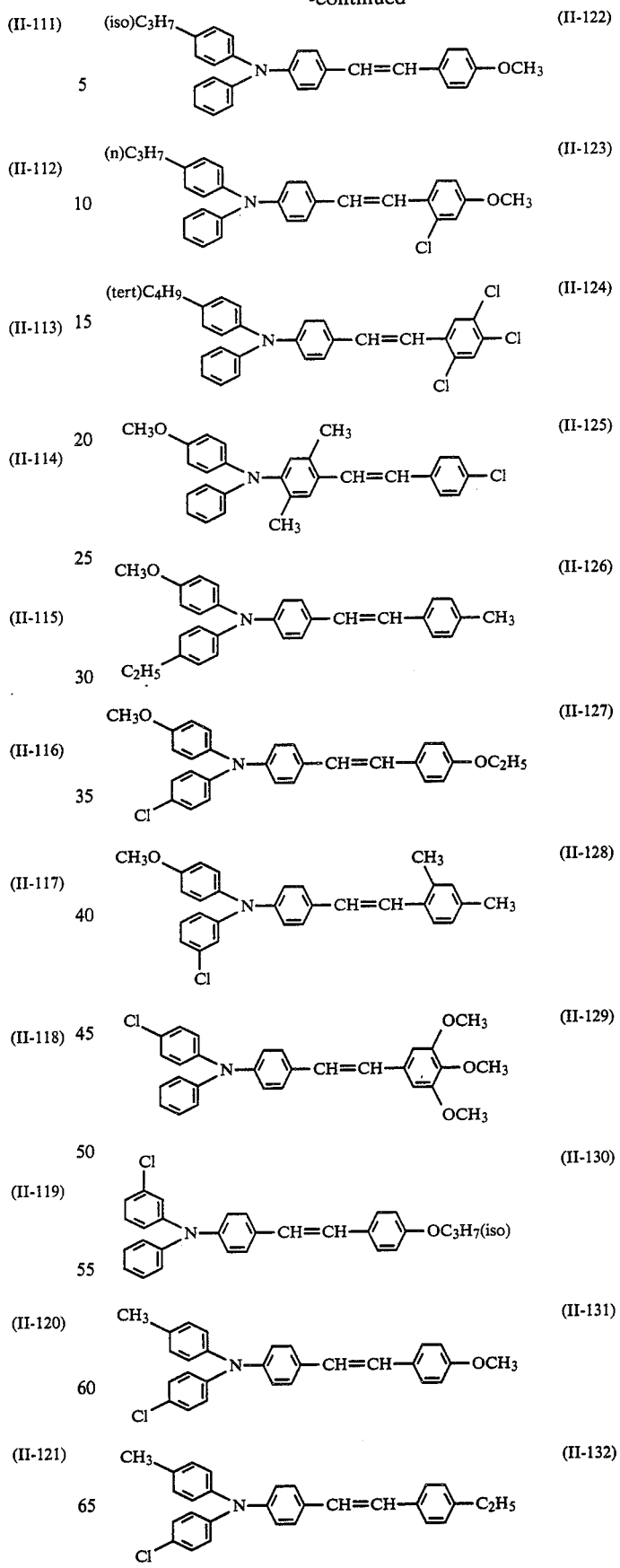

-continued
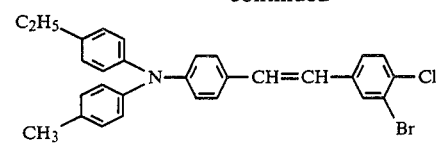 (II-133)
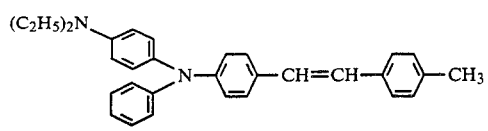 (II-134)
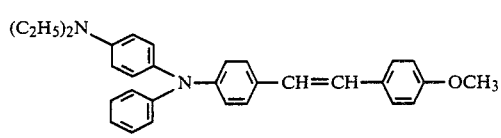 (II-135)
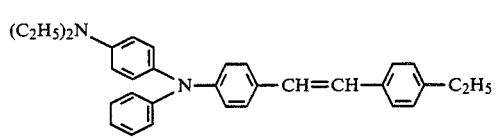 (II-136)
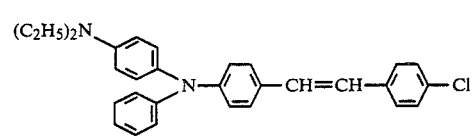 (II-137)
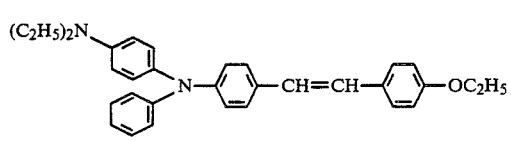 (II-138)
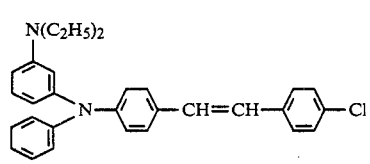 (II-139)
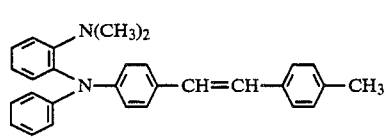 (II-140)
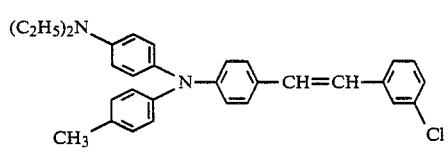 (II-141)
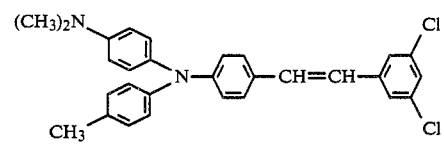 (II-142)
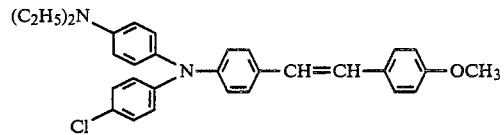 (II-143)
-continued
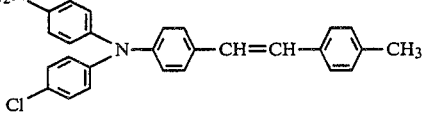 (II-144)
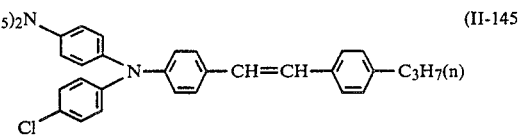 (II-145)
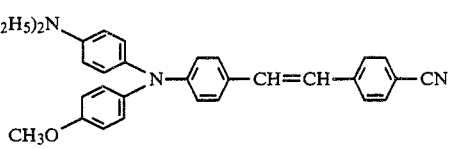 (II-146)
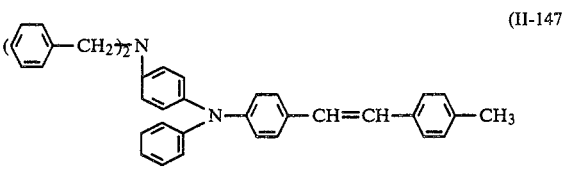 (II-147)
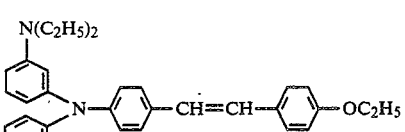 (II-148)
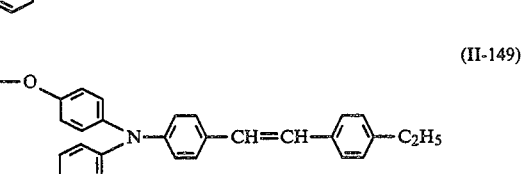 (II-149)
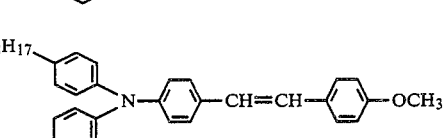 (II-150)
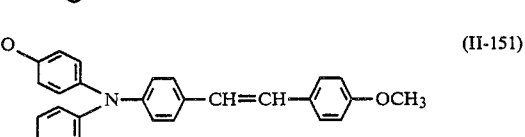 (II-151)
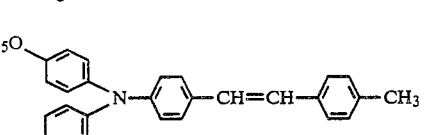 (II-152)
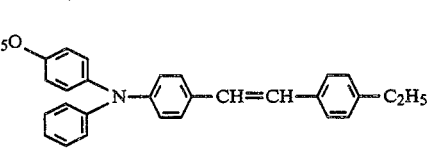 (II-153)
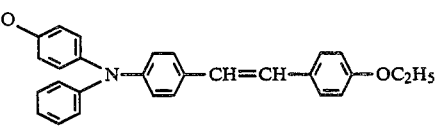 (II-154)

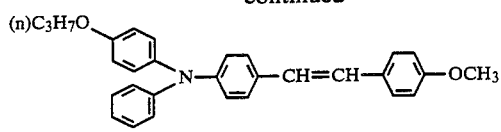 (II-155)
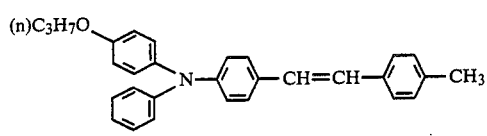 (II-156)
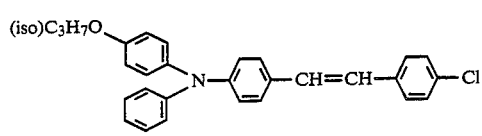 (II-157)
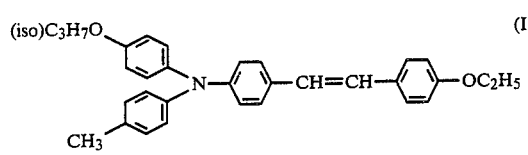 (II-158)
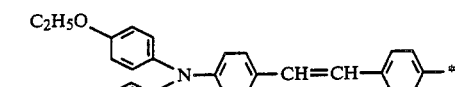 (II-159)
*—CH₂CH₂CH₂CN
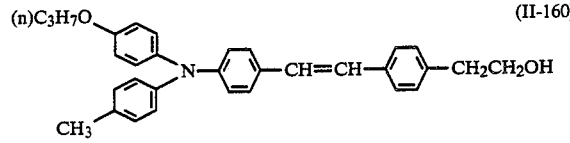 (II-160)
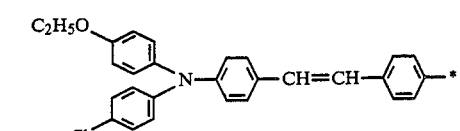 (II-161)
*—CH₂CH₂OCH₃
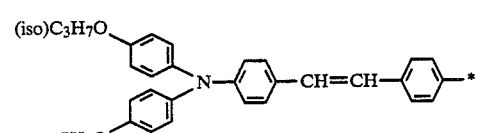 (II-162)
*—CH₂CH₂CH₂Cl
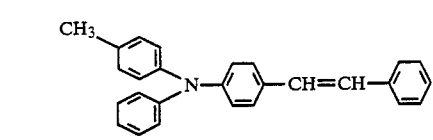 (II-163)
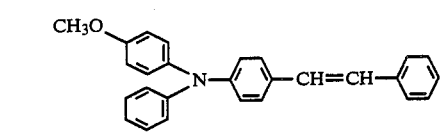 (II-164)
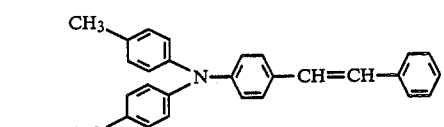 (II-165)
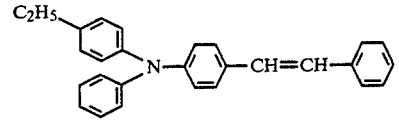 (II-166)
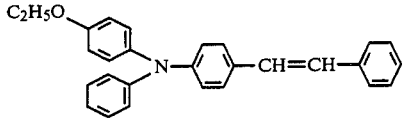 (II-167)
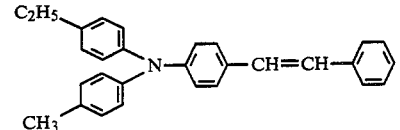 (II-168)
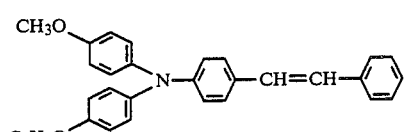 (II-169)
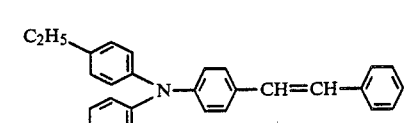 (II-170)
(II-171)
(II-172)
(II-173)
(II-174)
(II-175)
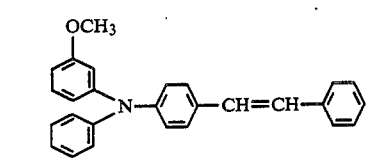
Preferred styryl compounds are those which are represented by the following formula (VII):

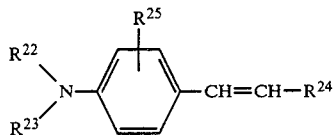
(VII)

(wherein $R^{22}$ and $R^{23}$ which may be the same or different are each a substituted or unsubstituted alkyl group or a phenyl group; $R^{24}$ is a phenyl, naphthyl, anthryl, fluorenyl or heterocyclic group unsubstituted or substituted each by, for example, an alkyl, alkoxy amino, acyl, phenyl, alkenyl or hydroxyl group or a halogen atom; $R^{25}$ is a hydrogen atom, a halogen atom, an alkyl group, an alkoxy group or an alkylamino group).

Stated more specifically, $R^{22}$ and $R^{23}$ in formula (VII) may be the same or different and each represents a substituted (the possible substituent is an alkyl, alkoxy or phenyl group) or unsubstituted alkyl group (those having 1 to 40 carbon atoms are preferred or a phenyl group; $R^{24}$ is a substituted or unsubstituted phenyl group, a naphthyl group, an anthryl group, a fluorenyl group or a heterocyclic group (preferably a 5- to 7-membered ring containing N, O and/or S, provided that the ring may be bonded to another heterocyclic group or a hydrocarbon group or may be saturated or unsaturated); $R^{25}$ is a hydrogen atom, a halogen atom, an alkyl group (those having 1 to 40 carbon atoms are preferred), an alkoxy group (those having 1 to 40 carbon atoms are preferred) or an alkylamino group (those having 1 to 10 carbon atoms in the alkyl group are preferred). The possible substituents on $R^{22}$, $R^{23}$ and $R^{24}$ include alkyl and alkoxy groups having 1 to 40 carbon atoms.

Examples of the styryl compounds of formula (VII) are given below.

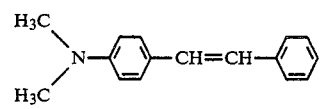
(VII-1)

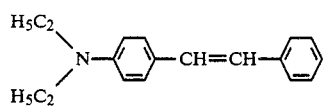
(VII-2)

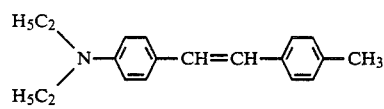
(VII-3)

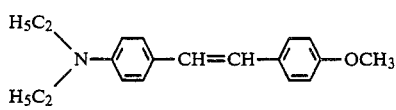
(VII-4)

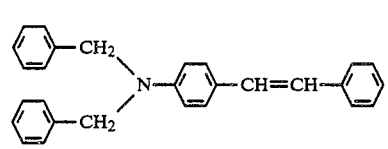
(VII-5)

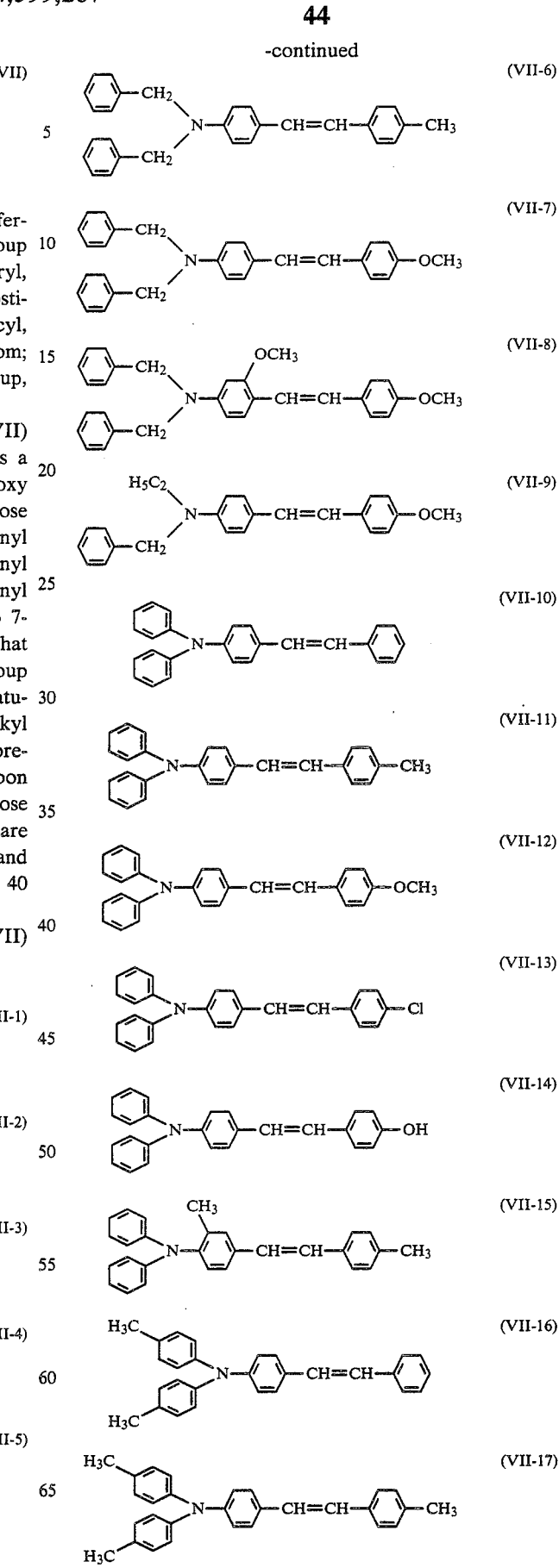

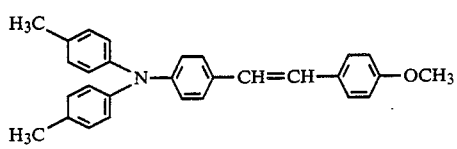 (VII-18)
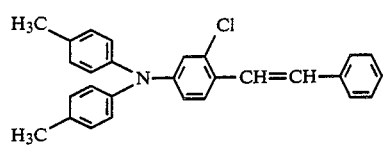 (VII-19)
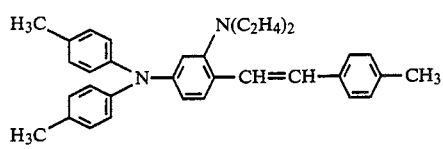 (VII-20)
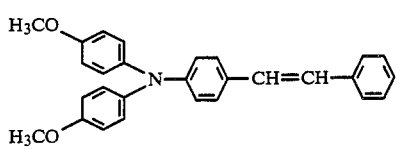 (VII-21)
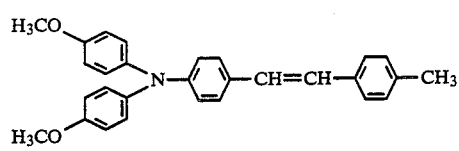 (VII-22)
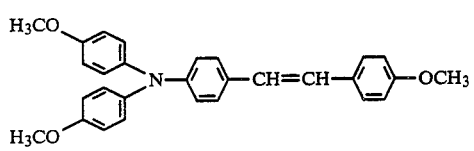 (VII-23)
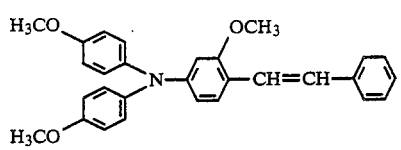 (VII-24)
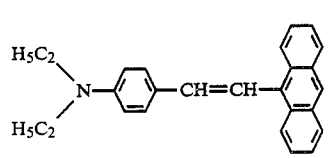 (VII-25)
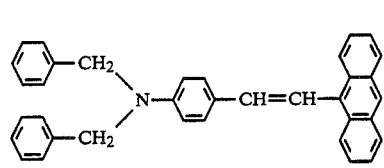 (VII-26)
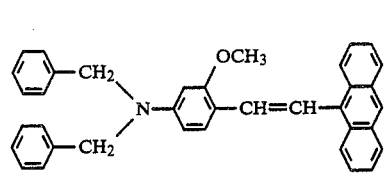 (VII-27)
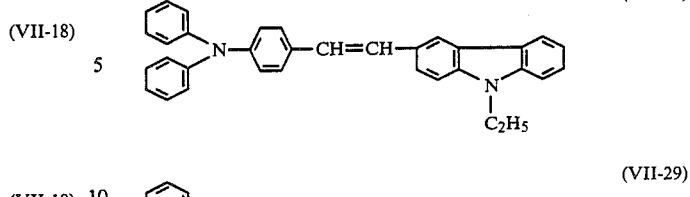 (VII-28)
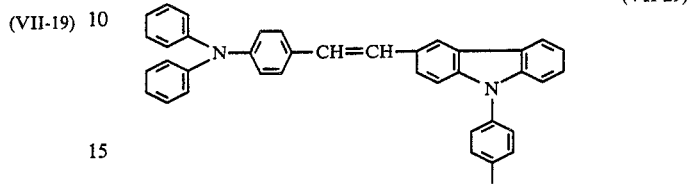 (VII-29)
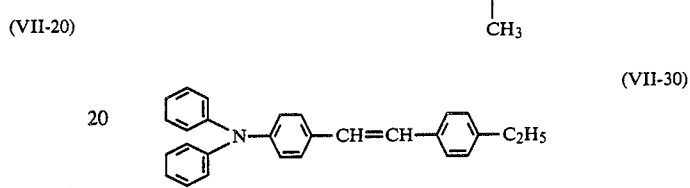 (VII-30)
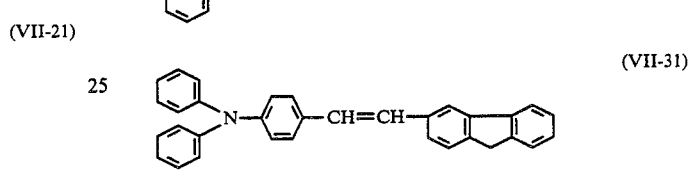 (VII-31)
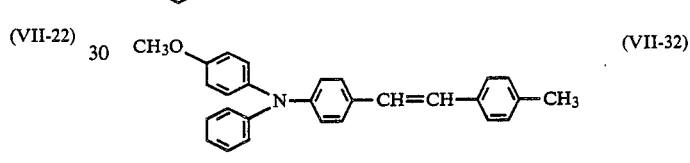 (VII-32)
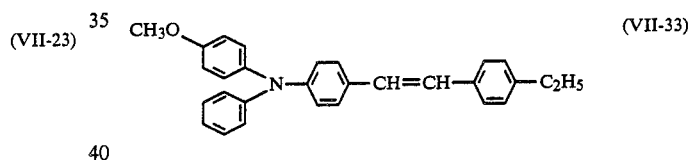 (VII-33)
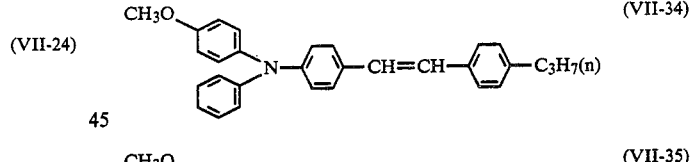 (VII-34)
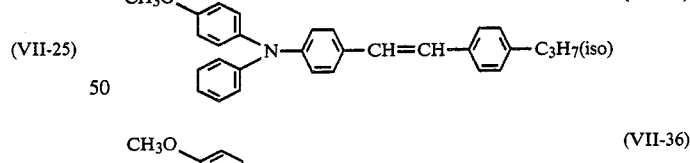 (VII-35)
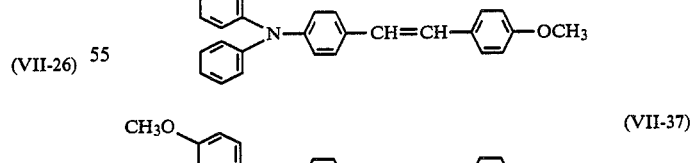 (VII-36)
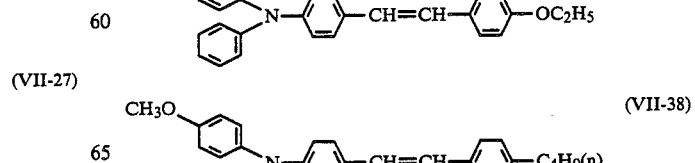 (VII-37)
(VII-38)

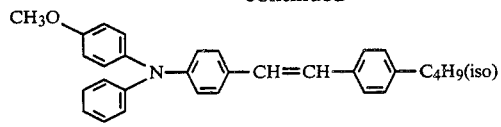 (VII-39)
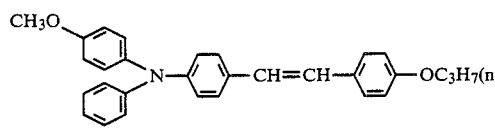 (VII-40)
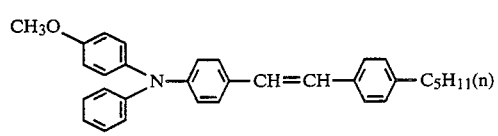 (VII-41)
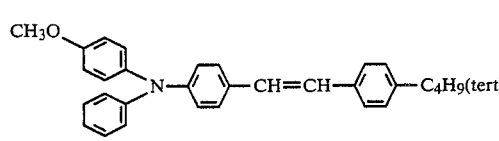 (VII-42)
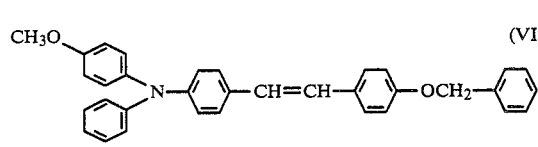 (VII-43)
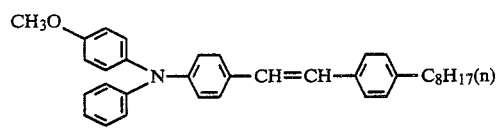 (VII-44)
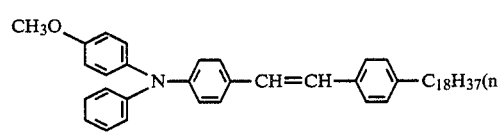 (VII-45)
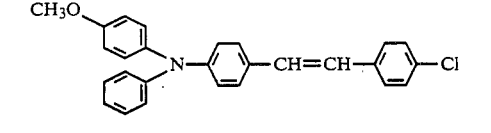 (VII-46)
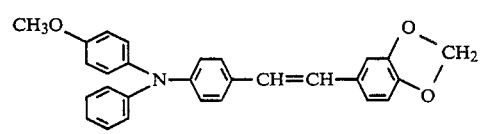 (VII-47)
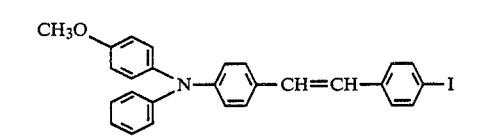 (VII-48)
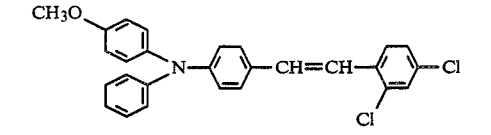 (VII-49)
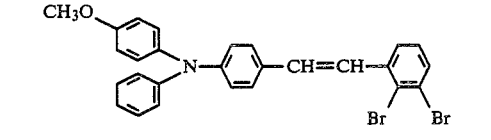 (VII-50)
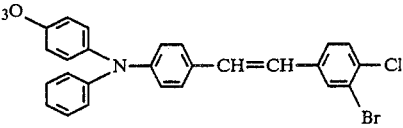 (VII-51)
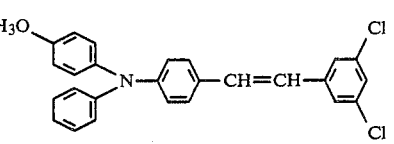 (VII-52)
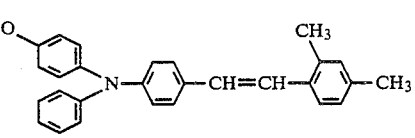 (VII-53)
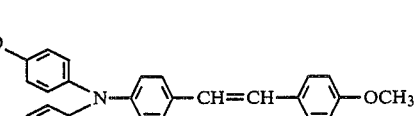 (VII-54)
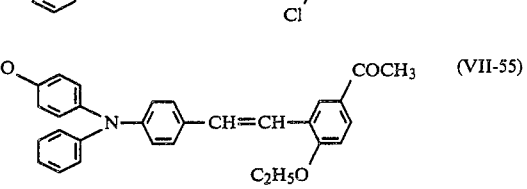 (VII-55)
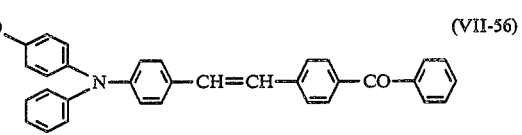 (VII-56)
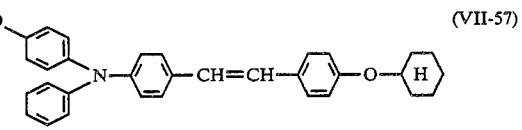 (VII-57)
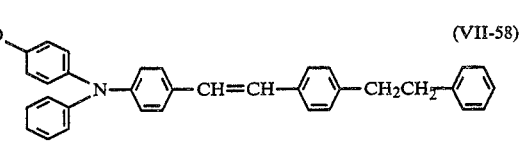 (VII-58)
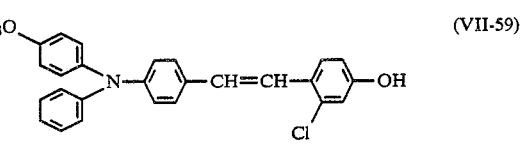 (VII-59)
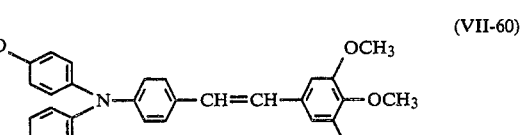 (VII-60)
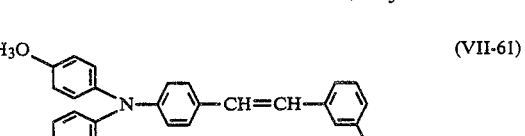 (VII-61)

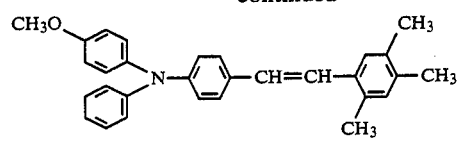 (VII-62)
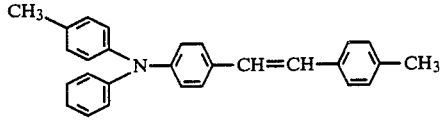 (VII-72)
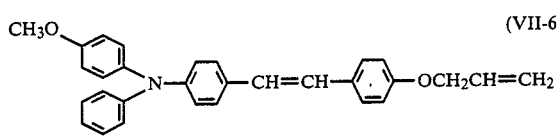 (VII-63)
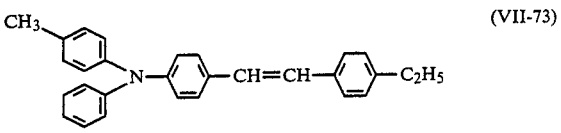 (VII-73)
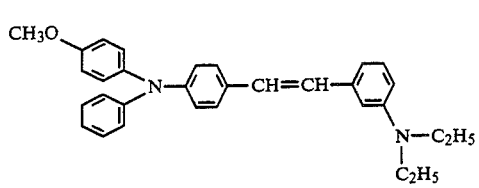 (VII-64)
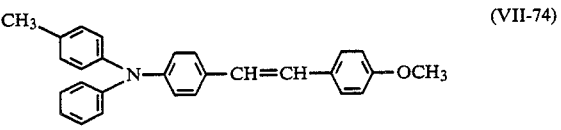 (VII-74)
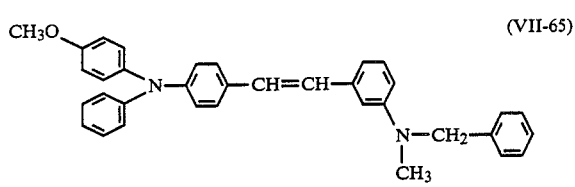 (VII-65)
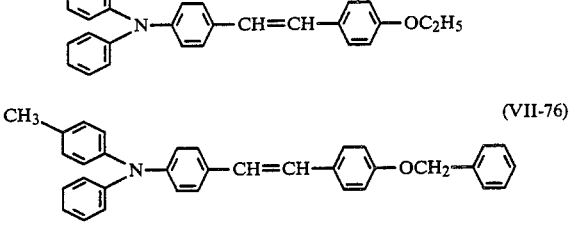 (VII-75)
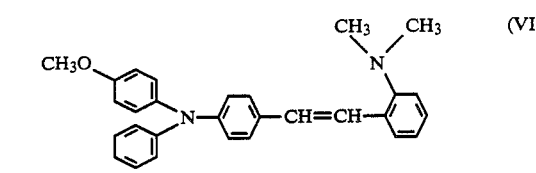 (VII-66)
(VII-76)
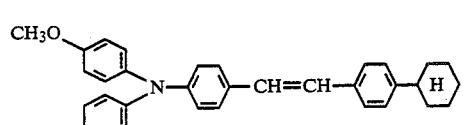 (VII-67)
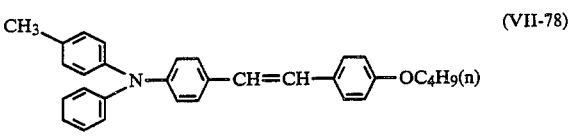 (VII-77)
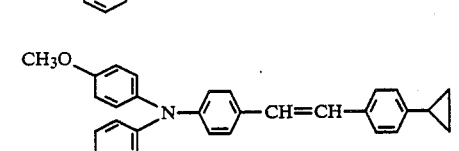 (VII-68)
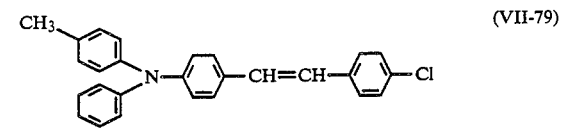 (VII-78)
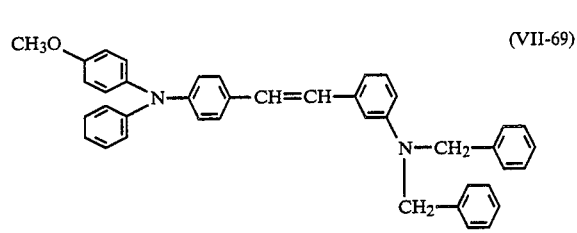 (VII-69)
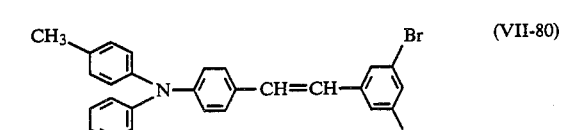 (VII-79)
 (VII-70)
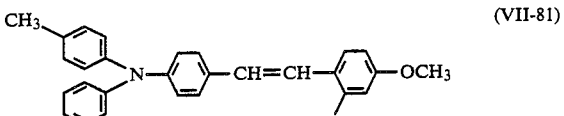 (VII-80)
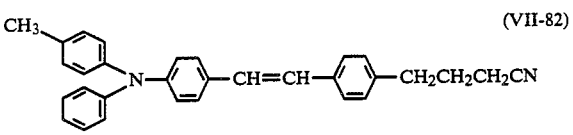 (VII-81)
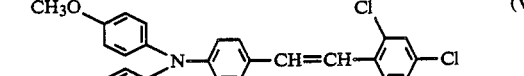 (VII-71)
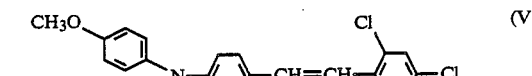 (VII-82)
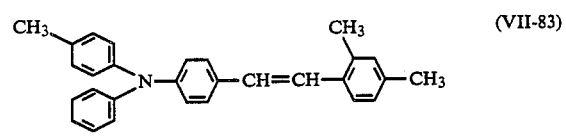 (VII-83)

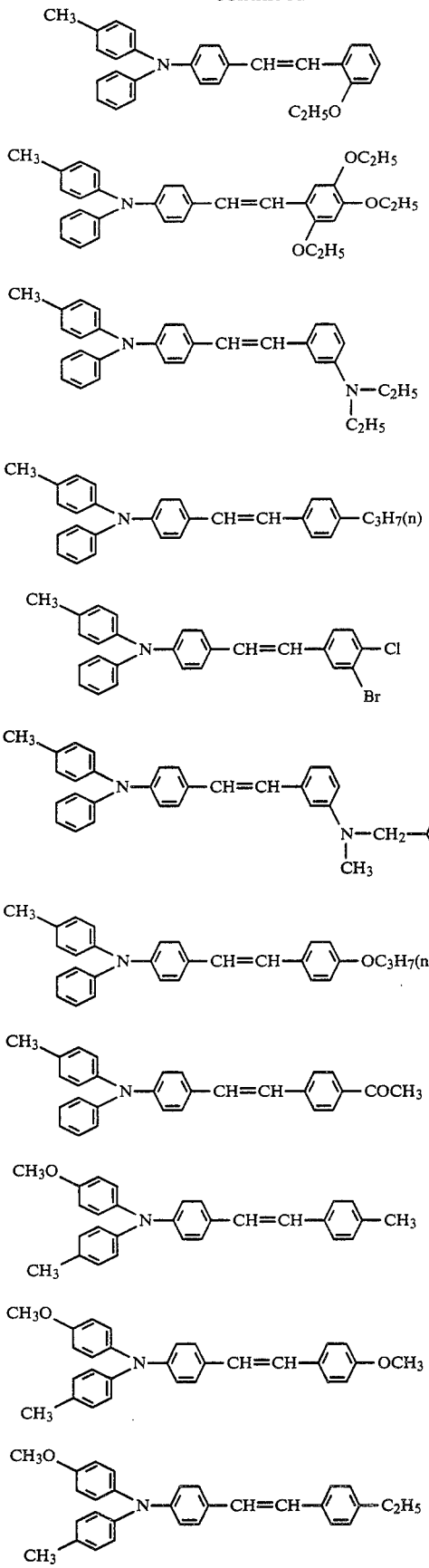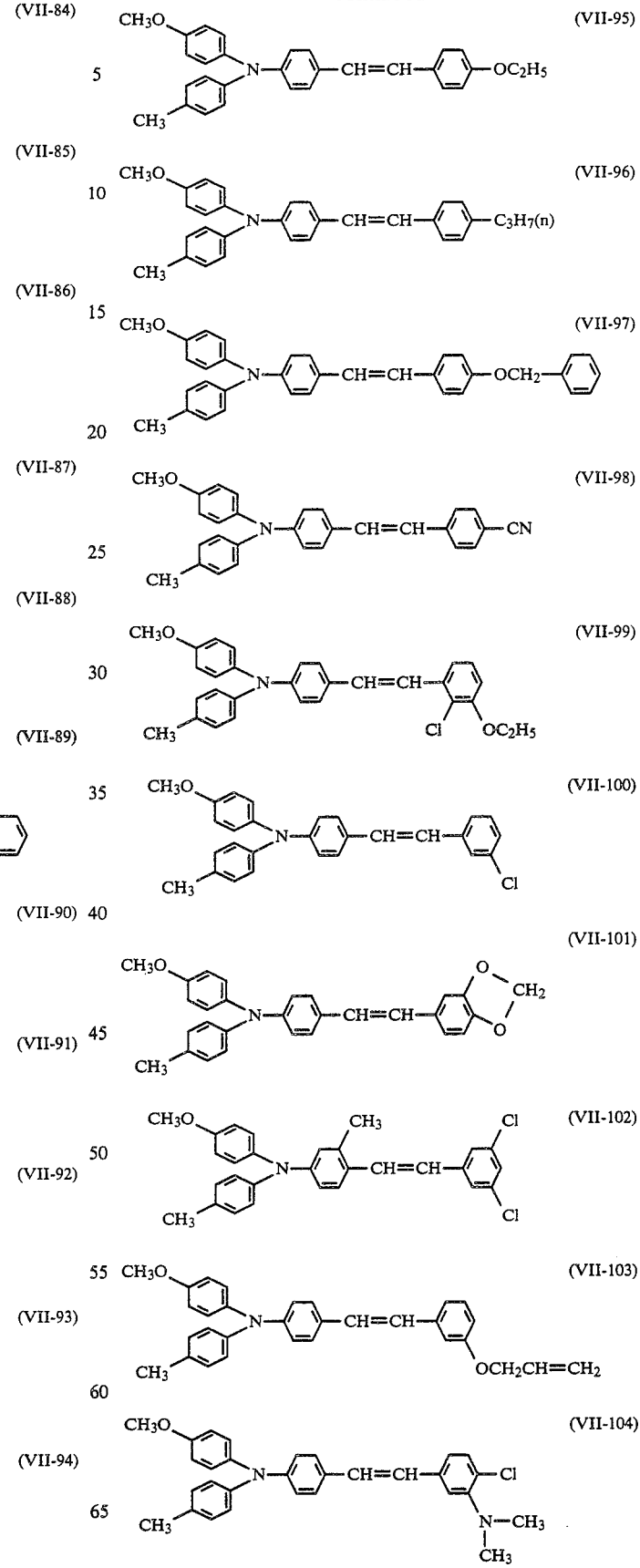

-continued (VII-105) (VII-115) (VII-106) (VII-116) (VII-107) (VII-117) (VII-108) (VII-118) (VII-109) (VII-119) (VII-110) (VII-120) (VII-111) (VII-121) (VII-112) (VII-122) (VII-113) (VII-123) (VII-124) (VII-114) (VII-125)

-continued
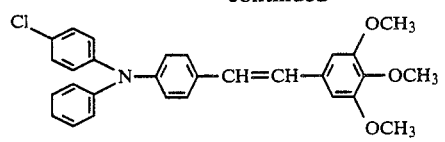 (VII-126)
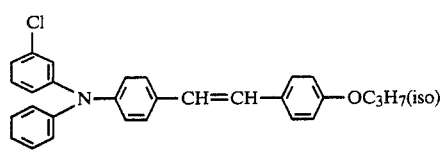 (VII-127)
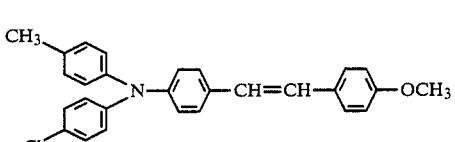 (VII-128)
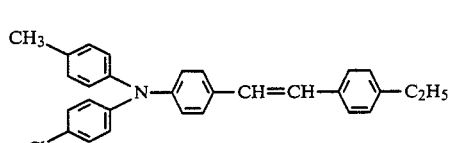 (VII-129)
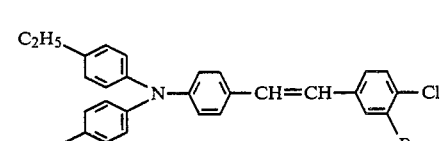 (VII-130)
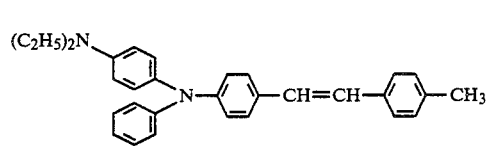 (VII-131)
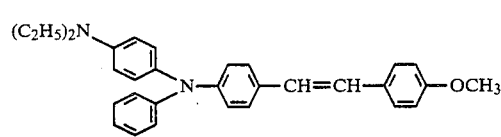 (VII-132)
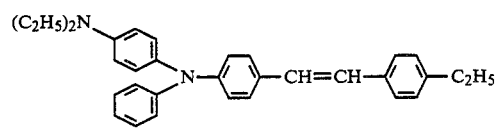 (VII-133)
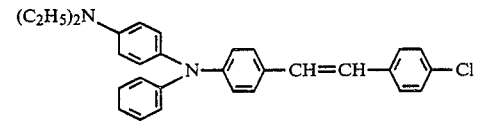 (VII-134)
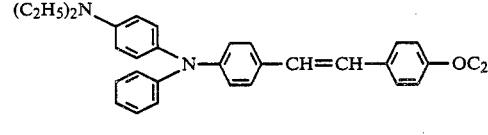 (VII-135)
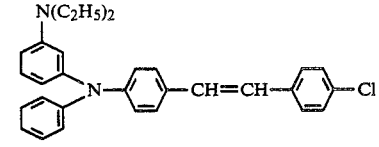 (VII-136)
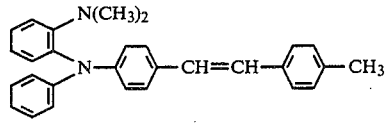 (VII-137)
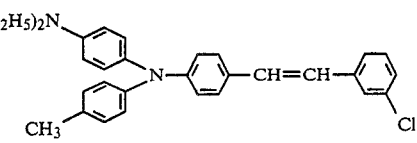 (VII-138)
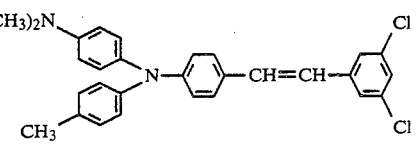 (VII-139)
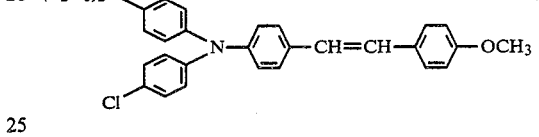 (VII-140)
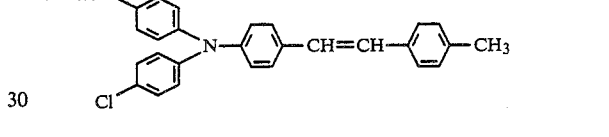 (VII-141)
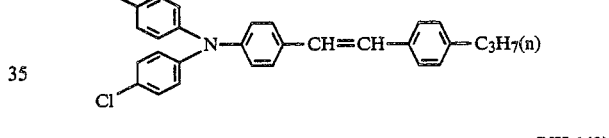 (VII-142)
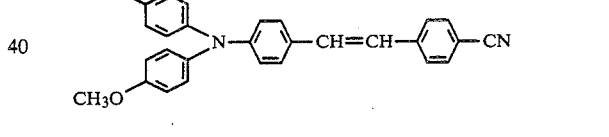 (VII-143)
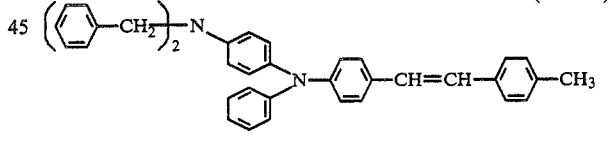 (VII-144)
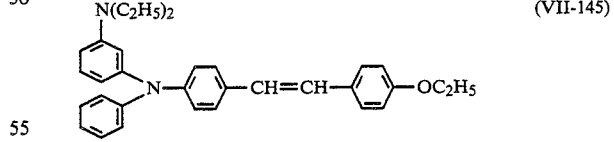 (VII-145)
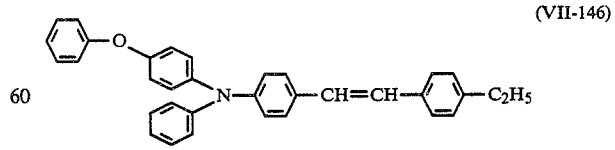 (VII-146)
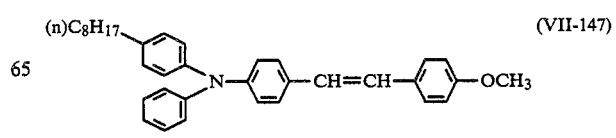 (VII-147)

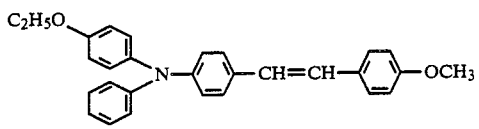 (VII-148)

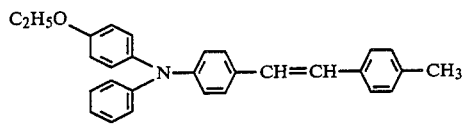 (VII-149)

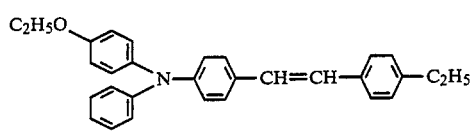 (VII-150)

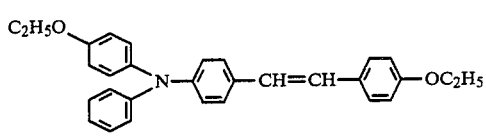 (VII-151)

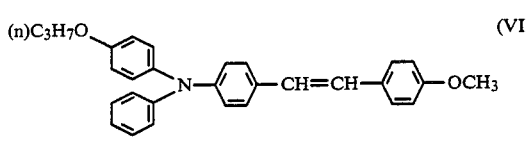 (VII-152)

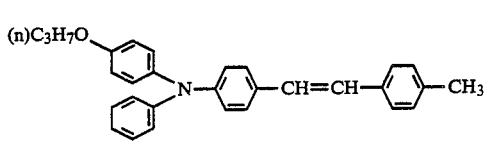 (VII-153)

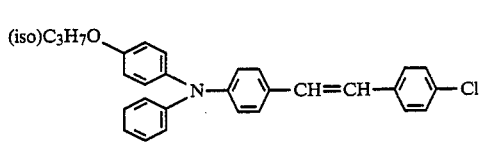 (VII-154)

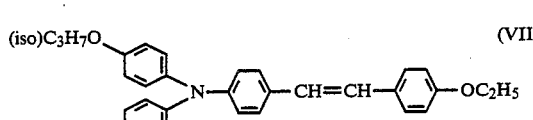 (VII-155)

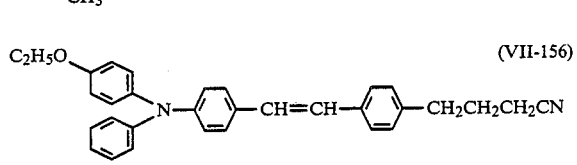 (VII-156)

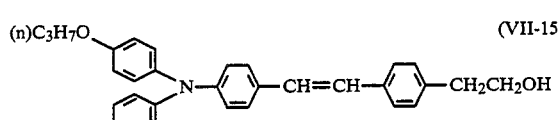 (VII-157)

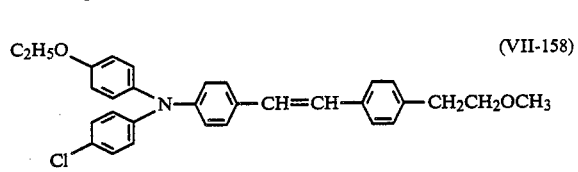 (VII-158)

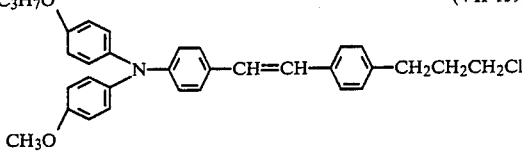 (VII-159)

Typical methods for synthesizing four compounds of formula (II) are shown below.

Synthesis 2 (Compound II-75)

A mixture of diethyl p-methylbenzylphosphonate (4.8 g, 0.02 mol) and 4 methyl-4'-formyltriphenylamine (6.0 g, 0.02 mol) is dissolved in N,N-dimethylformamide (70 ml) and the solution is cooled with ice. To the cooled solution, sodium methoxide 2.2 g or 0.04 mol) is gradually added at a controlled temperature of 10° C. or below. Thereafter, the mixture is stirred for one hour under cooling with ice, and for another 2 hours at room temperature. Following standing overnight at room temperature, iced water (50 ml) is added to the mixture to cause crystallization. The crystal is recovered by filtration and recrystallized twice from a 1:2 mixture of toluene and isopropyl alcohol.

Yield, 5.2 g (70.0%); mp. 130°–132° C. The obtained crystal is identified as the title compound since an FD-mass spectrum has a molecular ion peak at m/e=375.

Synthesis 3 (Compound II-96)

A mixture of diethyl p-methoxybenzylphosphonate (5.2 g or 0.02 mol) and 4-methyl-4'-methoxy-4''-formyltriphenylamine (6.4 g or 0.02 mol) is dissolved in N,N-dimethylformamide (70 ml) and the solution is cooled with ice. To the solution, sodium methoxide (2.2 g or 0.04 mol) is gradually added at a controlled temperature of 10° C. or less. Thereafter, the mixture is stirred for one hour under cooling with ice, and for another 2 hours at room temperature. Following standing overnight at room temperature, ice water (50 ml) is added to the mixture to cause crystallization. The crystal is recovered by filtration and recrystallized twice from a 1:2 mixture of toluene and isopropyl alcohol.

Yield, 6.1 g (72.0%); mp. 109°–110° C. The obtained crystal is identified as the title compound since an FD-mass spectrum has a molecular ion peak at m/e=421.

Synthesis 4 (Compound II-18)

Diethyl p-methoxybenzylphosphonate (5.2 g or 0.02 mol) is dissolved in N,N-dimethylformamide (60 ml). Sodium methoxide (2.2 g or 0.04 mol) is added to the resulting solution under cooling with ice. To the resulting mixture, a solution of 4-(p,p'-ditolylamino)benzaldehyde (6 g, 0.02 mol) in N,N-dimethylformamide (40 ml) is added dropwise, and thereafter, the mixture is stirred for one hour under cooling with ice. After standing overnight at room temperature, iced water (40 ml) is added to the reaction mixture, and the resulting crystal is recovered by filtration and recrystallized twice with acetonitrile.

Yield, 6.3 g (78.0%), mp. 155°–156° C.

Synthesis 5 (Compound II-17)

Diethyl p-methylbenzylphosphonate (3.6 g or 0.015 mol) is dissolved in N,N dimethylformamide (10 ml). Sodium methoxide (1.6 g or 0.03 mol) is added to the resulting solution under cooling with ice. To the resulting mixture, a solution of 4-(p,p'-ditolylamino)benzaldehyde (4.5 g, 0.015 mol) in N,N'-dimethylformamide (30 ml) is added dropwise, and thereafter, the mixture is stirred for one hour under cooling with ice. After standing over-night at room temperature, ice water (10 ml) is added to the reaction mixture, and the resulting crystal is recovered by filtration and recrystallized twice with acetonitrile.

Yield, 4.8 g (82.9%), mp. 132°–133° C.

Several examples of the hydrazone compounds (III) are listed below. It should also be understood that the hydrazone compounds that can be used in the present invention are by no means limited to these examples.

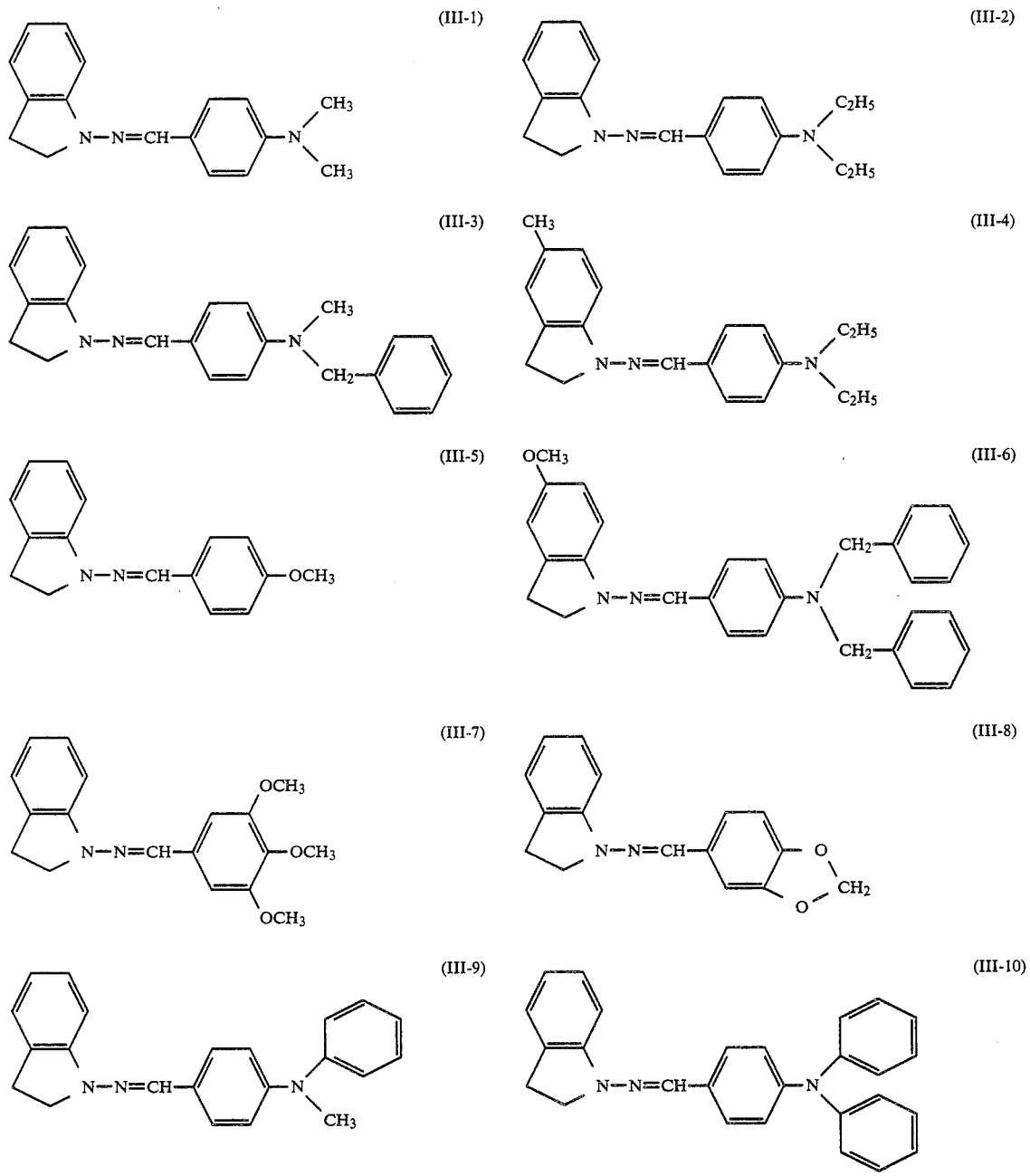

-continued
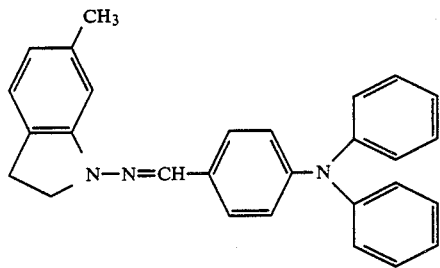 (III-11)
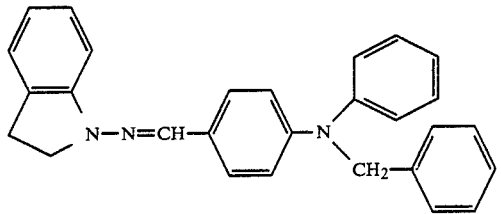 (III-12)
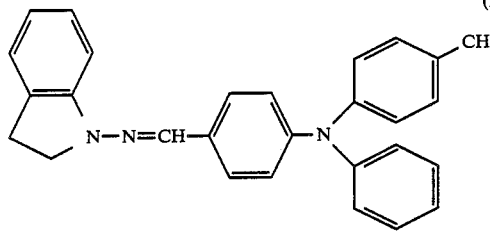 (III-13)
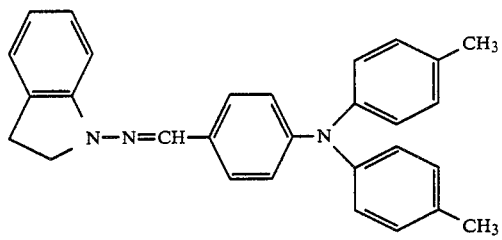 (III-14)
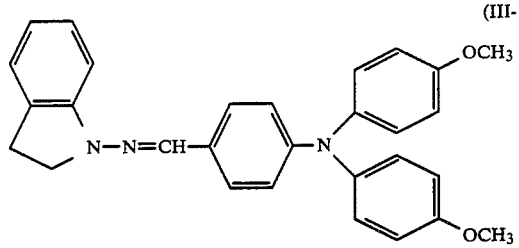 (III-15)
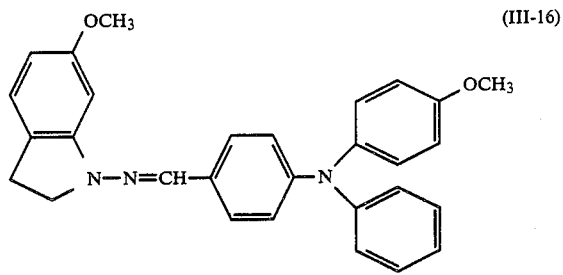 (III-16)
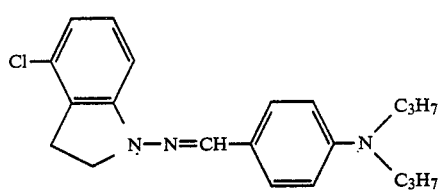 (III-17)
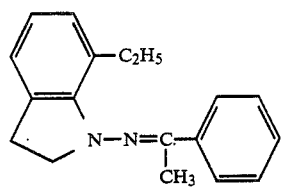 (III-18)
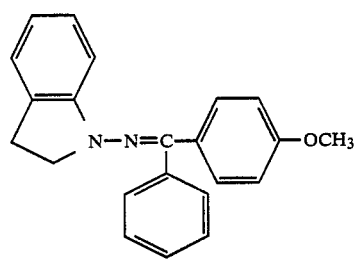 (III-19)
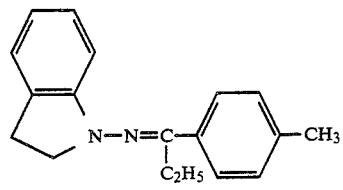 (III-20)
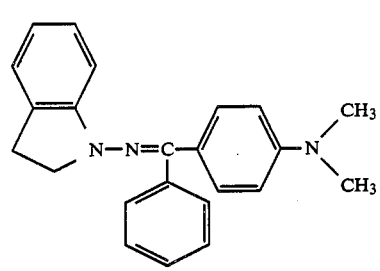 (III-21)
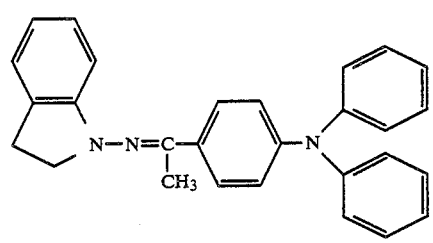 (III-22)

-continued
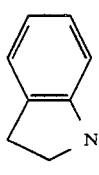 (III-23)
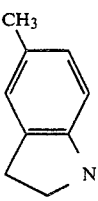 (III-24)
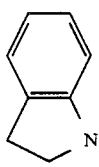 (III-25)
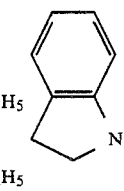 (III-26)
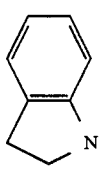 (III-27)
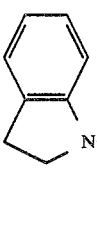 (III-28)
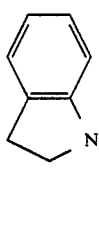 (III-29)
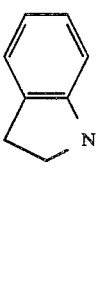 (III-30)
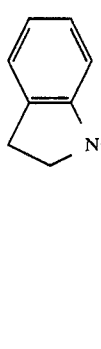 (III-31)
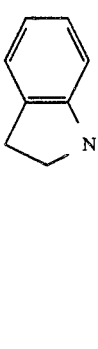 (III-32)

-continued
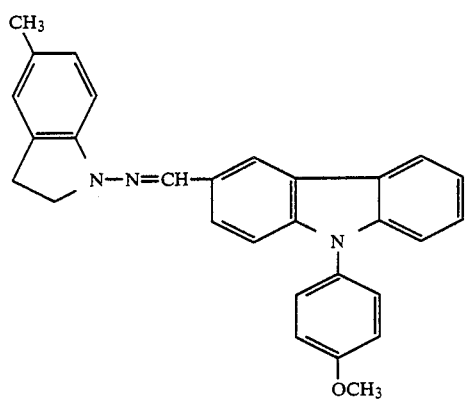 (III-33)
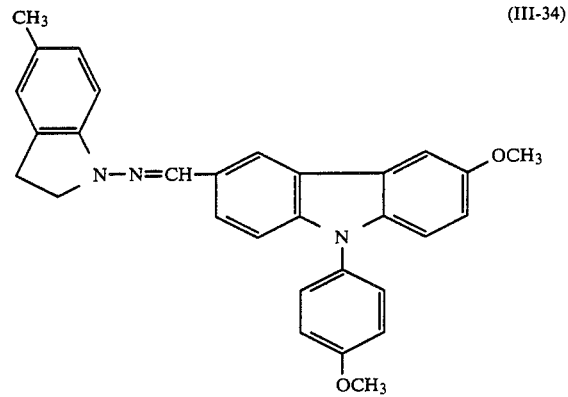 (III-34)
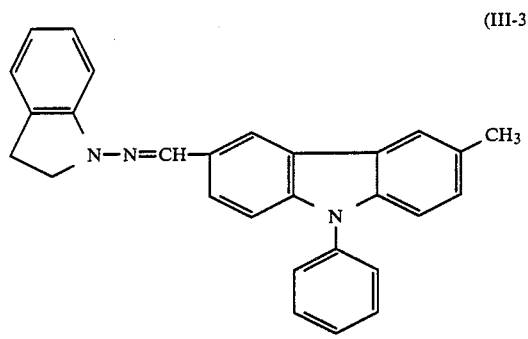 (III-35)
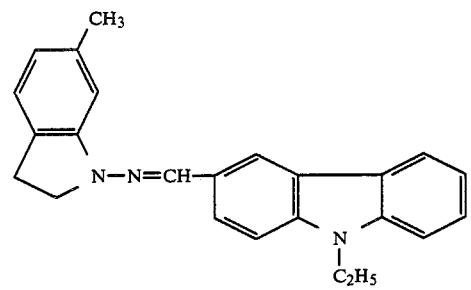 (III-36)
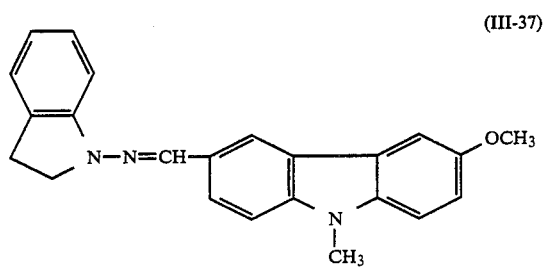 (III-37)
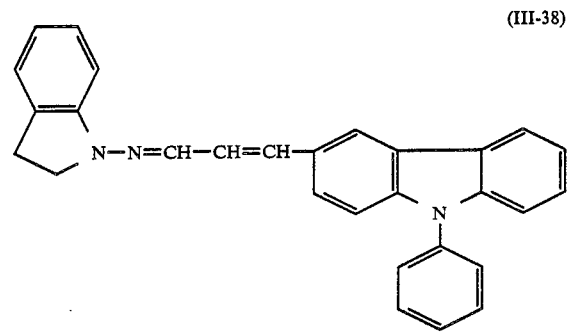 (III-38)
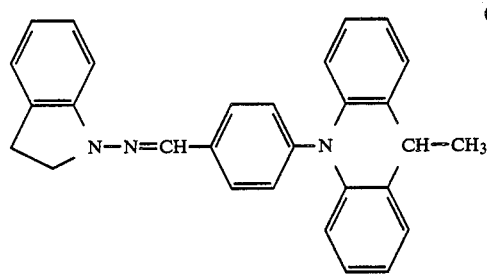 (III-39)
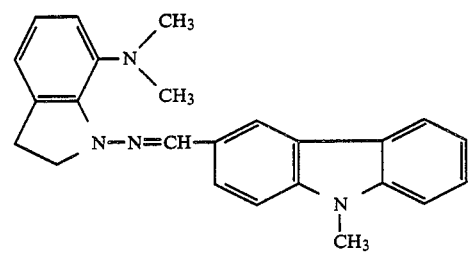 (III-40)
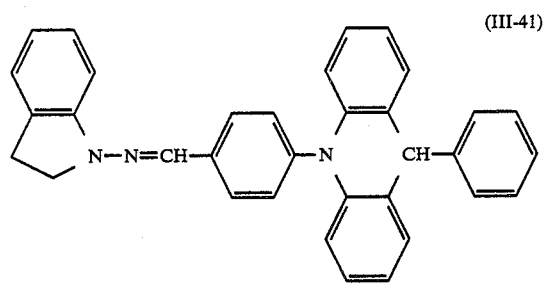 (III-41)
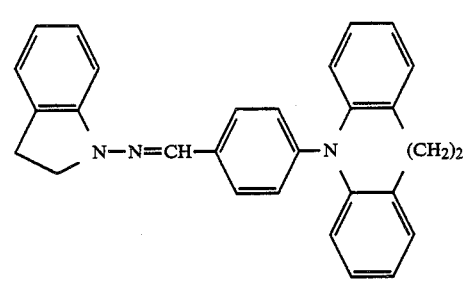 (III-42)

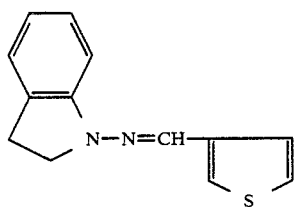
(III-43)

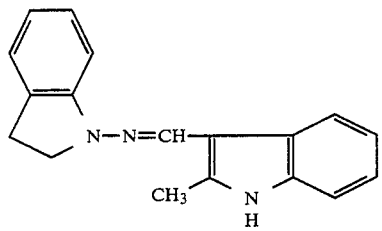
(III-45)

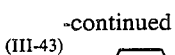
-continued

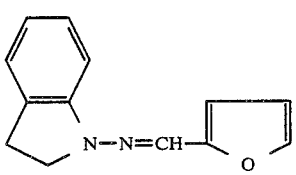
(III-44)

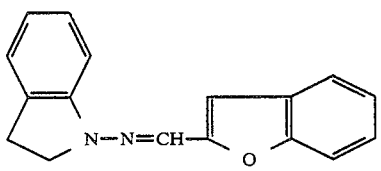
(III-46)

The hydrazone compounds of formula (III) may be readily synthesized by known methods. For example, a 1-aminoindoline derivative of formula (A) and a carbonyl compound (B) may be subjected to dehydrative condensation in a solvent such as alcohol in the presence of an acid catalyst, thereby producing a hydrazone compound of formula (C). The course of this reaction is indicated below.

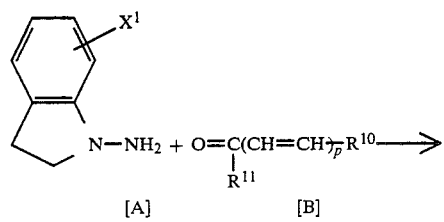
[A]   [B]

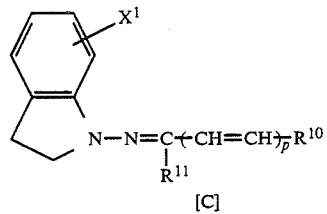
[C]

wherein $R^{10}$, $R^{11}$, p and $X^1$ have the same meanings as defined in formula (III).

Synthesis 6 (Compound III-2)

A mixture of 1.3 g (0.01 mol) of 1-aminoindoline (Zhr. Obshchel Khim., 29, 3820-5, 1959) and diethylaminebenzaldehyde (1.8 g or 0.01 mol) is dispersed in ethanol (50 ml). After addition of acetic acid (5 ml), the dispersion is heated under reflux for 1.5 hours. The heated dispersion is allowed to cool, and the resulting crystal is recovered by filtration and recrystallized from ethanol. The end hydrazone compound is obtained in an amount of 2.4 g (yield: 83%). mp. 99°–102° C.

Several examples of the hydrazone compounds represented by formula (IV) are listed below. It should be understood that the hydrazone compounds (IV) that can be used in the present invention are also by no means limited to these examples.

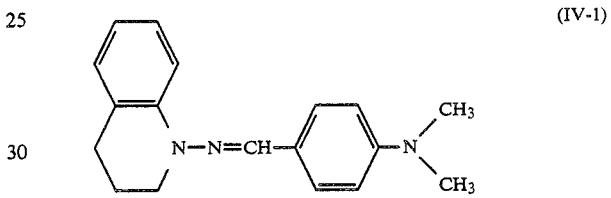
(IV-1)

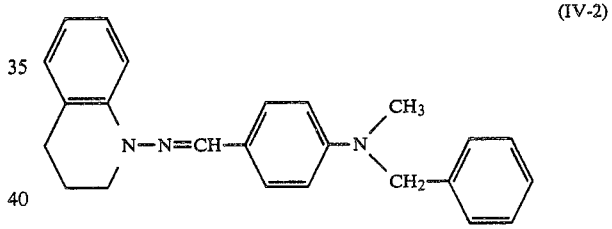
(IV-2)

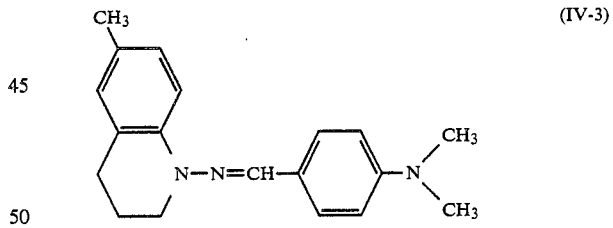
(IV-3)

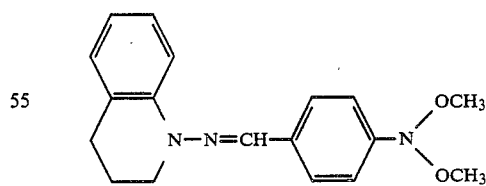
(IV-4)

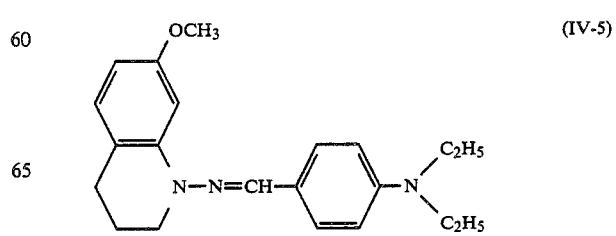
(IV-5)

-continued
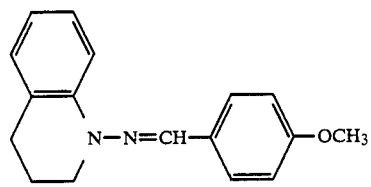 (IV-6)
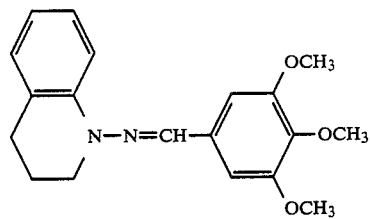 (IV-7)
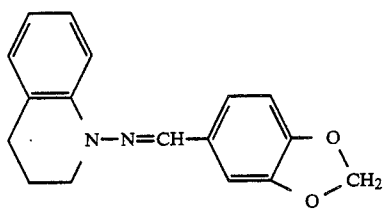 (IV-8)
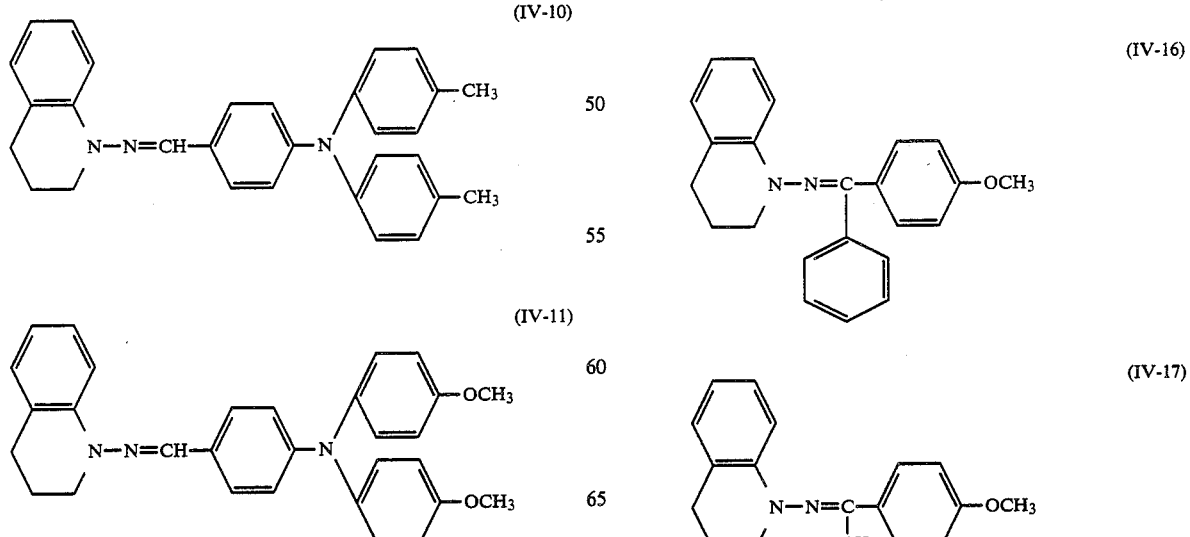

(IV-18)
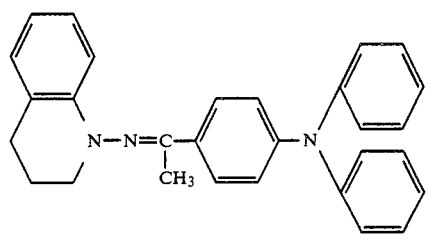
(IV-19)
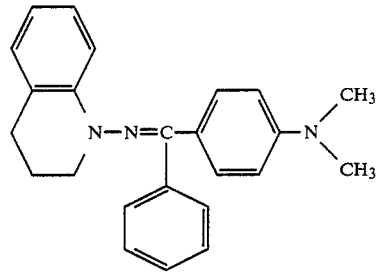
(IV-20)
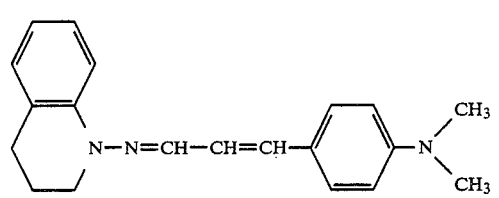
(IV-21)
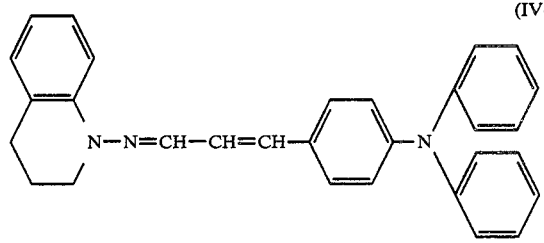
(IV-22)
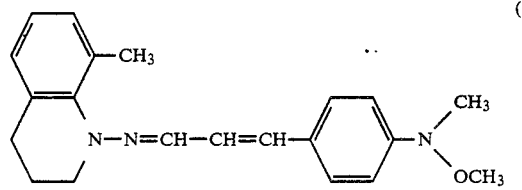
(IV-23)
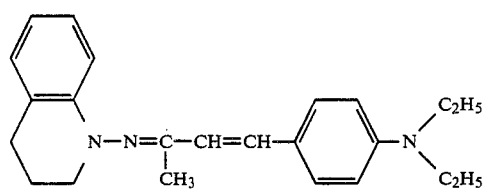
(IV-24)
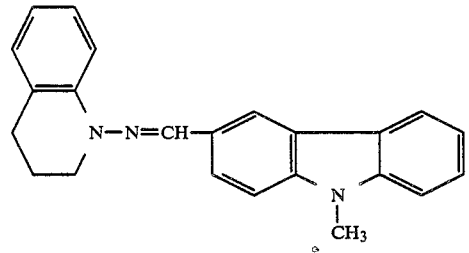
(IV-25)
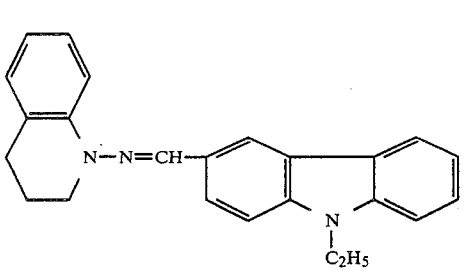
(IV-26)
(IV-27)
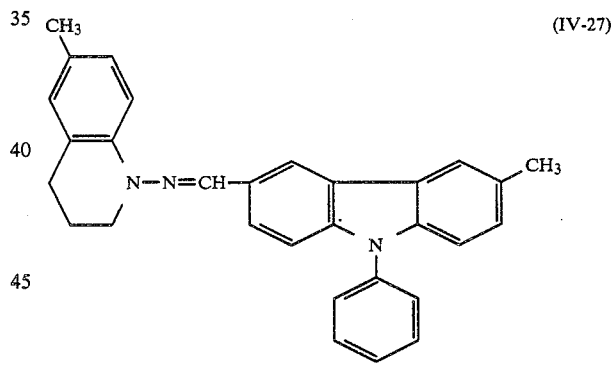
(IV-28)
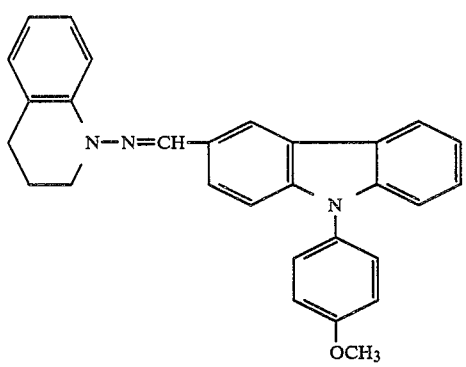

(IV-29) 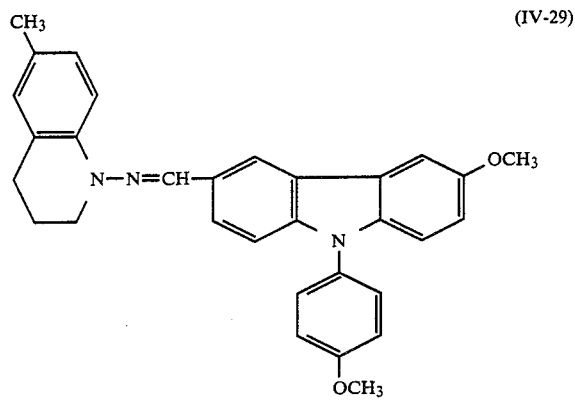
(IV-30) 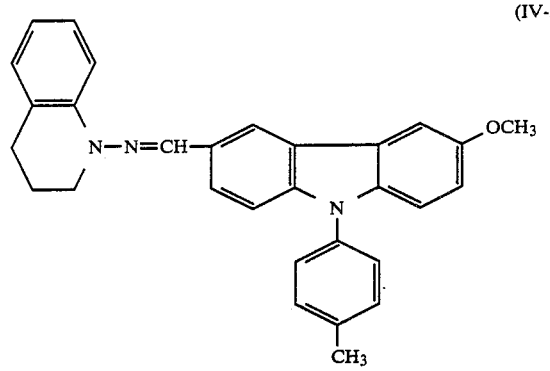
(IV-31) 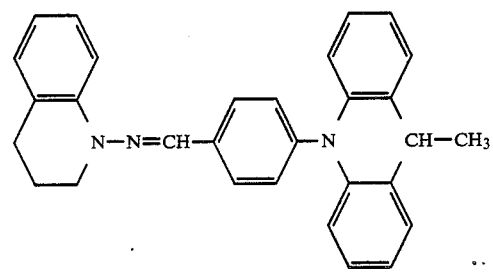
(IV-32) 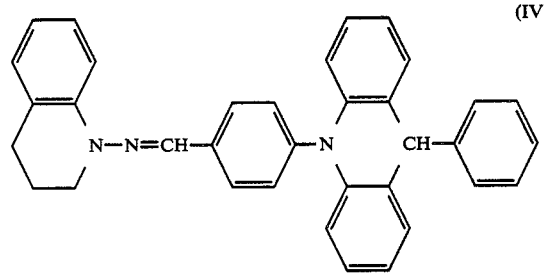
(IV-33) 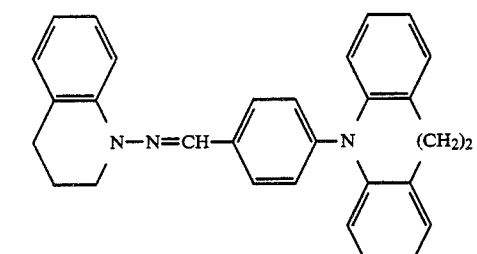
(IV-34) 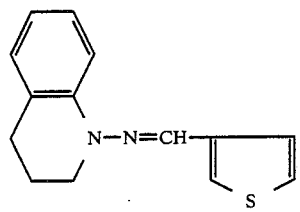
(IV-35) 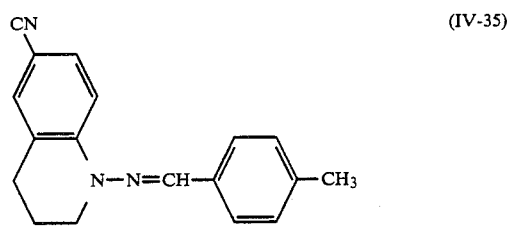
(IV-36) 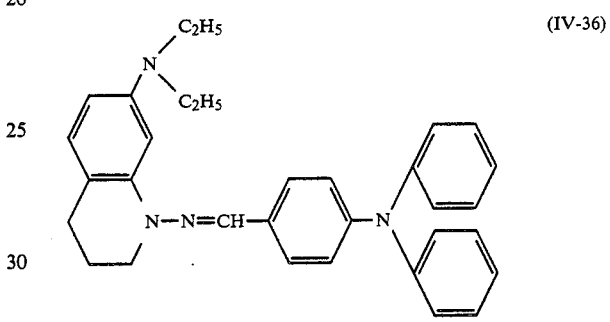
(IV-37) 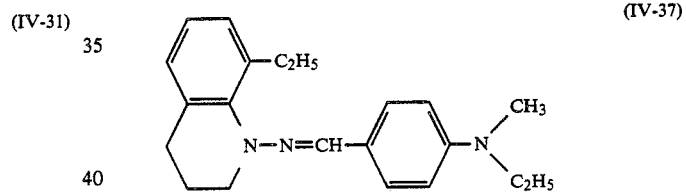
(IV-38) 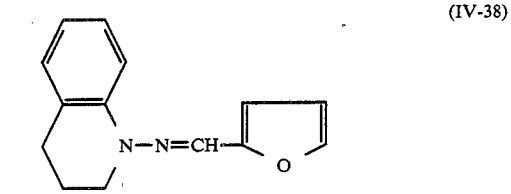
(IV-39) 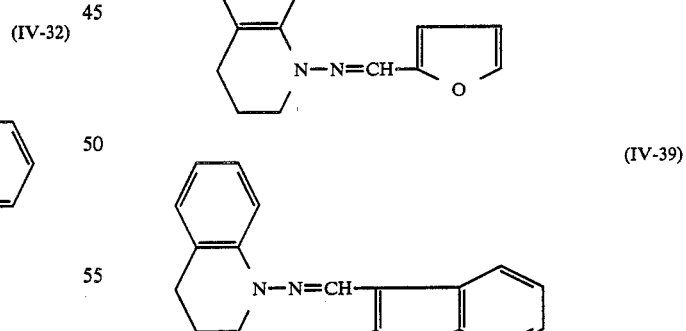
(IV-40) 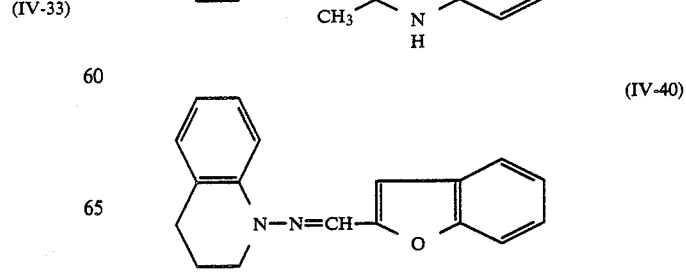

-continued

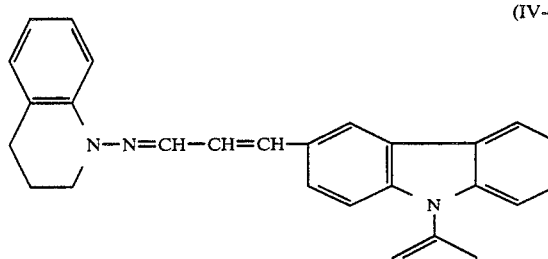
(IV-41)

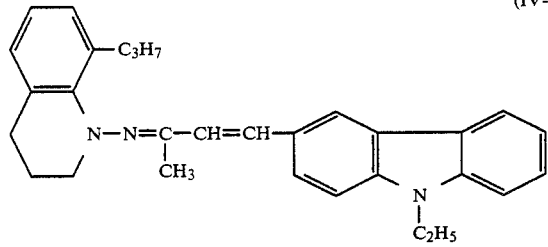
(IV-42)

The hydrazone compounds of formula (IV) may be readily synthesized by known methods. For example, 1-amino-1,2,3,4-tetrahydroquinoline derivative of formula (D) and a carbonyl compound (E) may be subjected to dehydrative condensation in a solvent such as alcohol, optionally in the presence of an acid catalyst, thereby producing a hydrazone derivative of formula (F). The course of this reaction is shown below:

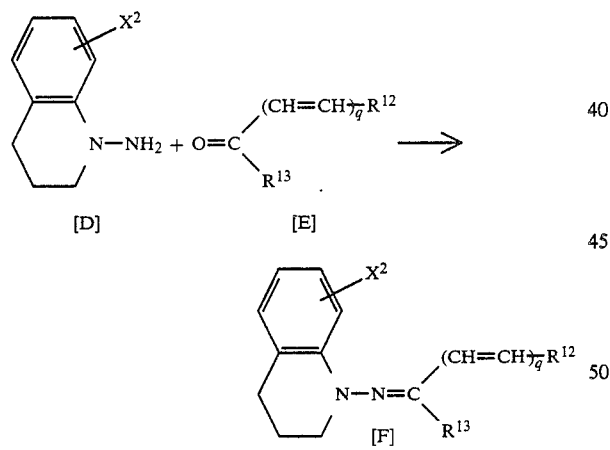

wherein $R^{12}$, $R^{13}$, q and $X^2$ are the same as defined for formula (IV).

Typical methods for synthesizing three hydrazone derivatives (IV) are shown below.

Synthesis 7 (Compound IV-1)

One and a half gram (0.01 mol) of 1-amino-1,2,3,4-tetrahydroquinoline (Zhur. Obshchei. Khim., 29, 1949–53, 1959) and 1.8 g (0.01 mol) of dimethylaminobenzaldehyde are dissolved in ethanol (40 ml). After addition of acetic acid (5 ml), the solution is heated under reflux for 1 hour. The heated solution is allowed to cool, and the resulting crystal is recovered by filtration and recrystallized from ethanol. The end hydrazone compound is obtained in an amount of 2.8 g (yield: 93.3%). mp. 129°–130° C.

Synthesis 8 (Compound IV-10)

One and a half gram (0.01 mol) of 1-amino-1,2,3,4-tetrahydroquinoline and 3.0 g (0.01 mol) of p-(N,N-di-p-tolylamino)benzaldehyde and dissolved in isopropanol (30 ml). After addition of acetic acid (6 ml), the solution is heated under reflux for 1.5 hours. The heated solution is allowed to cool, and the resulting crystal is recovered by filtration and recrystallized from a mixed solvent of toluene and isopropanol. The end compound is obtained in an amount of 3.4 g (yield, 79.0%). mp. 195°–196° C.

Synthesis 9 (Compound IV-26)

One and a half gram (0.01 mol) of 1-amino-1,2,3,4-tetrahydroquinoline and 2.7 g (0.01 mol) of N-phenyl-3-carbazole aldehyde are dissolved in isopropanol (30 ml). After addition of acetic acid (6 ml), the solution is heated under reflux for 1.5 hours. The heated solution is allowed to cool, and the resulting crystal is recovered by filtration and purified by chromatography on silica gel. The end compound is obtained in an amount of 2.5 g (yield, 62.5%). mp. 84.5°–86° C.

Examples of the amine derivatives of formula (V) are listed below, and it should again be noted that the scope of the amine derivatives (V) that can be used in the present invention are by no means limited to these examples.

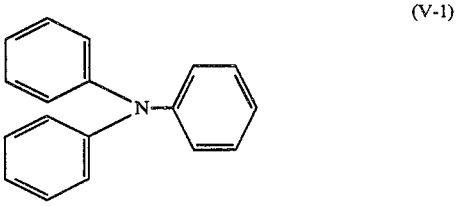
(V-1)

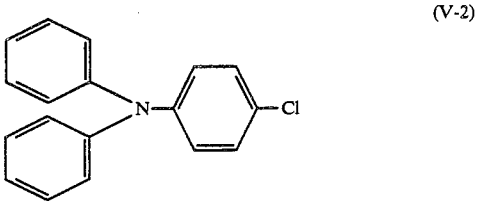
(V-2)

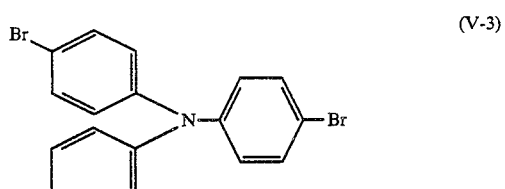
(V-3)

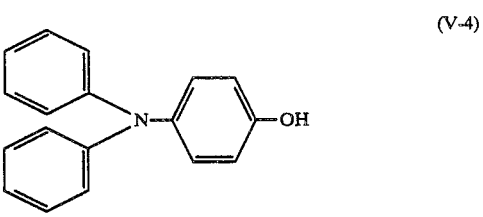
(V-4)

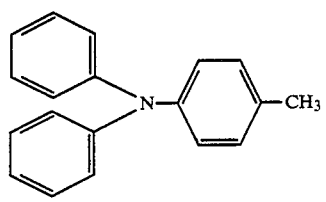 (V-5)
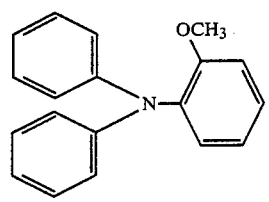 (V-12)
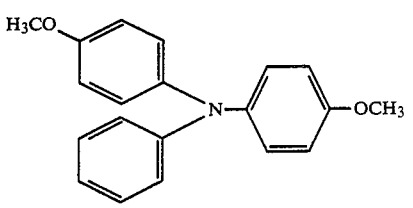 (V-6)
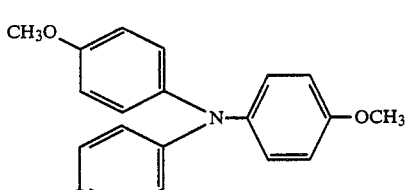 (V-13)
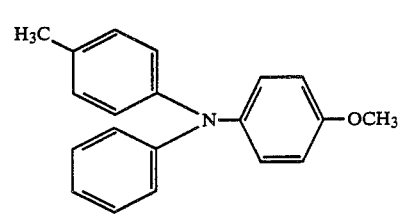 (V-7)
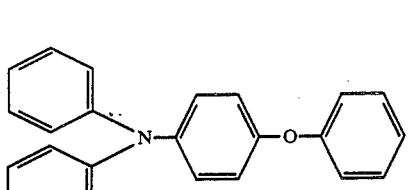 (V-14)
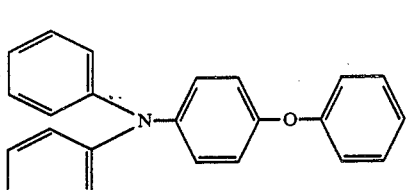 (V-8)
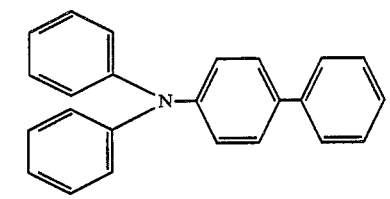 (V-15)
(V-9)
(V-16)
(V-10)
(V-17)
(V-11)
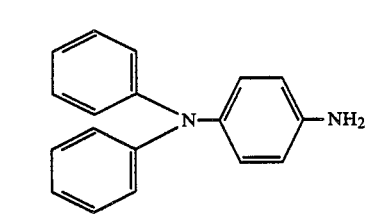 (V-18)

-continued
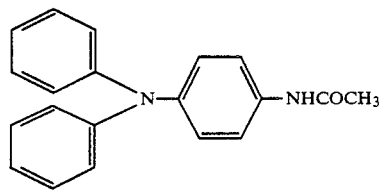 (V-19)
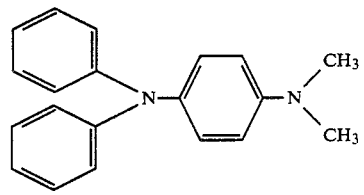 (V-20)
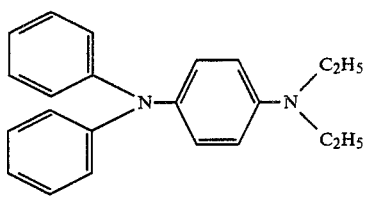 (V-21)
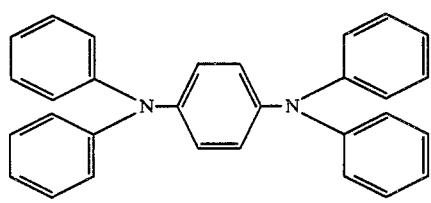 (V-22)
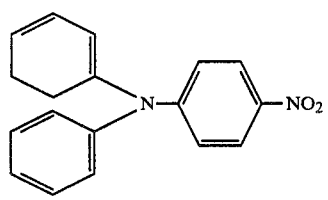 (V-23)
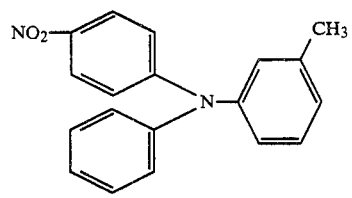 (V-24)
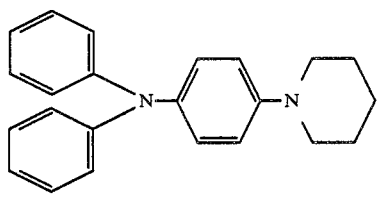 (V-25)
-continued
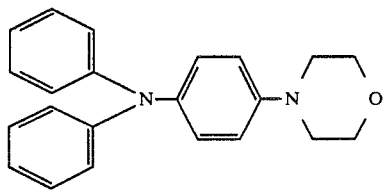 (V-26)
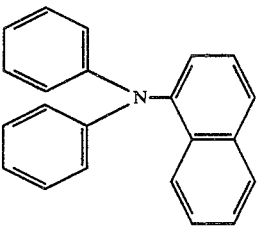 (V-27)
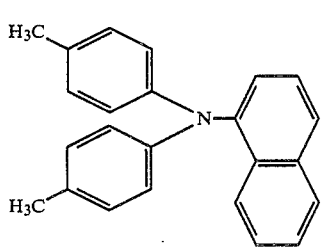 (V-28)
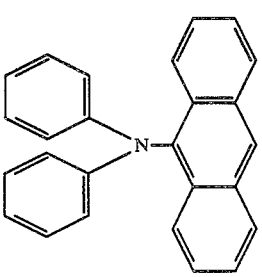 (V-29)
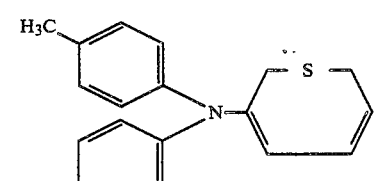 (V-30)
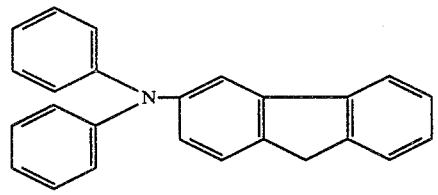 (V-31)
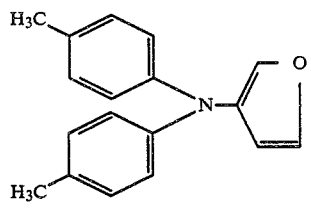 (V-32)

-continued

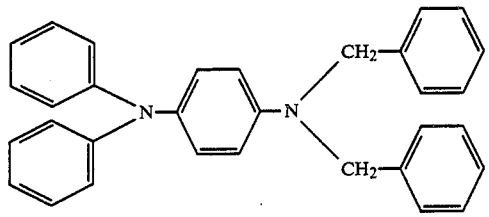 (V-33)

Preferred embodiments of the photoreceptor of the present invention are as follows:

(1) A photoreceptor comprising, in combination, a compound represented by formula (I) as a carrier generating material and a compound represented by formula (II) as a carrier transporting material.

(2) A photoreceptor comprising, in combination, a compound represented by formula (I) as a carrier generating material and at least one compound selected from among those represented by formulas (III) and (IV) as a carrier transporting material.

(3) A photoreceptor comprising, in combination, a compound represented by formula (I) as a carrier generating material and a compound represented by formula (V) as a carrier transporting material.

(4) A photoreceptor comprising, in combination, a compound represented by formula (I) and as a carrier generating material and compounds represented by formulas (II) and (V); respectively, as a carrier transporting material.

According to the present invention, polymeric organic semiconductors may be used as carrier transport materials in combination with the amine derivatives (V). Suitable polymeric organic semiconductors are given below, but other examples may of course be used.

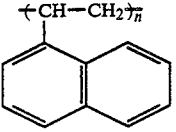 (VIII-1)

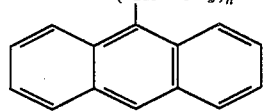 (VIII-2)

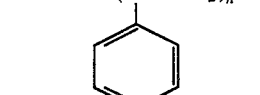 (VIII-3)

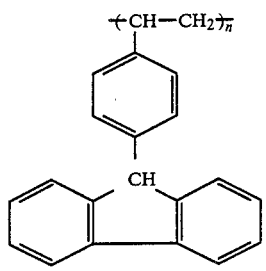 (VIII-4)

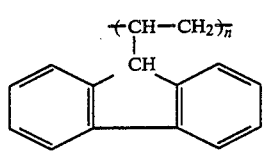 (VIII-5)

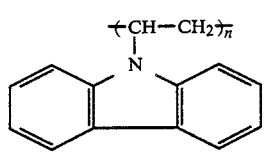 (VIII-6)

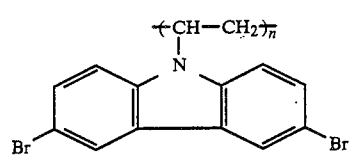 (VIII-7)

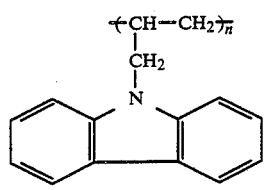 (VIII-8)

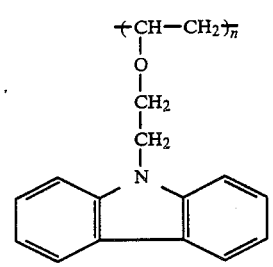 (VIII-9)

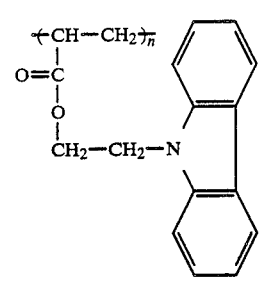 (VIII-10)

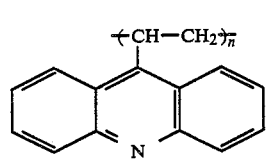 (VIII-11)

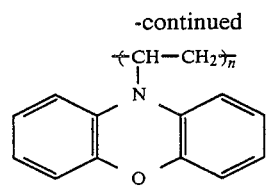
(VIII-12)

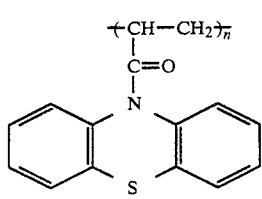
(VIII-13)

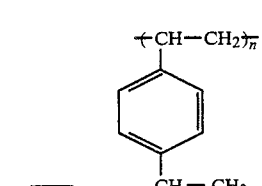
(VIII-14)

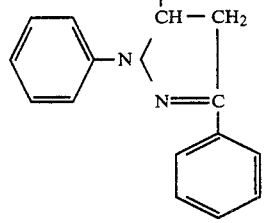
(VIII-15)

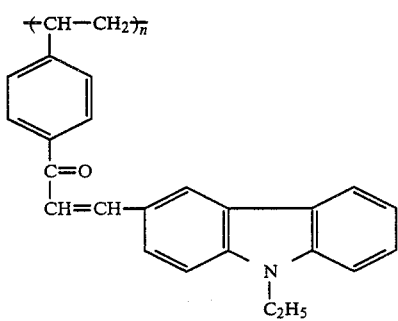
(VIII-16)

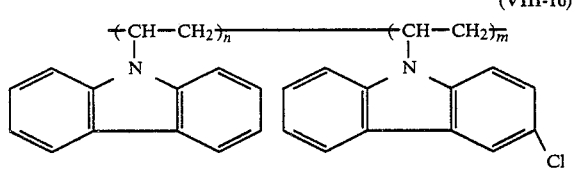
(VIII-17)

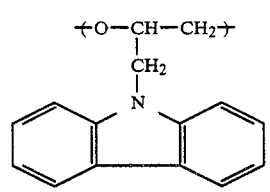
(VIII-18)

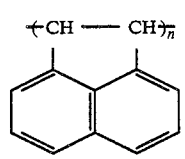
(VIII-19)

(VIII-20)

Among the polymeric organic semiconductors shown above, poly-N-vinyl carbazole or its derivatives are particularly effective and hence are used with advantage. Poly-N-vinyl carbazole derivatives are such that all or part of the carbazole rings in the repeating units have various substituents such as an alkyl group, a nitro group, an amino group, a hydroxy group or a halogen atom.

In order to prepare a photoreceptor for use in electrophotography, a bisazo compound of formula (I) may be dispersed in a binder and the resulting layer is formed on an electrically conductive base thereby providing a light-sensitive layer. Alternatively, a function-separated type light-sensitive layer may be formed wherein the bisazo compound (I) used as a carrier generation material is combined with at least one carrier transport material selected from among the styryl compound of formula (II), the hydrazone compound of formula (III) or (IV), and the amine derivative of formula (V). The carrier generating and transporting materials may be incorporated in two different layers (double-layer type) or the carrier generating material may be dispersed in the carrier transporting material, and another embodiment is that the carrier generating material and the carrier transporting material are dispersed within the binder (dispersion type).

The bisazo compounds of formula (I) may be used individually, or they may be used in combination with themselves, or with other known bisazo compounds, or any other carrier generating materials.

Figure 2:
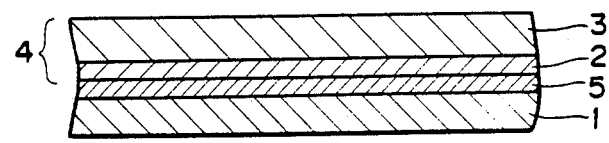
Figure 3:
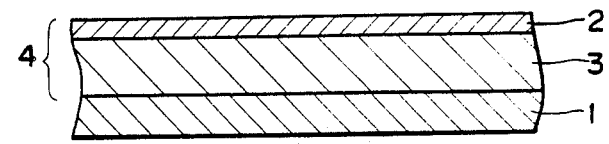
Figure 4:
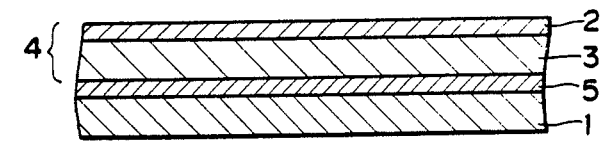
Figure 5:
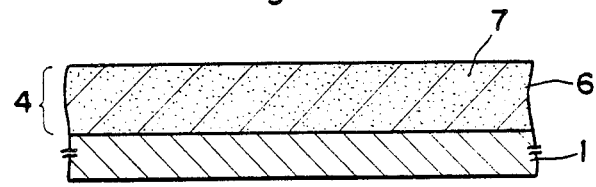
Figure 6:
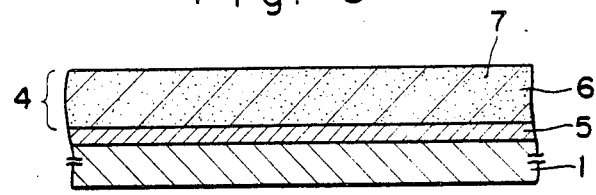
Figure 7:
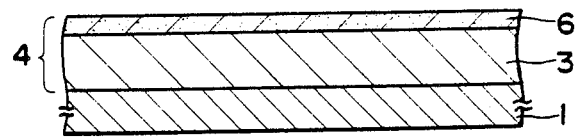

Several embodiments of the photoreceptor of the function-separated type are illustrated in FIGS. 1 to 7. In FIGS. 1 and 3, an electrically conductive base 1 is overlaid with a two-layered light-sensitive element 4 which consists of a carrier generation layer 2 principally composed of a bisazo compound of formula (I) and a carrier transport layer 3 containing at least a carrier transporting material as a main component. The embodiments shown in FIGS. 2 and 4 are similar to those of FIGS. 1 and 3 except that an intermediate layer 5 is placed between the conductive base 1 and the light-sensitive layer 4. In FIG. 5, the conductive base 1 is immediately coated with a light-sensitive layer 4 wherein a carrier generation material 7 primarily composed of the bisazo compound (I) is dispersed in a layer 6 containing at least a carrier transporting material as a major component. The embodiment of FIG. 6 is similar to that of FIG. 5 except that an intermediate layer 5 is disposed between the conductive base 1 and the light-sensitive layer 4. In FIG. 7, an electrically conductive base 1 is coated with a two-layer light-sensitive element 4 which consists of a carrier generation layer 2 (thickness $\geq 2$ μm) and a carrier transport layer 3. Unlike the embodiments of FIGS. 1 to 4, the carrier generation layer 2 has the bisazo compound (I) dispersed in a layer 6 containing a carrier transporting material as the primary component. The carrier transport layer 3 contains the styryl compound (II) and/or amine derivative (V) as the main component. An intermediate layer 5 may also be provided between the conductive base 1 and the light sensitive layer 4.

The carrier generation layer 2 as one member of the double-layered light-sensitive element 4 may be prepared by one of the following methods:

(A) the bisazo compound (I) is dissolved in a suitable solvent optionally together with a binder, and the resulting solution is applied;

(B) the bisazo compound (I) is reduced into fine particles in a dispersion medium in a ball mill or homogenizer mixer optionally in the presence of a binder, and the resulting dispersion is applied. A uniform dispersion can be obtained by combining the mixing operation with ultrasonic waves.

Solvents or dispersion mediums that may be used in preparing the carrier generation layer include n-butylamine, diethylamine, ethylenediamine, isopropanolamine, triethanolamine, triethylene-diamine, N,N-dimethylformamide, acetone, methyl ethyl ketone, cyclohexanone, benzene, toluene, xylene, chloroform, 1,2-dichloroethane, dichloromethane, tetrahydrofuran, dioxane, methanol, ethanol, isopropanol, ethyl acetate, butyl acetate and dimethylsulfoxide.

A binder may be used in the formation of the carrier generation or transport layer, and the kind of the binder is not critical. A particularly preferred binder is a film-forming high-molecular weight polymer which is hydrophobic and is an electric insulator (with high dielectric constant). Exemplary polymers having these properties are listed below for illustrative purposes only:

(a) polycarbonates
(b) polyesters
(c) methacrylic resins
(d) acrylic resins
(e) polyvinyl chloride
(f) polyvinylidene chloride
(g) polystyrene
(h) polyvinyl acetate
(i) styrene-butadiene copolymer
(j) vinylidene chloride-acrylonitrile copolymer
(k) vinyl chloride-vinyl acetate copolymer
(l) vinyl chloride-vinyl acetate-maleic anhydride copolymer
(m) silicone resin
(n) silicone-alkyd resin
(o) phenol-formaldehyde resin
(p) styrene alkyd resin
(q) poly-N-vinylcarbazole
(r) polyvinyl butyral.

These binders may be used either singly or in combination. The carrier generation and transport materials are used in respective amounts of 0–100 wt% (preferably 0–10 wt%) and 10–500 wt%, of the binder.

If the photoreceptor of the present invention is intended for positive charging, the amount of the carrier generation material is preferably limited to a narrower range of 20–40 wt% of the binder (ie., 20–40 parts by weight for 100 parts by weight of the binder). If the amount of the carrier generation material is less than 20 wt% of the binder, the resulting photoreceptor has low photosensitivity and produces an undesirably high residual potential. If the amount of the carrier generation material is more than 40 wt% of the binder, the photoreceptor formed suffers an excessively low acceptance potential. The amount of the carrier transport material is also important for fabricating the desired photoreceptor, and the carrier transport material should be used in an amount of 30 to 150% of the binder (ie, 30 to 150 parts by weight of the carrier transport material per 100 parts by weight of the binder). The carrier transport material used in an amount of this range retains good solubility in solvents, and the photoreceptor obtained has a minimum residual potential and exhibits good photosensitivity. If the amount of the carrier transport material is less than 30 wt% of the binder, the residual potential increases and the photosensitivity is impaired. If, on the other hand, the amount of the carrier transport material exceeds 150 wt% of the binder, the solubility of that material in solvents is decreased.

Preferred embodiments of the photoreceptor of the present invention to be used for positive charging are as follows:

(1) A photoreceptor comprising, in combination, a compound represented by formula (I) as a carrier generating material and at least one compound selected from among those represented by formulas (V) and (VII) as a carrier transporting material.

(2) A photoreceptor comprising, in combination, a compound represented by formula (I) as a carrier generating material and at least one compound selected from among those represented by formulas (III) and (IV) as a carrier transporting material.

Unlike the conventional carrier generation materials, the compounds specified in the present invention experience no appreciable "memory effect" and has a constant residual potential. When a layer having the carrier generation material dispersed in a binder resin is electrically charged and subsequently exposed to light, the attenuation of the surface potential is faster in negative charging than in positive charging. Fast light attenuation on the negatively charged layer means a fast movement of photo-excited electrons, hence a correspondingly rapid neutralization of the residual charges with holes. The carrier transport materials defined above which are preferably used in combination with the carrier generation material have the intrinsic ability to permit easy movement of holes. Therefore, by combining this property with the already described nature of the carrier generation material, a photoreceptor for positive charging can be realized.

The light-sensitive layer in the photoreceptor of the present invention may be mono-layered or double-layered if it is intended for positive charging. In a mono-layered structure, particles of the carrier generation material are dispersed as pigment in a layer wherein the carrier transport material is blended with a binder resin. In order to use this single-layer arrangement, the carrier generation material must be highly dispersible and have a particulate form. In the other arrangement, ie., the double-layer structure, a first layer wherein the carrier transport material is blended with a binder resin is overlaid with a second layer wherein the carrier generation layer is blended with a binder resin. In this double-layer arrangement, photo-carriers are generated on top side of the light-sensitive layer and a particularly high photosensitive is attained. In order to ensure many cycles of copying operation, the second layer preferably has a thickness of 2 $\mu$m or more.

The possible change in the residual potential as a result of cyclic operation can be further reduced by incorporating the styryl compound (II) within the carrier transport phase. This may be explained by two mechanisms: upon illumination with light, the styryl compound also generates photocarriers, which recombine with the trapped holes; alternatively, the styryl compound may preferentially absorb any harmful light.

Photosensitization of the photoreceptor can be further enhanced by incorporating in the carrier transport phase a high molecular weight organic semiconductor having a condensed aromatic ring or heterocyclic ring in side chains since this semiconductor has the ability to form photocarriers by absorbing UV rays. The discharge curve of the photoreceptor has a short tail and a good sensitivity is obtained in a weak electric field. As a result, a fogless copy image of good quality can be produced without bias application in the development stage of a conductive or insulating mono-component processing. If a bias voltage is applied in the mono-component processing, the resulting "fringe" development causes a diffuse area at the edge of the image, and this problem can be solved by using the high-molecular weight organic semiconductor defined above. As another advantage, this type of semiconductor works as a UV filter by absorbing the greater part of the UV component of light, and as a result, the stability of the charge transport phase against UV radiation can be improved.

The sensitivity of the photoreceptor of the present invention may be further improved by incorporating a conventional electron withdrawing material or Lewis acid in the light-sensitive layer because either material forms a change transfer complex.

The carrier generation layer 2 preferably has a thickness of 0.01 to 20 $\mu$m, with the range of 0.05-5 $\mu$m being more preferred. The carrier transport layer has a thickness of 2-100 $\mu$m, more preferably 5-30 $\mu$m.

In order to provide a dispersion-type light-sensitive layer or carrier generation layer, the bisazo compound (I) is preferably a powder composed of particles having an average size of not more than 5 $\mu$m, preferably not more than 2 $\mu$m. An average size of not more than 1 $\mu$m is particularly preferred. Excessively large particles are difficult to disperse in a binder, and some of them may project from the layer to impair its surface smoothness. Projecting particles may induce undesired electrical discharge or toner particles may adhere to the particles to cause "toner filming". Surface charges on a layer of the carrier generation material having sensitivity to light at a long wavelength ($\approx$800 nm) are neutralized by carriers that are thermally excited in the carrier generation material, and this neutralization effect is likely to increase with the particle size of that carrier generation material. Therefore, the electrical resistance and photosensitivity of the carrier generation material can be increased only by reducing its particle size. However, excessively small particles are difficult to agglomerate and increase the electrical resistance of the resulting layer. Furthermore, increased crystal defects lead to decreased sensitivity and low performance characteristics after repeated use. Therefore, the preferred lower limit for the average particle size of the carrier generation material is 0.01 $\mu$m.

It is preferred that the carrier generation layer (or phase) contain an amine in an amount of not more than 20 times the number of mols of the carrier generation material. Amines are generally considered to be effective for providing improved sensitivity. On the other hand, most amines have a strong irritating smell. Therefore, an excessively large amount of amine impairs the environment of coating operation, prolongs the drying period, or produces a sticky coat. However, if the amount of the amine used is not more than 20 times (preferably not more than 10 times, more preferably not more than 5 times) the number of mols of the carrier generation material, the latter will not be substantially dissolved in the amine during the formation of a carrier generation layer (ie, the amine will not act as a solvent) and can be uniformly dissolved in the coating solution. This contributes to the formation of a coating having improved crystallinity and to the absence of a variation in absorption spectrum, and hence improved photosensitivity. The amine incorporated in an amount within the defined range is also effective for preventing dark attenuation and the decrease in acceptance potential after cyclic operation, which are the two major defects accompanying the use of azo compounds as carrier generation materials. If the amine is present at a reasonably low level, the time necessary for drying the applied coat is shortened, and the dried coat is not sticky at all, and there is no possibility of impairing the working environment.

The improvement in photosensitivity achieved by adding an amine in the amount defined above is particularly noticeable if the carrier generation material has an electron withdrawing group (e.g. cyano group) as in the case of the bisazo compound (I). The amine added in the appropriate amount is effectively adsorbed to acceptor sites in the carrier generation layer and reduces the acceptor concentration. This causes an increase in the electrical resistance of the carrier generation layer, thereby contributing to an increased acceptance potential and decreased dark attenuation.

The amine to be added in very small amounts to the carrier generation layer is selected from among many amino compounds such as primary amines (e.g., monoethanolamine, n-butylamine and ethylenediamine), secondary amines (e.g. diethanolamine and diethylamine), tertiary amines (e.g. triethanolamine and triethylamine) and heterocyclic amines (e.g. pyridine and piperidine).

The carrier generation layer may also contain one or more electron withdrawing materials for the purposes of improving the sensitivity and reducing the residual potential and electrical fatigue after cyclic operation. Suitable electron withdrawing materials are listed below: succinic anhydride, maleic anhydride, dibromomaleic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, paranitrobenzonitrile, picrylchloride, quinonechloroiimide, chloranil, bromoanil, dichlorodicyanoparabenzoquinone, anthraquinone, dinitroanthraquinone, 2,7-dinitrofluorenone, 2,4,7-trinitrofluorenone, 2,4,5,7-tetranitrofluorenone, 9-fluorenylidene[dichyanomethylenemalonodinitrile], polynitro-9-fluorenylidene-[dicyanomethylenemalonodinitrile], picric acid, o-nitrobenzoic acid, p-nitrobenzoic acid, 3,5-dinitrobenzoic acid, pentafluorobenzoic acid, 5-nitrosalicyclic acid, 3,5-dinitrosalicyclic acid, phthalic acid, mellitic acid, and any other compounds that have high affinity for electrons. The weight ratio of the carrier generation material to the electron withdrawing material generally ranges from 100:1 to 100:200, preferably from 100:0.1 to 100:100.

The base 1 for supporting the light-sensitive layer shown above is made of a metal plate, metal drum or a thin conductive layer which is coated, evaporated or laminated onto a substrate such as paper or plastic film. The thin conductive layer is composed of an electrically conductive polymer, an electrically conductive compound (e.g. indium oxide) or a metal (e.g. aluminum, palladium or gold). The intermediate layer 5 serving as an adhesive or barrier layer is made of any one of the high-molecular weight polymers listed above as binders, or an organic high-molecular weight material (e.g. polyvinyl alcohol, ethyl cellulose or carboxymethyl cellulose) or aluminum oxide.

The advantages of the present invention are hereunder described in greater detail by reference to working examples and comparative examples.

EXAMPLE 1

Electrically conductive bases each comprising an aluminum foil laminated polyester film were coated with an intermediate layer (0.05 μm thick) that was prepared from a vinyl chloride/vinyl acetate/maleic anhydride copolymer, "ES-lec MF-10" (product of Sekisui Chemical Industries, Ltd.). Carrier generation materials (for their name and particle size, see Table 1) and binders (for their name, also see Table 1) were added to 1,2-dichloroethane (67 ml) and agitated in a ball mill for 12 hours until uniform dispersions were formed. Some of them contained amines and the others did not. Each of the dispersions was applied to the intermediate layer to give a dry thickness of 0.5 μm, and subsequently dried to form a carrier generation layer. Carrier transport materials (for their name, see Table 1) and a binder polycarbonate were dissolved in 1,2-dichloroethane (53 ml). Each of the solutions was applied to the carrier generation layer to give a dry thickness of 12 μm, and subsequently dried to form a carrier transport layer.

Each of the so fabricated photoreceptors was set in a paper analyzer, Model SP-428 (product of Kawaguchi Electric Works, Co., Ltd.) and tested for their characteristics by the following procedure. The light-sensitive layer was corona-charged to a negative voltage of 6 kV over a period of 5 seconds, and thereafter left to stand for 5 seconds (the potential after the standing was $V_1$). Subsequently, the photoreceptor was flooded with a tungsten lamp giving an illuminance of 35 lux on the surface of the light-sensitive layer until the surface potential was reduced to half the initial value. The exposure necessary to reduce the initial surface potential to half its value was determined and designated half exposure, $E_{\frac{1}{2}}$. The acceptance potential, $V_A$, was measured both after the corona charging and after obtaining $10^4$ copies. Also determined were dark attenuation, $(V_A - V_1)/V_1 \times 100$ (%), and $E_{50}^{500}$ (lux·sec) or the exposure necessary for reducing the initial dark charge $V_1$ ($-500$ volts) to $-50$ volts. The sensitivity of each photoreceptor to the light from a semiconductor (operating wavelength: 780 nm) was also determined (⊚ . . . very high, ○ . . . high, △ fair, X . . . poor, . . . not available). The results are shown in Table 1. In Table 1, the carrier generation and transport materials are identified by the numbers attached to the structural formulas of the respective compounds in the Compound Lists given hereinbefore.

TABLE 1

| Sample No. | Carrier generation material | | Carrier transport material | | Particle size of carrier generation material | Binder for carrier generation material | Binder for carrier transport material | Amine addition level |
|---|---|---|---|---|---|---|---|---|
| 1 | I-15 | 2 g | II-35 | 6 g | 0.8 μm | F 1 g | I 8 g | — |
| 2 | I-15 | 2 g | II-35 | 6 g | " | " | " | J 50 mg |
| 3 | I-2 | 2 g | II-36 | 6 g | " | " | " | — |
| 4 | I-2 | 2 g | II-36 | 6 g | " | " | " | K 37 mg |

TABLE 1-continued

| | | | | | | | | |
|---|---|---|---|---|---|---|---|---|
| 5  | I-1  | 2 g | II-16 | 6 g | "      | "     | " | "       |
| 6  | I-10 | 2 g | II-21 | 6 g | "      | "     | " | "       |
| 7  | I-3  | 2 g | II-23 | 6 g | "      | "     | " | L 40 mg |
| 8  | I-6  | 2 g | II-27 | 6 g | "      | "     | " | "       |
| 9  | I-15 | 2 g | II-21 | 6 g | "      | "     | " | J 50 mg |
| 10 | I-15 | 2 g | II-3  | 6 g | "      | "     | " | "       |
| 11 | I-15 | 2 g | II-35 | 6 g | "      | G 1 g | " | "       |
| 12 | I-15 | 2 g | II-35 | 6 g | "      | H 1 g | " | —       |
| 13 | I-15 | 2 g | II-35 | 6 g | "      | "     | " | K 37 mg |
| 14 | I-15 | 2 g | II-35 | 6 g | 1.2 μm | "     | " | "       |
| Comparative | | | | | | | | |
| 1 | I-38 | 2 g | A | 6 g | 0.8 μm | F 1 g | " | " |
| 2 | I-25 | 2 g | B | 6 g | "      | "     | " | " |
| 3 | I-32 | 2 g | C | 6 g | "      | "     | " | " |
| 4 | I-29 | 2 g | D | 6 g | "      | "     | " | " |
| 5 | I-28 | 2 g | E | 6 g | "      | "     | " | " |

| | $V_A$ | $E_{\frac{1}{2}}$ (lux · sec) | Dark attenuation (%) | $E_{50}^{500}$ (lux · sec) | $V_A$ after obtaining $10^4$ copies | Sensitivity to semiconductor laser light (780 nm) |
|---|---|---|---|---|---|---|
| Sample No. | | | | | | |
| 1  | −650 | 1.3 | 30 | 3.2 | −625 |   |
| 2  | −720 | 1.1 | 24 | 2.8 | −700 |   |
| 3  | −670 | 2.0 | 31 | 4.5 | −640 | — |
| 4  | −720 | 1.8 | 28 | 4.2 | −710 | — |
| 5  | −750 | 1.9 | 24 | 4.3 | −730 | — |
| 6  | −730 | 1.8 | 28 | 4.1 | −710 | — |
| 7  | −740 | 1.5 | 27 | 3.8 | −730 | — |
| 8  | −720 | 1.3 | 25 | 3.6 | −700 |   |
| 9  | −750 | 1.2 | 28 | 2.8 | −730 |   |
| 10 | −730 | 1.1 | 26 | 2.7 | −710 |   |
| 11 | −720 | 1.0 | 25 | 2.6 | −700 |   |
| 12 | −660 | 1.3 | 30 | 2.8 | −640 |   |
| 13 | −740 | 1.0 | 25 | 2.6 | −720 |   |
| 14 | −730 | 1.2 | 26 | 2.6 | −710 |   |
| Comparative | | | | | | |
| 1 | −720 | 1.8 | 35 | 4.6 | −750 | x |
| 2 | −720 | 1.7 | 36 | 4.5 | −810 | x |
| 3 | −550 | 1.5 | 43 | 4.3 | −480 | x |
| 4 | −750 | 2.2 | 42 | 5.5 | −780 | x |
| 5 | −680 | 1.7 | 40 | 4.5 | −630 | x |

Figure 8:
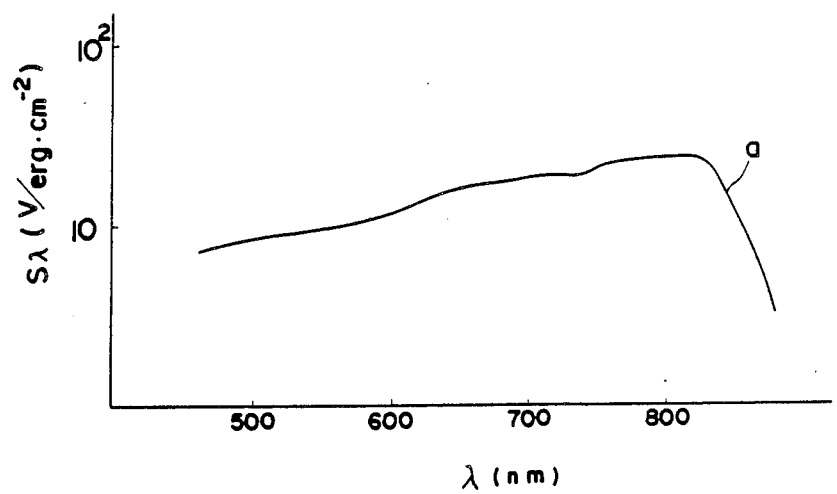

Remarks to Table 1:
Symbols A to L stand for the following compounds, respectively.
A: 3-(p-methoxystyryl)-9-(p-methoxyphenyl)carbazole
B: tri-p-tolylamine
C: 1-phenyl-3-(p-diethylaminostyrl)-5-(p-diethylaminophenyl)pyrazoline
D: 1,1-bis(p-N,N—dibenzylaminophenyl)butane
E: N,N—diethylaminobenzaldehyde-1,1-diphenylhydrazone
F: polyvinyl butyral (ES-lec BLS)
G: polyester (Vylon 200)
H: Polymethyl methacrylate (Parapet SF)
I: polycarbonate (Panlite 1250)
J: monoethanolamine
K: ethylenediamine
L: n-butylamine As Table 1 shows, sample Nos. 1 to 14 according to the present invention had appreciably better electrophotographic characteristics than comparative sample Nos. 1 to 5. The sensitivity profile of sample No. 1 using the bisazo compound (I) as a carrier generation material is depicted as curve a in FIG. 8. As one can readily see from the curve, the photoreceptor according to the present invention exhibited good sensitivity over a wide wavelength spectrum, and a particularly high sensitivity was obtained in the long wavelength range of light that was issued from a semiconductor laser.

EXAMPLE 2

Photoreceptor sample Nos. 15 to 28 and comparative sample Nos. 6 to 10 were prepared as in Example 1. The carrier generation materials, carrier transport materials, the particle size of the carrier generation materials, the binders for the carrier generation and transport materials, and the amine addition levels are listed in Table 2. As in Example 1, measurements were made with respect to half exposure $E_{\frac{1}{2}}$, acceptance potential $V_A$ both after corona charging and after obtaining $10^4$ copies, dark attenuation, $E_{50}^{500}$ and sensitivity to light from a semiconductor laser (780 nm). The results are also shown in Table 2.

TABLE 2

| | Carrier generation | Carrier transport | Particle size of carrier generation | Binder for carrier generation | Binder for carrier transport | Amine addition |
|---|---|---|---|---|---|---|

TABLE 2-continued

| Sample No. | material | | material | | material | material | material | level |
|---|---|---|---|---|---|---|---|---|
| 15 | I-40 | 2 g | III-31 | 6 g | 0.8 μm | F 1 g | I 8 g | — |
| 16 | I-40 | 2 g | III-31 | 6 g | " | " | " | J 27 mg |
| 17 | I-1 | 2 g | III-5 | 6 g | " | " | " | — |
| 18 | I-1 | 2 g | III-5 | 6 g | " | " | " | K 18 mg |
| 19 | I-5 | 2 g | IV-28 | 6 g | " | " | " | " |
| 20 | I-10 | 2 g | IV-6 | 6 g | " | " | " | " |
| 21 | I-8 | 2 g | III-41 | 6 g | " | " | " | L 21 mg |
| 22 | I-6 | 2 g | IV-16 | 6 g | " | " | " | " |
| 23 | I-40 | 2 g | IV-6 | 6 g | " | " | " | J 27 mg |
| 24 | I-40 | 2 g | IV-10 | 6 g | " | " | " | " |
| 25 | I-40 | 2 g | III-31 | 6 g | " | G 1 g | " | " |
| 26 | I-40 | 2 g | III-31 | 6 g | " | H 1 g | " | — |
| 27 | I-40 | 2 g | III-31 | 6 g | " | " | " | K 18 mg |
| 28 | I-40 | 2 g | III-31 | 6 g | 1.2 μm | " | " | " |
| Comparative | | | | | | | | |
| 6 | I-28 | 2 g | A | 6 g | 0.8 μm | F 1 g | " | " |
| 7 | I-38 | 2 g | B | 6 g | " | " | " | " |
| 8 | I-25 | 2 g | C | 6 g | " | " | " | K 18 mg |
| 9 | I-32 | 2 g | D | 6 g | " | " | " | " |
| 10 | I-29 | 2 g | E | 6 g | " | " | " | " |

| | $V_A$ | $E_{\frac{1}{2}}$ (lux · sec) | Dark attenuation (%) | $E_{50}{}^{500}$ (lux · sec) | $V_A$ after obtaining $10^4$ copies | Sensitivity to semiconductor laser light (780 nm) |
|---|---|---|---|---|---|---|
| Sample No. | | | | | | |
| 15 | −630 | 1.5 | 37 | 3.6 | −590 | |
| 16 | −680 | 1.3 | 31 | 3.3 | −675 | |
| 17 | −625 | 1.4 | 38 | 3.7 | −580 | — |
| 18 | −670 | 1.3 | 32 | 3.6 | −660 | — |
| 19 | −700 | 1.5 | 30 | 3.4 | −685 | — |
| 20 | −710 | 1.5 | 29 | 3.5 | −700 | — |
| 21 | −730 | 1.6 | 28 | 3.4 | −715 | — |
| 22 | −750 | 1.7 | 26 | 3.7 | −740 | — |
| 23 | −705 | 1.2 | 29 | 2.9 | −700 | |
| 24 | −695 | 1.1 | 30 | 2.8 | −685 | |
| 25 | −720 | 1.2 | 28 | 2.9 | −710 | |
| 26 | −635 | 1.2 | 36 | 3.2 | −580 | |
| 27 | −710 | 1.3 | 29 | 3.1 | −705 | |
| 28 | −680 | 1.2 | 31 | 3.0 | −670 | |
| Comparative | | | | | | |
| 6 | −710 | 1.9 | 30 | 4.4 | −750 | x |
| 7 | −710 | 2.1 | 30 | 5.0 | −785 | x |
| 8 | −540 | 1.7 | 39 | 4.7 | −460 | x |
| 9 | −760 | 2.3 | 26 | 5.6 | −795 | x |
| 10 | −680 | 1.8 | 33 | 4.9 | −670 | x |

Remarks:
Symbols A to L stand for the same compounds shown in Table 1, respectively.

As Table 2 shows, sample Nos. 15 to 28 according to the present invention exhibited appreciably better electrophotographic characteristics than comparative sample Nos. 6 to 10.

EXAMPLE 3

Electrically conductive supports which were the same as those used in Example 1 were coated with an intermediate layer as in Example 1. Carrier generation materials (for their name and particle size, see Table 3), carrier transport materials (for their name, also see Table 3) and a binder polycarbonate resin were added to 1,2-dichloroethane (67 ml) and mixed in a ball mill for 12 hours until uniform dispersions resulted. Each of the dispersions was applied to the intermediate layer to give a dry thickness of 12 μm, and subsequently dried to form a single-layered light-sensitive element. By this procedure, photoreceptor sample Nos. 29 to 39 and comparative sample Nos. 11 to 14 were formed.

Each photoreceptor was checked for its characteristics as in Example 1, except that corona charging was effected to a positive voltage of 6 kV and the operating wavelength of the semiconductor laser was increased to 790 nm. The results are shown in Table 3.

TABLE 3

| Sample No. | Carrier generation material | | Carrier transport material | | Particle size of carrier generation material | Binder for light-sensitive layer | $V_A$ (V) |
|---|---|---|---|---|---|---|---|
| 29 | I-1 | 1.5 g | III-1 | 4 g | 0.5 μm | I 5 g | 700 |
| 30 | I-2 | 1.5 g | III-4 | " | " | " | 750 |

TABLE 3-continued

| | | | | | | | |
|---|---|---|---|---|---|---|---|
| 31 | I-15 | 1.5 g | III-10 | " | " | " | 730 |
| 32 | I-15 | 2.0 g | IV-11 | " | " | " | 700 |
| 33 | I-42 | 1.5 g | III-15 | " | " | " | 750 |
| 34 | I-42 | 1.2 g | IV-9 | " | " | " | 780 |
| 35 | I-43 | 1.5 g | III-32 | " | " | " | 760 |
| 36 | I-40 | 1.5 g | III-16 | " | " | " | 810 |
| 37 | I-40 | 1.5 g | IV-29 | " | " | " | 740 |
| 38 | I-40 | 2.0 g | IV-29 | " | " | " | 700 |
| Comparative | | | | | | | |
| 11 | I-1 | 0.75 g | III-10 | " | 0.8 μm | " | 880 |
| 12 | I-1 | 2.5 g | IV-16 | " | " | " | 600 |
| 13 | I-42 | 1.5 g | C | " | 0.5 μm | " | 550 |
| 14 | I-42 | 1.5 g | D | " | " | " | 910 |

| | $E_{\frac{1}{2}}$ (lux · sec) | Dark attenuation (%) | $E_{50}^{500}$ (lux · sec) | $V_A$ after obtaining $10^4$ copies | Sensitivity to semiconductor laser light (790 nm) |
|---|---|---|---|---|---|
| Sample No. | | | | | |
| 29 | 1.3 | 19 | 3.1 | 670 | — |
| 30 | 1.5 | 13 | 3.5 | 730 | — |
| 31 | 1.5 | 17 | 3.4 | 700 | — |
| 32 | 1.4 | 18 | 3.2 | 680 | — |
| 33 | 1.0 | 16 | 2.2 | 730 | |
| 34 | 1.1 | 13 | 2.3 | 760 | |
| 35 | 1.1 | 14 | 2.3 | 710 | |
| 36 | 1.2 | 12 | 2.4 | 750 | |
| 37 | 1.0 | 15 | 2.2 | 700 | |
| 38 | 0.9 | 20 | 2.0 | 650 | |
| Comparative | | | | | |
| 11 | 2.8 | 10 | 6.2 | 970 | — |
| 12 | 1.2 | 32 | — | 450 | — |
| 13 | 0.8 | 38 | — | 420 | x |
| 14 | 3.2 | 8 | 7.2 | 970 | x |

Remarks:
Symbols C, D and I stand for the same compounds C, D and I shown in Table 1, respectively.

As one can see from Table 3, sample Nos. 29 to 39 according to the present invention exhibited appreciably better electrophotographic characteristics than comparative sample Nos. 11 to 14.

EXAMPLE 4

Photoreceptor sample Nos. 40 to 49 and comparative sample Nos. 15 to 18 were prepared as in Example 3. The carrier generation materials, carrier transport materials the particle size of the carrier generation materials and the binder for the light-sensitive layer are listed in Table 4. As in Example 3, measurements were made with respect to half exposure $E_{\frac{1}{2}}$, acceptance potential $V_A$ both after corona charging and after obtaining $10^4$ copies, dark attenuation, $E_{50}^{500}$ and sensitivity to light from a semiconductor laser (790 nm). The results are also shown in Table 4.

TABLE 4

| | Carrier generation material | | Carrier transport material | | Particle size of carrier generation material | Binder for light-sensitive layer | $V_A$ (V) |
|---|---|---|---|---|---|---|---|
| Sample No. | | | | | | | |
| 40 | I-1 | 1.5 g | VII-22 | 4 g | 0.4 μm | I 5 g | 760 |
| 41 | I-2 | " | VII-32 | " | " | " | 780 |
| 42 | I-5 | " | VII-36 | " | " | " | 720 |
| 43 | I-6 | " | VII-46 | " | " | " | 700 |
| 44 | I-40 | 1.0 g | V-13 | " | " | " | 810 |
| 45 | I-40 | 1.5 g | VII-72 | " | " | " | 830 |
| 46 | I-42 | " | V-13 VII-18 | 3 g 1 g | " | " | 750 |
| 47 | I-15 | " | VII-74 | 4 g | " | " | 730 |
| 48 | I-15 | " | VII-92 | " | " | " | 700 |
| 49 | I-15 | " | VII-123 | " | " | " | 720 |
| Comparative | | | | | | | |
| 15 | I-2 | 0.75 g | VII-22 | " | 1.0 μm | " | 850 |
| 16 | I-2 | 2.5 g | VII-22 | " | " | " | 600 |
| 17 | I-15 | 1.5 g | C | " | " | " | 560 |
| 18 | I-15 | " | D | " | " | " | 950 |

| | $E_{\frac{1}{2}}$ (lux · sec) | Dark attenuation (%) | $E_{50}^{500}$ (lux · sec) | $V_A$ after obtaining $10^4$ copies | Sensitivity to semiconductor laser light (790 nm) |
|---|---|---|---|---|---|
| Sample | | | | | |

TABLE 4-continued

| No. | | | | | |
|---|---|---|---|---|---|
| 40 | 1.9 | 15 | 3.8 | 730 | — |
| 41 | 1.8 | 13 | 3.9 | 760 | — |
| 42 | 1.7 | 18 | 3.5 | 690 | — |
| 43 | 1.6 | 21 | 3.2 | 650 | — |
| 44 | 1.1 | 10 | 2.5 | 780 | — |
| 45 | 1.3 | 10 | 2.2 | 800 | — |
| 46 | 0.9 | 14 | 2.1 | 700 | — |
| 47 | 0.9 | 17 | 2.1 | 700 | — |
| 48 | 0.8 | 19 | 2.0 | 660 | — |
| 49 | 0.9 | 18 | 2.0 | 690 | — |
| Comparative | | | | | |
| 15 | 2.1 | 8 | 4.8 | 1020 | — |
| 16 | 1.3 | 28 | — | 480 | — |
| 17 | 1.3 | 35 | — | 350 | x |
| 18 | 3.5 | 7 | 7.0 | 1150 | x |

Remarks:
Symbols C, D and I stand for the same compounds C, D and I shown in Table 1, respectively.

As one can see from Table 4, sample Nos. 40 to 49 according to the present invention exhibited appreciably better electrophotographic characteristics than comparative sample Nos. 15 to 18.

What is claimed is:

1. A photoreceptor having a light-sensitive layer composed of a carrier generating phase and a carrier transporting phase, said carrier generating phase containing at least one compound of formula (I) and said carrier transporting phase containing at least one carrier generating compound selected from among the compounds of formulas (II), (III), (IV) and (V):

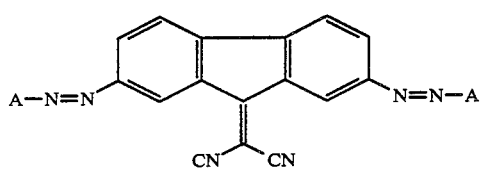

(I)

(wherein A is

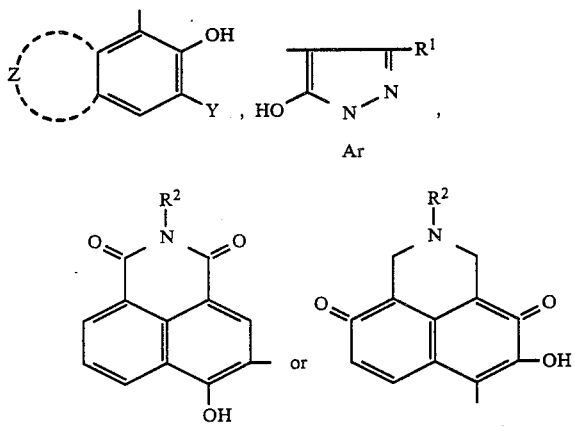

Z is the atomic group necessary for forming a substituted or unsubstituted aromatic carbon ring or a substituted or unsubstituted heterocyclic ring; Y is a hydrogen atom; a hydroxyl group, a carboxyl group or an ester thereof, a sulfo group, a substituted or unsubstituted carbamoyl group, or a substituted or unsubstituted sulfamoyl group; $R^1$ is a hydrogen atom, a substituted or unsubstituted alkyl group, a substituted or unsubstituted amino group, a substituted or unsubstituted carbamoyl group, a carboxyl group or an ester thereof, or a cyano group; Ar is a substituted or unsubstituted aryl group; and $R^2$ is a substituted or unsubstituted alkyl group, a substituted or unsubstituted aralkyl group, or a substituted or unsubstituted aryl group);

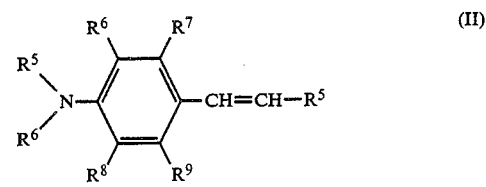

(II)

(wherein $R^3$ and $R^4$ are each a substituted or unsubstituted alkyl group, or a phenyl group; $R^5$ is a substituted or unsubstituted phenyl group, a naphthyl group, an anthryl group, a fluorenyl group or a heterocyclic group, with the possible substituent being an alkyl group, an alkoxy group, a halogen atom, a hydroxy group or a phenyl group; $R^6$ to $R^9$ are each a hydrogen atom, a halogen atom, an alkyl group, an alkoxy group or an alkylamino group);

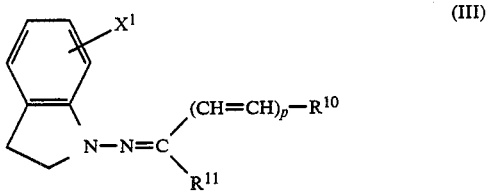

(III)

(wherein $R^{10}$ is a substituted or unsubstituted aryl group or a substituted or unsubstituted heterocyclic group; $R^{11}$ is a hydrogen atom a substituted or unsubstituted alkyl group or a substituted or unsubstituted aryl group; $X^1$ is a hydrogen atom, a halogen atom, an alkyl group, a substituted amino group or an alkoxy group; p is an integer of 0 or 1);

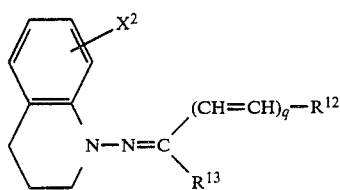

(wherein $R^{12}$ is a substituted or unsubstituted aryl group, or a substituted or unsubstituted heterocyclic group; $R^{13}$ is a hydrogen atom, a substituted or unsubstituted alkyl group, or a substituted or unsubstituted aryl group; $X^2$ is a hydrogen atom, a halogen atom, an alkyl group, a substituted amino group, an alkoxy group or a cyano group; q is an integer of 0 or 1);

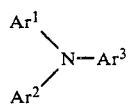

(wherein $Ar^1$ and $Ar^2$ are each a substituted or unsubstituted phenyl group; $Ar^3$ is a substituted or unsubstituted phenyl group, a naphthyl group, an anthryl group, a fluorenyl group or a heterocyclic group).

2. A photoreceptor according to claim 1 wherein said carrier transporting phase contains at least one of the compounds of formula (II).

3. A photoreceptor according to claim 1 wherein said carrier transporting phase contains at least one of the compounds of formulas (III) and (IV).

4. A photoreceptor according to claim 1 wherein said carrier transporting phase contains at least one of the compounds of formula (V).

5. A photoreceptor according to claim 1 wherein the compound of formula (I) is a compound of formula (VI):

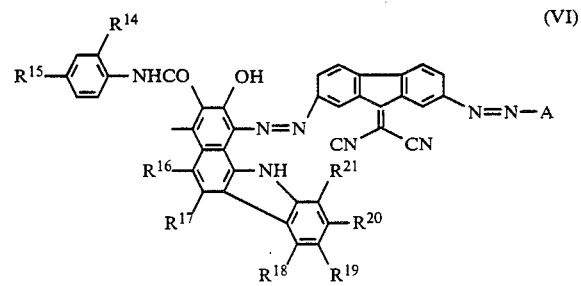

(wherein $R^{14}$ and $R^{15}$ are each an alkyl group, an alkoxy group or an aryl group; $R^{16}$ to $R^{21}$ are each a hydrogen atom, a halogen atom, an alkyl group, an alkoxy group, an amino group, a hydroxy group or an aryl group; and A is the same as the group as defined in claim 1).

6. A photoreceptor according to claim 1 wherein said carrier transporting phase contains at least one of the compounds of formula (II) and at least one of the compounds of formula (V).

7. A photoreceptor according to claim 2 wherein said compound of formula (II) is a compound of formula (VII):

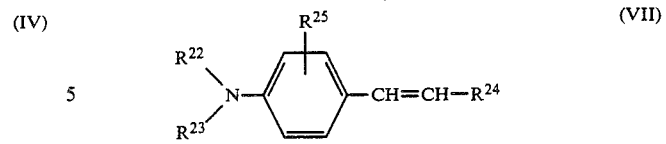

(wherein $R^{22}$ and $R^{23}$ which may be the same or different are each a substituted or unsubstituted alkyl group or a phenyl group; $R^{24}$ is a substituted or unsubstituted phenyl group, a naphthyl group, an anthrayl group, a fluorenyl group or a heterocyclic group; $R^{25}$ is a hydrogen atom, a halogen atom an alkyl group, an alkoxy group or an alkylamino group.)

8. A photoreceptor according to claim 1 wherein the compound of formula (I) incorporated in the carrier generating phase comprises fine particles of an average size of 0.01 to 5 μm.

9. A photoreceptor according to claim 7 wherein said carrier generation phase contains the compound of formula (I) in an amount of 20 to 40 parts by weight for 100 parts by weight of the binder in the light-sensitive layer, said carrier transporting phase containing the compound of formula (VII) in an amount of 30 to 150 parts by weight per 100 parts by weight of the binder in the light-sensitive layer.

10. A photoreceptor according to claim 4 wherein said carrier generating phase contains the compound of formula (I) in an amount of 20 to 40 parts by weight for 100 parts by weight of the binder in the light-sensitive layer, and said carrier transporting phase containing the compound of formula (V) in an amount of 30 to 150 parts by weight for 100 part by weight of the binder in the light-sensitive layer.

11. A photoreceptor according to claim 3 wherein said carrier generating phase contains the compound of formula (I) in an amount of 20 to 40 parts by weight for 100 parts by weight of the binder in the light-sensitive layer, and said carrier transporting phase containing at least one of the compounds of formulas (III) and (IV) in an amount of 30 to 150 parts by weight for 100 parts by weight of the binder in the light-sensitive layer.

12. A photoreceptor according to claim 2 wherein said carrier generating phase forms a carrier generation layer, and said carrier transporting phase forms a carrier transport layer, said two layers combining each other to provide said light-sensitive layer.

13. A photoreceptor according to claim 3 wherein said carrier generating phase forms a carrier generation layer, and said carrier transporting phase forms a carrier transport layer, said two layers combining each other to provide said light-sensitive layer.

14. A photoreceptor according to claim 3 wherein at least one of the compounds of formula (I) and at least one of the compounds of formulas (III) and (IV) are both dispersed in the binder to form the light-sensitive layer.

15. A photoreceptor according to claim 7 wherein at least one of the compounds of formula (I) and at least one of the compounds of formula (VII) are both dispersed in the binder to form the light-sensitive layer.

16. A photoreceptor according to claim 4 wherein at least one of the compounds of formula (I) and at least one of the compounds of formula (V) are both dispersed in the binder to form the light-sensitive layer.

* * * * *